(12) United States Patent
Morikuni

(10) Patent No.: US 11,409,190 B2
(45) Date of Patent: Aug. 9, 2022

(54) OPTICAL ELEMENT AND PROJECTION-TYPE IMAGE DISPLAY APPARATUS

(71) Applicant: SEIKO EPSON CORPORATION, Tokyo (JP)

(72) Inventor: Eiji Morikuni, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 232 days.

(21) Appl. No.: 16/808,936

(22) Filed: Mar. 4, 2020

(65) Prior Publication Data

US 2020/0285140 A1   Sep. 10, 2020

(30) Foreign Application Priority Data

Mar. 5, 2019   (JP) .............................. JP2019-039255

(51) Int. Cl.
  *G03B 21/28*   (2006.01)
  *G02B 17/08*   (2006.01)
  *G03B 21/00*   (2006.01)

(52) U.S. Cl.
  CPC ........... *G03B 21/28* (2013.01); *G02B 17/086* (2013.01); *G03B 21/006* (2013.01)

(58) Field of Classification Search
  CPC ...... G03B 21/00–64; G02B 27/00–648; H04N 9/31–3197
  See application file for complete search history.

(56) References Cited

U.S. PATENT DOCUMENTS

| 2001/0026409 | A1* | 10/2001 | Kanai | .................... G02B 17/04 |
| | | | | 359/833 |
| 2004/0233555 | A1* | 11/2004 | Matsunaga | ........ G02B 17/0848 |
| | | | | 359/859 |
| 2010/0195056 | A1* | 8/2010 | Yoo | .................... G03B 21/2073 |
| | | | | 353/20 |
| 2011/0038039 | A1 | 2/2011 | Takaura et al. | |

FOREIGN PATENT DOCUMENTS

JP   2010-020344 A   1/2010

* cited by examiner

*Primary Examiner* — Michelle M Iacoletti
*Assistant Examiner* — Christopher A Lamb, II
(74) *Attorney, Agent, or Firm* — Oliff PLC

(57) ABSTRACT

An optical element has a first member having a first refractive index and a second member having a second refractive index different from the first refractive index. The optical element has a first transmissive surface, a reflective surface, and a second transmissive surface arranged from a demagnifying side toward a magnifying side in order. The first transmissive surface and the reflective surface are located in one side with respect to an optical axis of the optical element. The second transmissive surface is located in the other side with respect to the optical axis of the optical element. the reflective surface has a concave shape.

18 Claims, 50 Drawing Sheets

OPTICAL ELEMENT AND PROJECTION-TYPE IMAGE DISPLAY APPARATUS

The present application is based on, and claims priority from JP Application Serial Number 2019-039255, filed Mar. 5, 2019, the disclosure of which is hereby incorporated by reference herein in its entirety.

BACKGROUND

1. Technical Field

The present disclosure relates to an optical element having a concave reflective surface and further relates to a projection-type image display apparatus.

2. Related Art

JP-A-2010-20344 describes a projection-type image display apparatus that enlarges and projects a projection image formed by an image formation section via a projection system. The projection system in JP-A-2010-20344 is formed of a first optical system and a second optical system sequentially arranged from the demagnifying side toward the magnifying side. The first optical system includes a refractive optical system. The second optical system is formed of a reflection mirror having a concave reflective surface. The image formation section includes a light source and a light valve. The image formation section forms a projection image in the demagnifying-side image formation plane of the projection system. The projection system forms an intermediate image in a position between the first optical system and the reflective surface and projects a final image on a screen disposed on the magnifying-side image formation plane.

To reduce the number of optical elements that form the projection system, it is conceivable to omit the first optical system formed of a refractive optical system, dispose the image formation section on the demagnifying side of the second optical system, and configure the second optical system in such a way that it includes a reflection mirror and a lens. In this case, however, the number of optical elements of the second optical system undesirably increases.

SUMMARY

An optical element according to the present application has a first transmissive surface, a reflective surface, and a second transmissive surface sequentially arranged from a demagnifying side toward a magnifying side. Three axes perpendicular to one another are called axes X, Y, and Z, with an axis-Z direction being a direction in which the first transmissive surface and the reflective surface are arranged, an upper side being one side of the axis Y, a lower side being another side of the axis Y, and a plane YZ being a plane perpendicular to the axis X and containing the axes Y and Z. The first transmissive surface and the reflective surface are located at a lower side of an imaginary axis extending in the axis-Z direction. The second transmissive surface is located at an upper side of the imaginary axis. The reflective surface has a concave shape. A first member section and a second member section having a refractive index different from a refractive index of the first member section are provided along an optical path of light rays that enter the optical element.

DESCRIPTION OF EXEMPLARY EMBODIMENTS

An optical element and a projection-type image display apparatus according to embodiments of the present disclosure will be described below in detail with reference to the drawings.

Example 1

Figure 1:
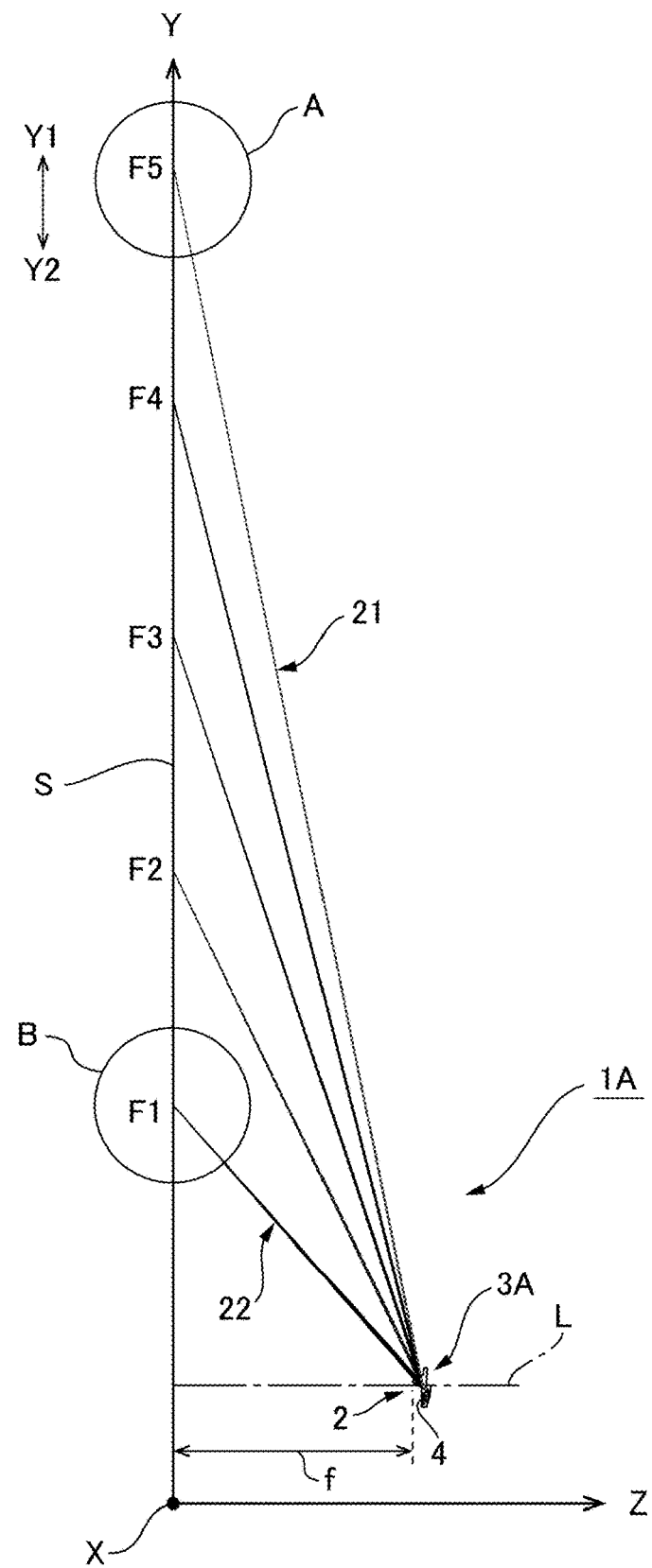
FIG. 1 is a light ray diagram showing the entirety of a projection-type image display apparatus according to Example 1.
Figure 2:
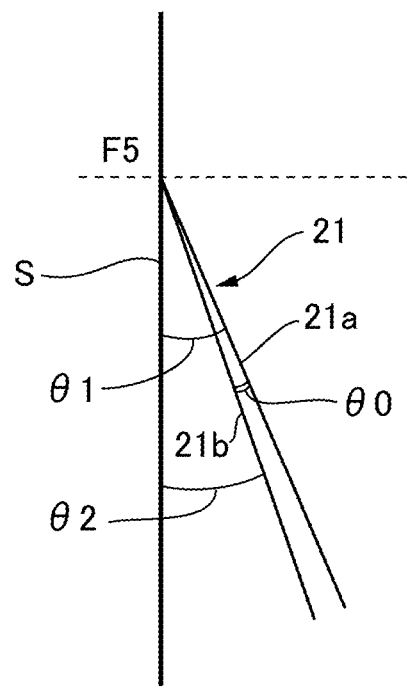
FIG. 2 is a partially enlarged view of the portion A in FIG. 1.
Figure 3:
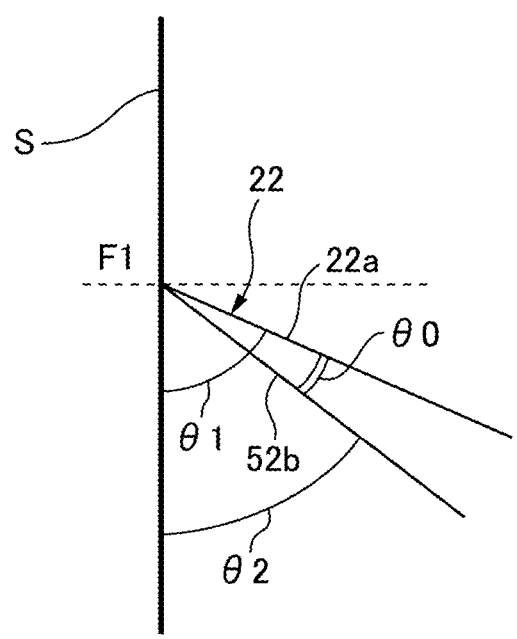
FIG. 3 is a partially enlarged view of the portion B in FIG. 1.
Figure 4:
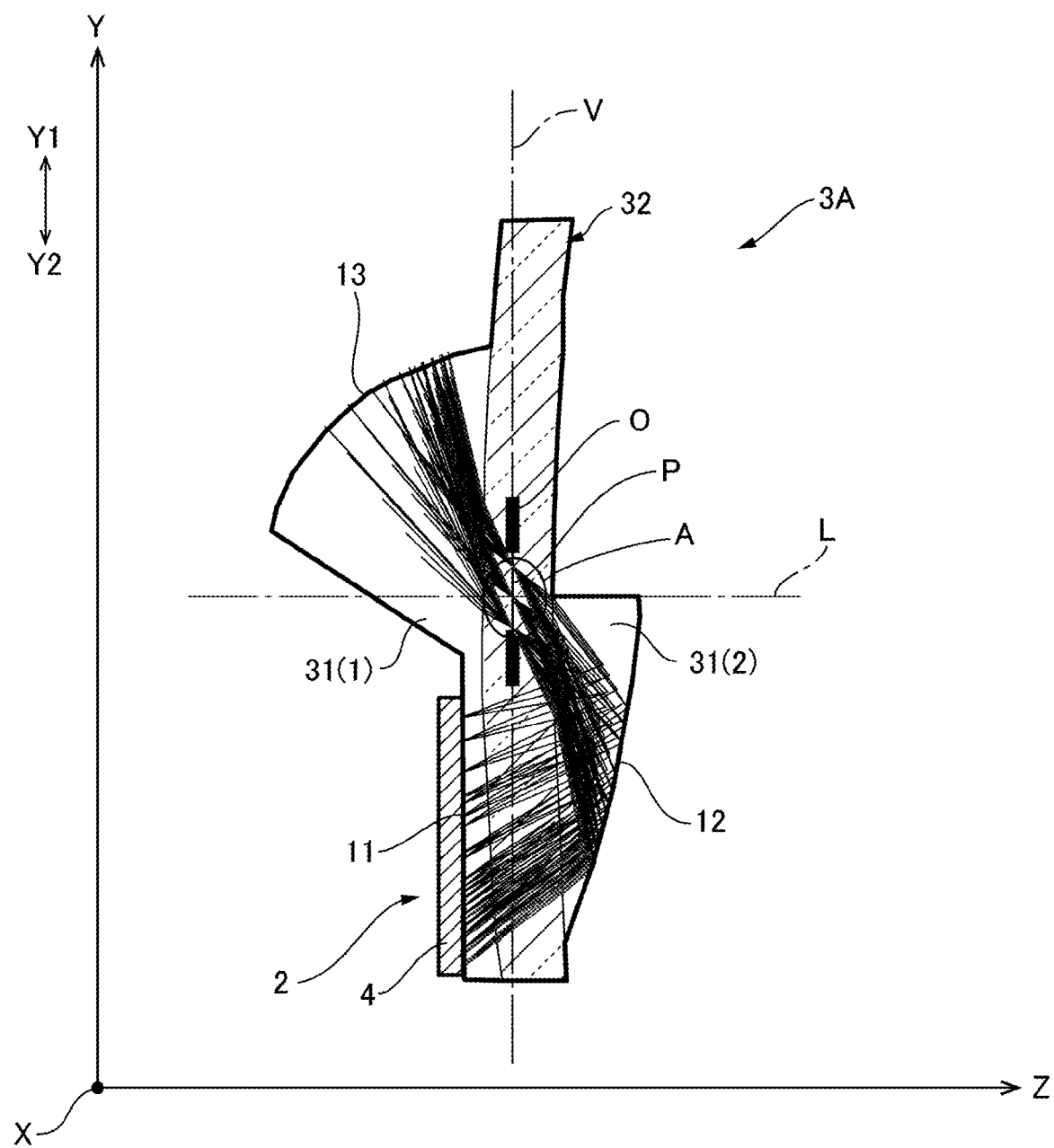
FIG. 4 is a light ray diagram showing light rays traveling through an optical element.
Figure 5:
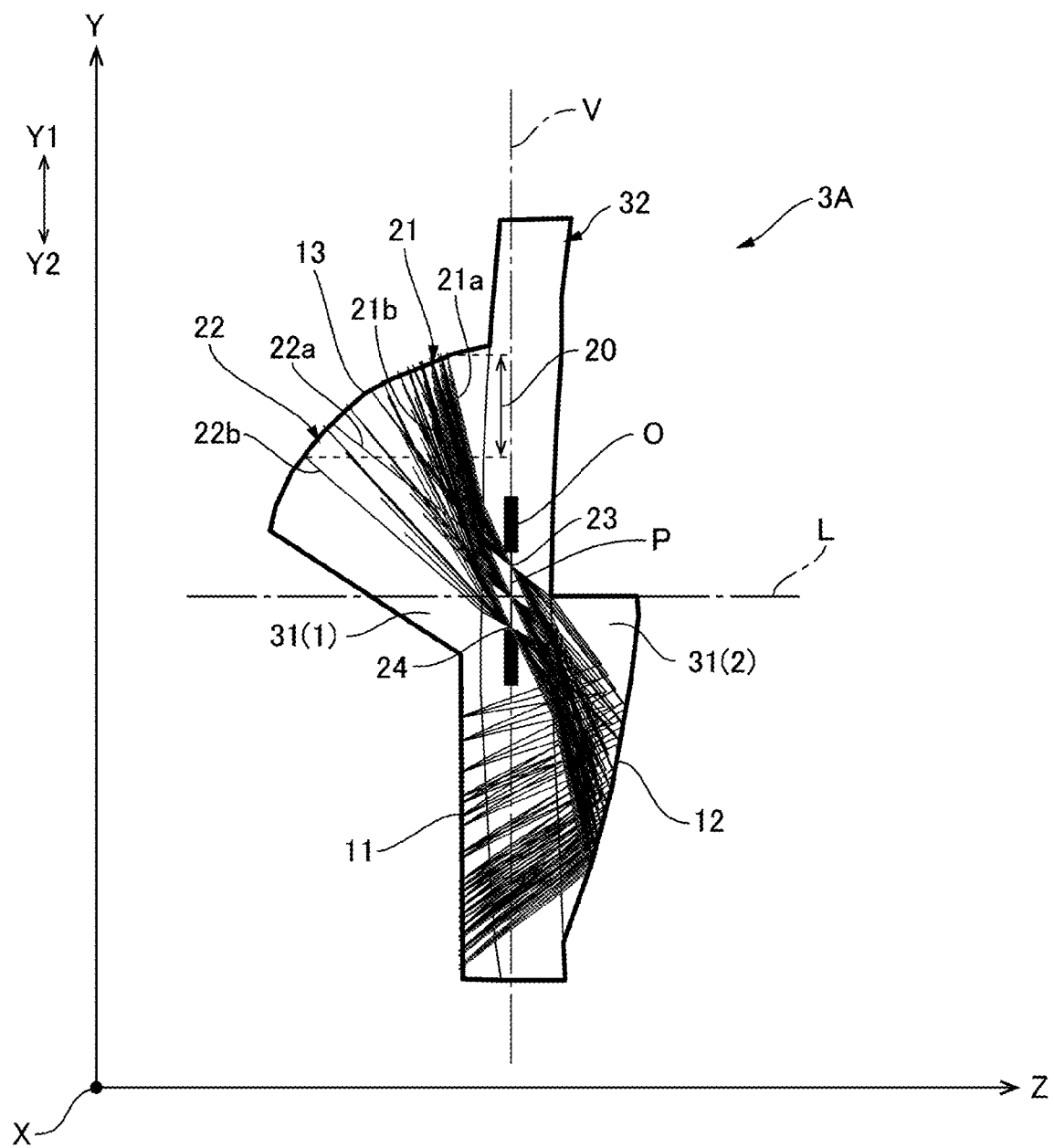
FIG. 5 describes an imaginary line specified in the optical element.

FIG. 1 is a light ray diagram showing the entirety of a projection-type image display apparatus according to Example 1 of the present disclosure. FIG. 2 is a partially enlarged view of the portion A in FIG. 1. The portion A is a largest image height portion and therearound on a screen in the direction along an axis Y. FIG. 3 is a partially enlarged view of the portion B in FIG. 1. The portion B is a smallest image height portion and therearound on the screen in the direction along the axis Y. The large image height portion A contains an image position farthest from the optical axis of an optical element and is an uppermost image position on the screen. The small image height portion B contains an image position nearest from the optical axis of the optical element and is a lowermost image position on the screen. FIG. 4 is a light ray diagram showing light rays traveling through the optical element. FIG. 5 describes an imaginary line specified in the optical element.

A projection-type image display apparatus 1A according to the present example includes an image formation section 2 and an optical element 3A, as shown in FIG. 1. The image formation section 2 causes a projection image to be formed in the demagnifying-side image formation plane of the optical element 3A. A screen S is disposed in the magnifying-side image formation plane of the optical element 3A. That is, the screen S is the magnifying-side image formation plane of the optical element 3A.

The image formation section 2 includes a light source apparatus and a light modulator. In the present example, the light modulator is a liquid crystal light valve 4. The liquid crystal light valve 4 includes a liquid crystal panel, a light-incident-side polarizer, and a light-exiting-side polarizer. The liquid crystal light valve 4 modulates the spatial distribution of the intensity of light source light incident from the light source apparatus on a pixel basis to form a projection image. FIGS. 1 and 4 show the liquid crystal light valve 4 as the image formation section 2 and show no light source apparatus.

The optical element 3A has a first transmissive surface 11, a reflective surface 12, and a second transmissive surface 13 sequentially arranged from the demagnifying side toward the magnifying side, as shown in FIG. 4. In the following description, three axes perpendicular to one another are called axes X, Y, and Z for convenience. The direction in which the first transmissive surface 41 and the reflective surface 42 are arranged is called an axis-Z direction. One side of the axis Y is called an upper side Y1, and the other side of the axis Y is called a lower side Y2. A plane perpendicular to the axis X and containing the axes Y and Z is called a plane YZ. FIGS. 1 to 5 are therefore each viewed along the direction parallel to the axis X. In the following description, an imaginary axis L extending in the axis-Z direction is set in the plane YZ. The imaginary axis L is a reference axis used in the design of the optical element 3A. In the present example, the imaginary axis L is perpendicular to the screen S, which is the magnifying-side image formation plane. It is noted that the imaginary axis L is not in some case perpendicular to the screen S.

The first transmissive surface 11 and the reflective surface 12 are located at the lower side Y2 of the imaginary axis L. The second transmissive surface 13 is located at the upper side Y1 of the imaginary axis L. The reflective surface 12 has a concave shape in the direction away from the first transmissive surface 11. The reflective surface 12 therefore has positive power. The reflective surface 12 is provided by externally forming a reflective coating on the optical element 3A. The second transmissive surface 13 has a convex shape protruding toward the magnifying side. The second transmissive surface 13 therefore has positive power.

The liquid crystal light valve 4 is attached to the first transmissive surface 11. The projection image displayed on the liquid crystal light valve 4 travels via the first transmissive surface 11, the reflective surface 12, and the second transmissive surface 13 in the presented order and is projected on the screen S. A final image projected on the screen S has an oblong shape elongated in the lateral direction. In the present example, the aspect ratio of the final image is 16:10.

The upper and lower halves of the optical element 3A are configured to be rotationally symmetric with respect to the imaginary axis L. That is, the first transmissive surface 11, the reflective surface 12, and the second transmissive surface 13 are so shaped that the cross-sectional shape of the optical element 3A in the plane YZ shown in FIG. 5 is rotated around the imaginary axis L over an angular range of 90° toward one side and the other side of the axis-X direction. In the present example, the reflective surface 12 and the second transmissive surface 33 are each an aspheric surface.

An imaginary line P can be specified in the optical element 3A, as shown in FIG. 5. The imaginary line P connects an upper intersection 23 to a lower intersection 24, the upper intersection 23 being the intersection where an upper peripheral light ray 21a of an upper-end light flux 21, which is the light ray passing through the axis-Y-direction upper end of an effective light ray range 20 of the second transmissive surface 13, and an upper peripheral light ray 22a of a lower-end light flux 22, which is the light ray passing through the axis-Y-direction lower end of the effective light ray range 20, intersect each other in the plane YZ, and the lower intersection 24 being the intersection where a lower peripheral light ray 21b of the upper-end light flux 21 and a lower peripheral light ray 22b of the lower-end light flux 22 intersect each other in the plane YZ. The imaginary line P is parallel to an imaginary vertical line V, which is perpendicular to the imaginary axis L in the plane YZ. That is, the imaginary line P is perpendicular to the imaginary axis L in the plane YZ. It can also be said in the present example that the imaginary line P is the pupil of the optical element 3A in the plane YZ. Light rays having entered the optical element gather at the imaginary line P or in the vicinity thereof. The light rays having entered the optical element form a light flux the diameter of which is minimized in an area A in the vicinity of the imaginary line P.

The optical element 3A includes a first member section 31 and a second member section 32 having a refractive index different from that of the first member section 31 with the first member section 31 and the second member section 32 arranged along the optical path of the light rays having entered the optical element 3A, as shown in FIG. 4. The first member section 31 includes a first first member section 31(1), which has the first transmissive surface 11 and the second transmissive surface 13, and a second first member section 31(2), which has the reflective surface 12. The second member section is located between the first first member section 31(1) and the second first member section 31(2) in the axis-Z direction. In the present example, the first member section 31 is made of resin. The second member section 32 is made of glass. The light rays having entered the optical element 3A form a light flux the diameter of which is minimized in the second member section 32. That is, the area A, where the diameter of the light flux formed of the light rays having entered the optical element 3A is minimized, is in the second member section 32.

The second member section 32 as a whole has a disc-like shape. The second member section 32 has a circular convexly curved surface on the side facing the first first member section 31(1) and a circular concavely curved surface on the side facing the second first member section 31(2). The first first member section 31(1) is in close contact with one side of the second member section 32 in the axis-Z direction, and the second first member section 31(2) is in close contact with the other side of the second member section 32 in the axis-Z direction. A joint surface of the first first member section 31(1) and a joint surface of the second member section 32 that is the surface joined to the first first member section 31(1) therefore have curved shapes that conform to each other. In other words, the joint surface of the second member section 32 that is the surface joined to the first first member section 31(1) has a convexly curved shape. The joint surface of the first first member section 31(1) that is the surface joined to the second member section 32 has a concavely curved shape that conforms to the convexly curved shape of the second member section 32. The joint surface of the second member section 32 that is the surface joined to the second first member section 31(2) has a concavely curved shape. The joint surface of the second first member section 31(2) that is the surface joined to the second member section 32 has a convexly curved shape that conforms to the concavely curved shape of the second member section 32.

The first member section 31 and the second member section 32 differ from each other in terms of refractive index. The joint surface at which the second member section 32 is joined to the first first member section 31(1) has the curved shape, and the joint surface at which the second member section 32 is joined to the second first member section 31(2) has the curved shape. The optical element 3A therefore has power at the joint surface at which the second member section 32 is joined to the first first member section 31(1) and the joint surface at which the second member section 32 is joined to the second first member section 31(2).

The first member section 31 and the second member section 32 further differ from each other in terms of material and therefore differ from each other in terms of heat resistance. That is, the second member section 32 made of glass has higher transmittance of short-wavelength light rays than that of the first member section 31 made of resin. An increase in temperature of the second member section 32 due to absorption of short-wavelength light rays is therefore suppressed. The second member section 32 therefore has high heat resistance as compared with the first member section 31.

The optical element 3A is provided with a stop O. The imaginary line P is defined by the light flux restricted by the stop O. The stop O is provided along the imaginary line P. The stop O is provided, for example, by dividing the optical element 3A along the imaginary line P, applying black ink for light blocking purposes onto the division surfaces, and then bonding the divided pieces of the optical element 3A to each other into the single optical element 3A. The stop O only needs to be formed by using a member capable of blocking part of the light flux that passes through the optical element 3A and is not necessarily formed by using black ink.

As a method for joining the first member section 31 and the second member section 32 to each other, it is desirable to join the two member sections to each other by using an adhesive having a refractive index close to that of the material of which the first member section 31 is made or the material of which the second member section 32 is made. Such an adhesive can minimize an effect thereof on the refractive index. Further, using an adhesive allows the two member sections to be readily joined to each other, resulting in excellent productivity of the optical element 3A.

Lens Data

Lens data on the optical element 3A are as follows. The surfaces of the optical element 3A are numbered sequentially from the magnifying side toward the demagnifying side. A surface having a surface number with * is an aspheric surface. The surface numbers 1 and 8 each represent a dummy surface. The surface number 2 represents the second transmissive surface 13. The surface number 6 represents the reflective surface 12. The surface number 10 represents the image plane and the first transmissive surface 11. The surface number 4 represents the stop.

The surface number 3 represents the joint surface at which the first first member section 31(1) and the second member section 32 are joined to each other. The surface number 5 represents the joint surface at which the second member section 32 and the second first member section 31(2) are joined to each other. The surface number 7 represents the joint surface at which the second first member section 31(2) and the second member section 32 are joined to each other. The surface number 9 represents the joint surface at which the second member section 32 and the first first member section 31(1) are joined to each other. The surfaces labeled with the surface numbers 3 and 9 therefore have shapes that conform to each other. The surfaces labeled with the surface numbers 5 and 7 also have shapes that conform to each other. Reference character r denotes the radius of curvature in millimeters. Reference character d denotes the on-axis inter-surface distance in millimeters. Reference character nd denotes the refractive index. Reference character vd denotes the Abbe number. Reference character Y denotes the effective radius in the axis-Y direction. Reference character X denotes the effective radius in the axis-X direction.

| Surface number | r | d | nd | vd | Y | X |
|---|---|---|---|---|---|---|
| Object plane | 0 | 154.925192 | | | | |
| 1 | 0 | 5 | | | 69.425 | 69.425 |
| 2* | 18.82405 | 7.363655 | 1.531132 | 55.75 | 7.944 | 7.944 |
| 3 | 114.06501 | 1 | 1.652022 | 54.8 | 3.027 | 3.027 |
| 4 Stop | 0 | 1.418853 | 1.652022 | 54.8 | 1 | 1 |
| 5 | 135.13244 | 2.965778 | 1.531132 | 55.75 | 4.008 | 4.008 |
| 6* | −2.99674 | −2.965778 | 1.531132 | 55.75 | 9.263 | 9.263 |
| 7 | 135.13244 | −1.418853 | 1.652022 | 54.8 | 9.793 | 9.793 |
| 8 | 0 | −1 | 1.652022 | 54.8 | 11.039 | 11.039 |
| 9 | 114.06501 | −0.75 | 1.531132 | 55.75 | 11.344 | 11.344 |
| Image plane | 0 | 0 | 1.531132 | 55.75 | 12.36 | 12.36 |

The on-axis inter-surface distance d between the object plane and the surface number 2 is a projection distance f of the projection-type image display apparatus 1A shown in FIG. 1. In the present example, f=159.925192 mm.

Data on the aspheric surface labeled with the surface numbers 2, that is, the second transmissive surface 13 are as follows.

| | |
|---|---|
| Conic constant | 1.955731E+00 |
| Fourth-order coefficient | 2.044439E−03 |
| Sixth-order coefficient | −4.294058E−05 |
| Eighth-order coefficient | 5.347737E−07 |
| Tenth-order coefficient | −1.556296E−09 |

Data on the aspheric surface labeled with the surface numbers 6, that is, the reflective surface 12 are as follows.

| | |
|---|---|
| Conic constant | −6.290221E+01 |
| Fourth-order coefficient | −2.237771E−04 |
| Sixth-order coefficient | 2.377462E−06 |
| Eighth-order coefficient | −1.60976E−08 |
| Tenth-order coefficient | 4.747946E−11 |

Projection Image

Figure 6:
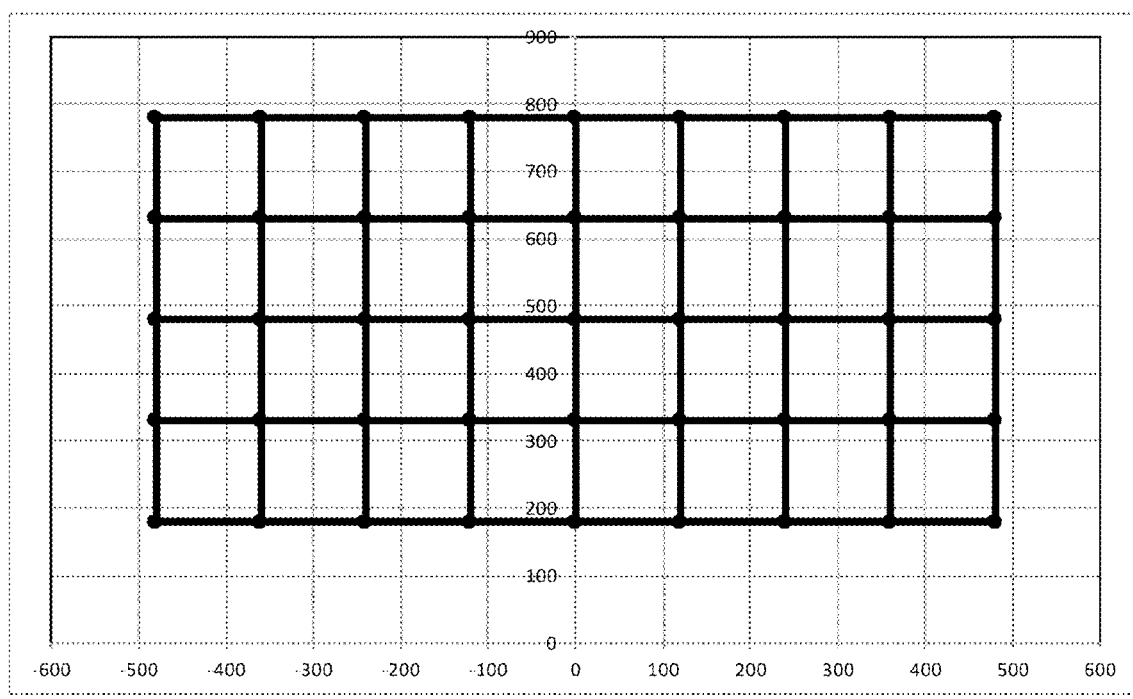
FIG. 6 shows a distortion lattice on a screen.
Figure 7:
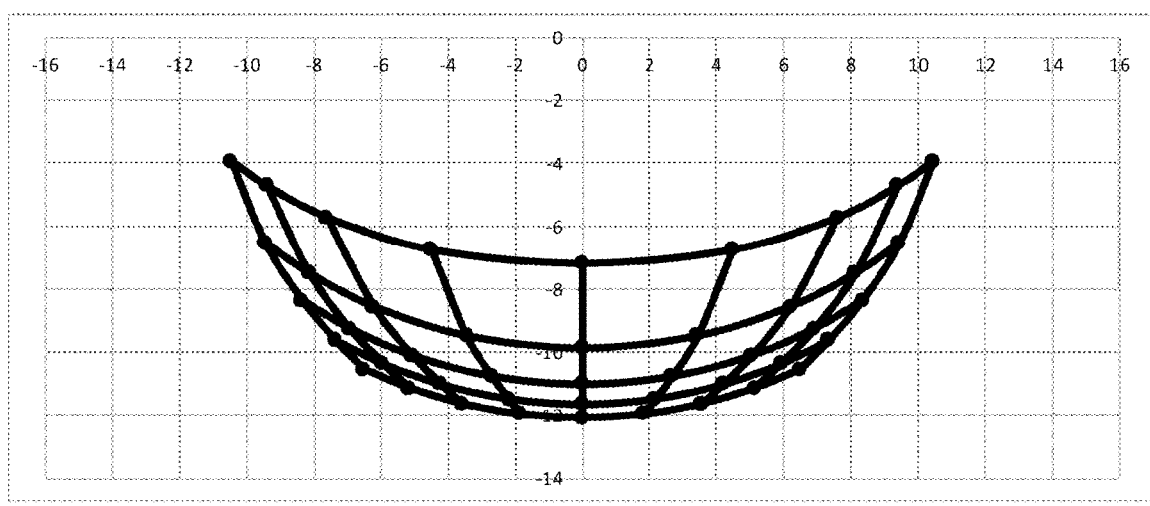
FIG. 7 shows the distortion lattice in a demagnifying-side image formation plane.
Figure 8:
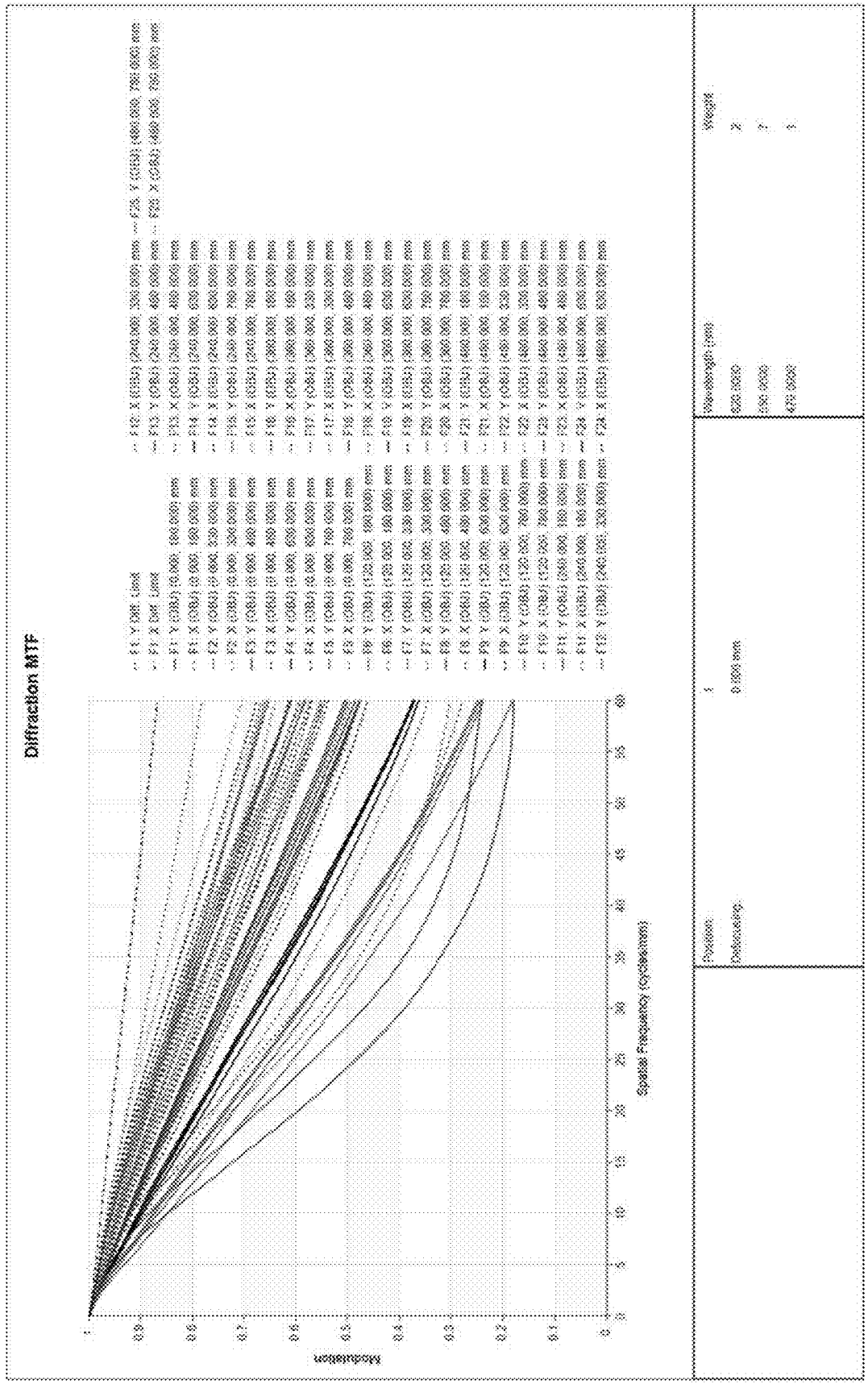
FIG. 8 shows magnifying-side MTFs of the optical element.

The projection image formed by the image formation section 2 will next be described. FIG. 6 shows a distortion lattice on the screen S. FIG. 7 shows the distortion lattice in the demagnifying-side image formation plane of the optical element 3A. The distortion lattice in the demagnifying-side image formation plane is distorted but has no field curvature.

The image formation section 2 forms a projection image that is an inverted final image turned upside down in the demagnifying-side image formation plane. The image formation section 2 forms a projection image so distorted in advance in the demagnifying-side image formation plane of the optical element 3A that an oblong projection image is projected on the screen S, which is the magnifying-side image formation plane. More specifically, the image formation section 2 forms a distorted projection image corresponding to the distortion lattice shown in FIG. 7 in the demagnifying-side image formation plane in such a way that a final image corresponding to the distortion lattice shown in FIG. 6 is projected on the screen S. The projection image has a shape that allows reduction in trapezoidal distortion of the final image formed on the screen S and having the ideal oblong shape. That is, the projection image has distortion opposite the trapezoidal distortion of the final image. The projection image is therefore so formed that the shortest edge thereof is the edge having the largest image height on the screen S.

Effects

In the projection-type image display apparatus 1A according to the present example, the optical element 3A has the concave reflective surface 12 and the convex second transmissive surface 13 protruding toward the magnifying side. The optical element 3A therefore allows the light flux reflected off the reflective surface 12 to be refracted by the second transmissive surface 13. The focal length of the optical element 3A, that is, the projection distance is therefore readily shortened.

In the optical element 3A, the reflective surface 12 and the second transmissive surface 13 are each an aspheric surface. Further, the surface numbers 3, 5, 7, and 9 represent joint surfaces at which the first member section 31 and the second member section 32 having different refractive indices are joined to each other and which each have a curved shape. Aberrations produced by the optical element 3A can therefore be suppressed.

Figure 9:
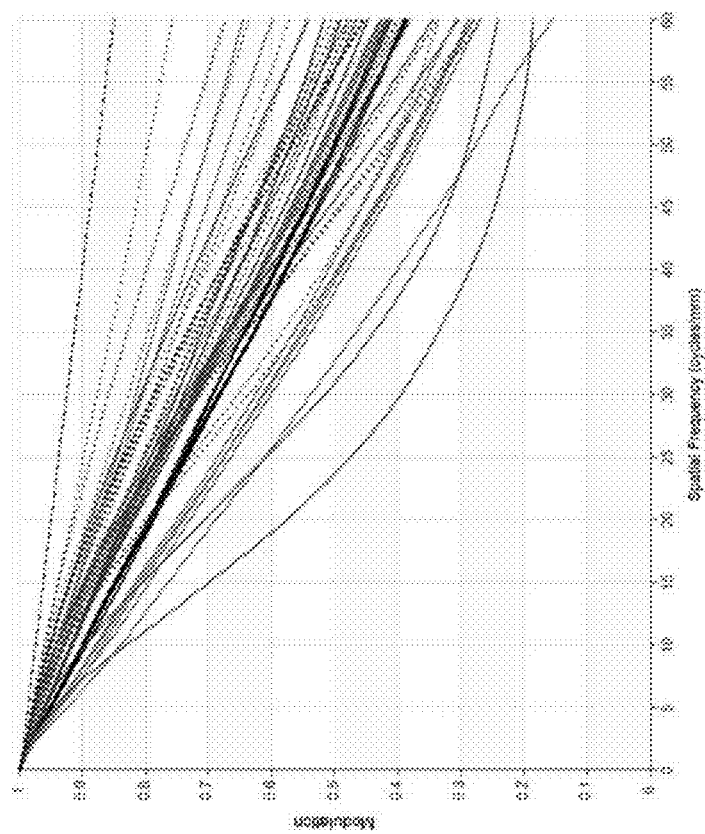
FIG. 9 shows the MTFs of the optical element that transmits red light rays.
Figure 10:
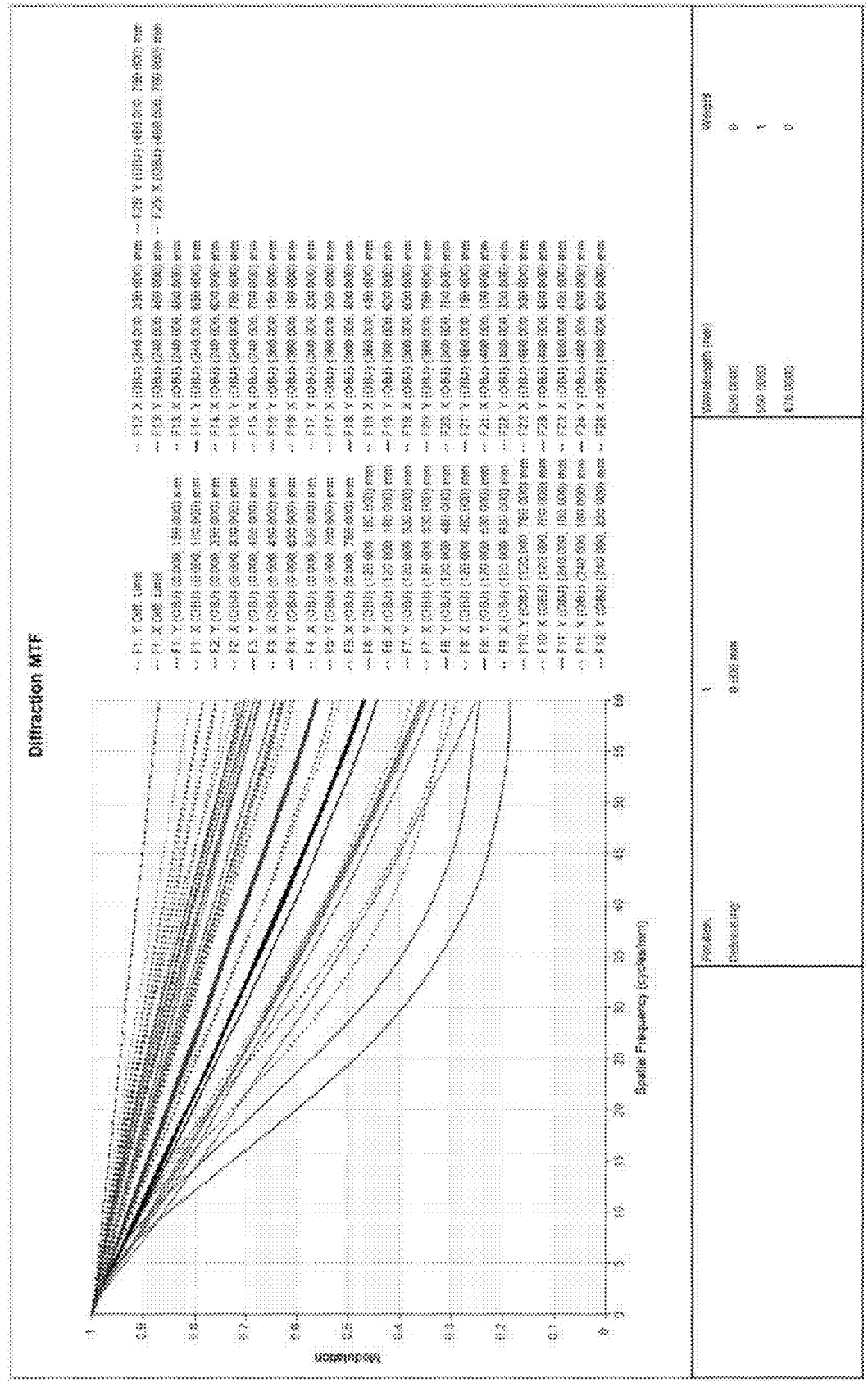
FIG. 10 shows the MTFs of the optical element that transmits green light rays.
Figure 11:
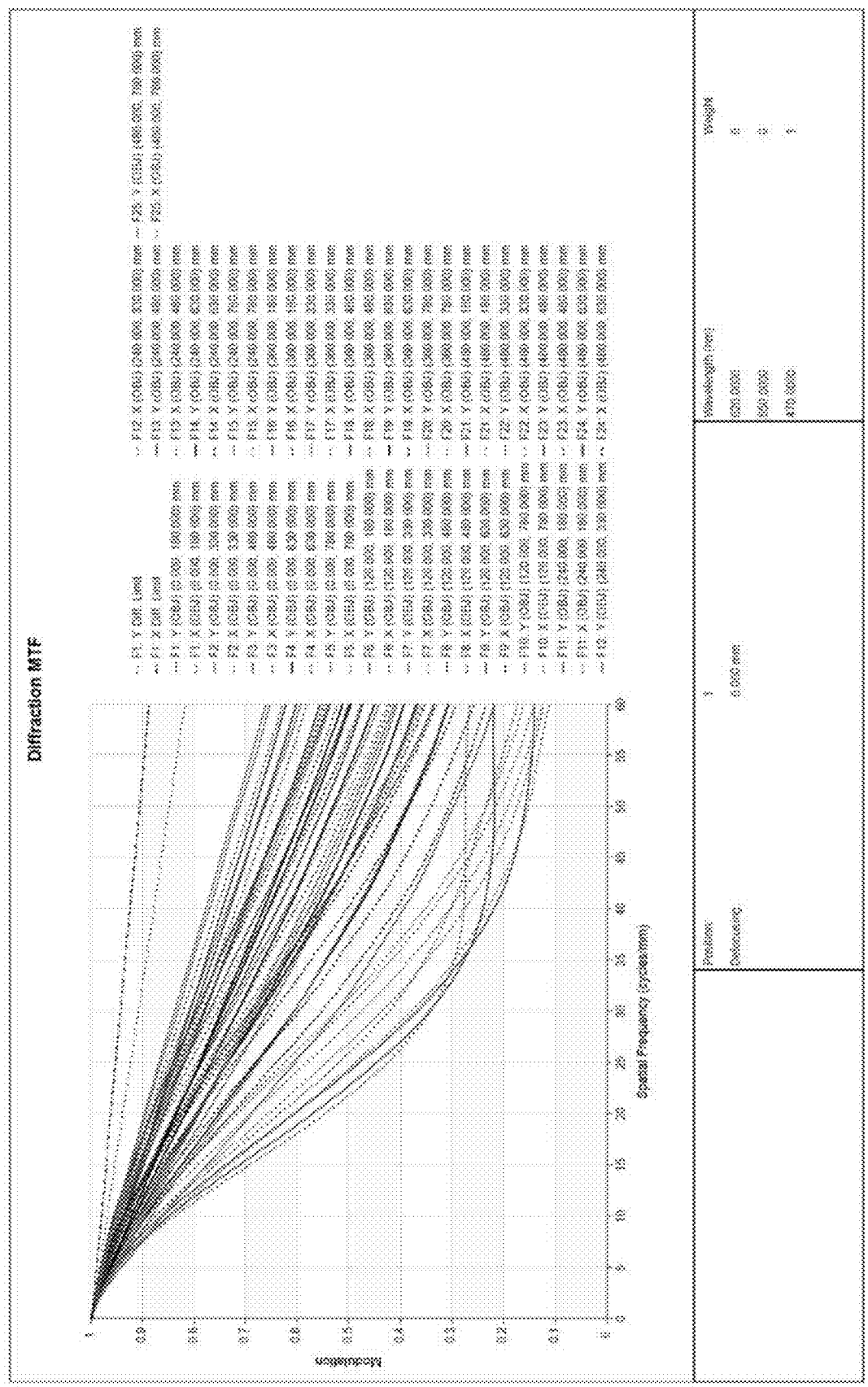
FIG. 11 shows the MTFs of the optical element that transmits blue light rays.

FIGS. 8 to 11 each show magnifying-side MTFs of the optical element 3A. The MTFs were calculated under the following conditions: The image formation plane was divided along the axis Y; and the resultant halves were each divided into 25 areas. The horizontal axes of FIGS. 8 to 11 each represent the spatial frequency. A spatial frequency of 30 cycles corresponds to a resolution of 16.7 μm. The vertical axes of FIGS. 8 to 11 each represent a contrast reproduction ratio. Light rays used in the calculation of the MTFs are so weighted that the weighting ratio among light rays having a wavelength of 620 nm, light rays having a wavelength of 550 nm, and light rays having a wavelength of 470 nm is 2:7:1. In FIG. 9, the light rays used in the calculation of the MTFs are the light rays having the wavelength of 620 nm. That is, FIG. 9 shows the resolution of red light rays. In FIG. 10, the light rays used in the calculation of the MTFs are the light rays having the wavelength of 550 nm. That is, FIG. 10 shows the resolution of green light rays. In FIG. 11, the light rays used in the calculation of the MTFs are the light rays having the wavelength of 470 nm. That is, FIG. 11 shows the resolution of blue light rays. The present example demonstrates that a decrease in the resolution is suppressed, that a decrease in MTFs at each of the colors is also suppressed, and that chromatic aberrations are satisfactorily corrected, as shown in FIGS. 8 to 11.

Figure 12:
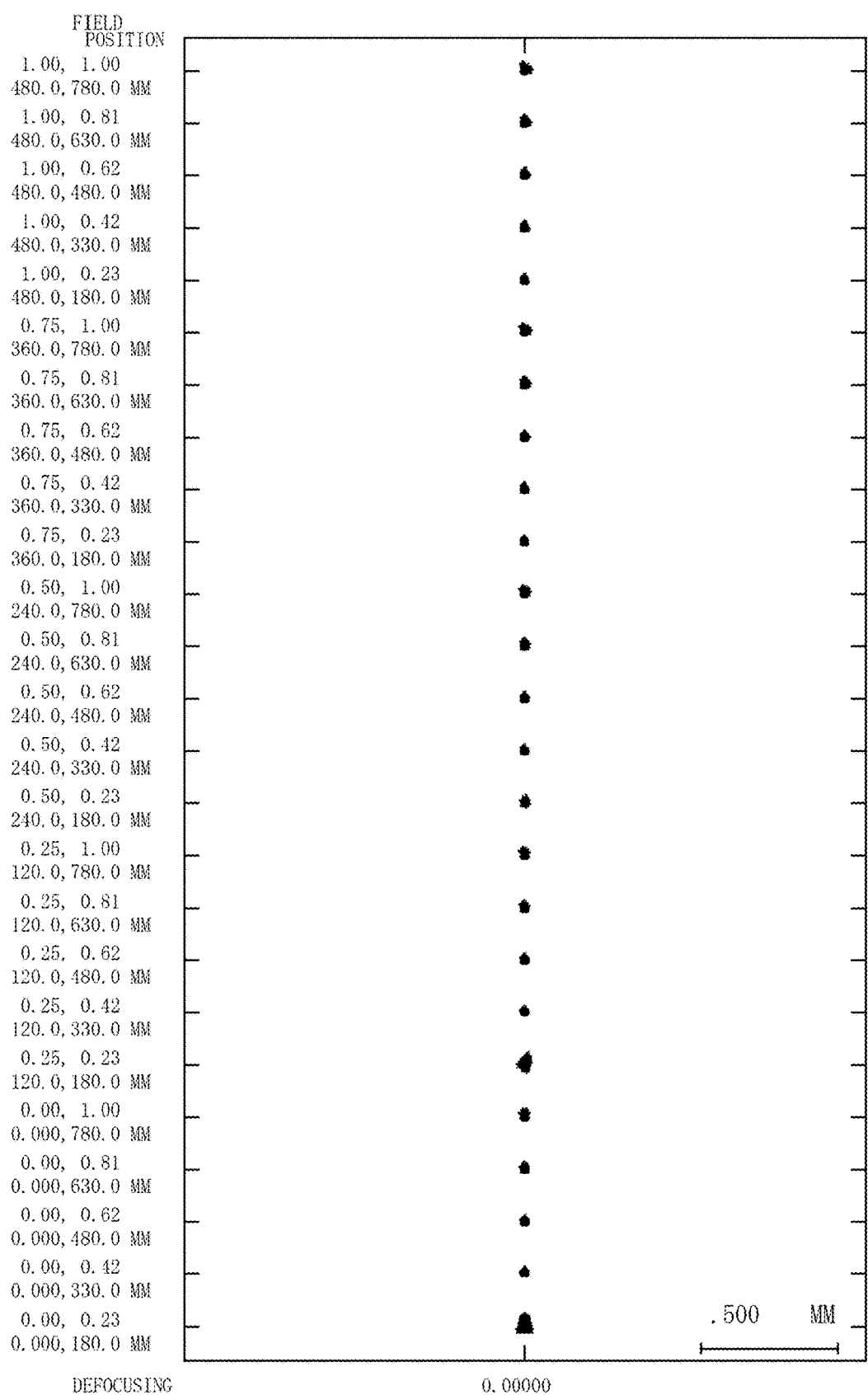
FIG. 12 is a spot diagram showing spots produced by the optical element.

FIG. 12 is a spot diagram showing spots produced by the optical element 3A. In the spot diagram shown in FIG. 12, the spots are small. The aberrations are therefore satisfactorily corrected in the present example. In FIG. 12, the spots in low image height positions on the screen S are slightly bigger than the others. Image portions of a projection image projected in the low image height positions on the screen S are, however, portions where the lattice lines of the distortion lattice in the demagnifying-side image formation plane of the optical element 3A shown in FIG. 7 are arranged at large intervals. The image formation section 2 can therefore express the image portions projected in the low image height positions on the screen S by using a larger number of pixels than those in the other image portions. Therefore, in the projection-type image display apparatus 1A according to the present example, a decrease in the resolution of the final image can be suppressed at the locations where the spot diagram shows large spots, that is, in the low image height positions on the screen S.

Data on divergence angles θ0 of the light fluxes F1 to F5, which reach the respective image heights on the screen S, will be presented for reference. The light flux F1 is a light flux that reaches a smallest image height position. The light flux F5 is a light flux that reaches a largest image height position. The light fluxes F2 to F4 are light fluxes that reach height positions between the height position that the light flux F1 reaches and the height position that the light flux F5 reaches. Provided that the on-Y-axis coordinate of the light flux F1 in the plane YZ is 780 and the on-Y-axis coordinate of the light flux F5 in the plane YZ is 180, the on-Y-axis coordinate of the light flux F2 is 330, and the on-Y-axis coordinate of the light flux F3 is 480. The on-axis-Y coordinate of the light flux F4 is 630. θ1 represents the angle of an upper peripheral light ray of each of the light fluxes F1 to F5 and is the angle at which the upper peripheral light ray of each of the light fluxes F1 to F5 intersects the screen S, as shown in FIGS. 2 and 3. θ2 represents the angle of a lower peripheral light ray of each of the light fluxes F1 to F5 and is the angle at which the lower peripheral light ray of each of the light fluxes F1 to F5 intersects the screen S. θ0 represents the divergence angle and is the difference between θ2 and θ1. R represents the divergence angle ratio. The divergence angle ratio is the ratio of a divergence angle to the divergence angle of the light flux F1, which has the largest divergence angle and is assumed to be 100.

Data on the divergence angle θ0 of each of the light fluxes F1 to F5, which reach the respective image heights on the screen S, are as follows.

| Light flux | θ1 | θ2 | θ0 | R |
|---|---|---|---|---|
| F1 | 46.66640183 | 47.13681798 | 0.470416156 | 100% |
| F2 | 62.91376663 | 63.09657615 | 0.182809526 | 39% |
| F3 | 70.68053558 | 70.77752895 | 0.09699337 | 21% |
| F4 | 75.06957016 | 75.13146807 | 0.061897903 | 13% |
| F5 | 77.85918732 | 77.90313864 | 0.043951323 | 9% |

The concavely curved reflective surface 12 gathers the light rays passing through the optical element 3A in the optical element 3A. The optical density in the optical element 3A therefore increases, so that part of the optical element 3A is heated in some cases. In such cases, the heated portion of the optical element 3A undergoes thermal expansion, resulting in a problem of degradation in optical performance of the optical element 3A.

To solve the problem described above, the optical element 3A includes the first member section 31 made of resin and the second member section 32 made of glass arranged along the optical path of the light rays that enter the optical element 3A. The area A, where the diameter of the light flux formed of the light rays having entered the optical element 3A is minimized, is located in the second member section 32. That is, in the optical element 3A, the area A, which is likely to be heated due to the increase in the optical density in the optical element 3A, is made of a material having high transmittance of the light rays and high heat resistance. The situation in which the heated portion of the optical element 3A undergoes thermal expansion and therefore causes degradation in optical performance of the optical element 3A can therefore be suppressed or avoided.

Further, in the optical element 3A, the first first member section 31(1) is provided with the aspheric second transmissive surface 13, and the second first member section 31(2) is provided with the aspheric reflective surface 12. The optical element 3A can therefore be readily provided with the aspheric second transmissive surface 13 and the aspheric reflective surface 12 as compared with a case where a member section made of glass is provided with the aspheric surfaces.

Comparative Example

Figure 13:
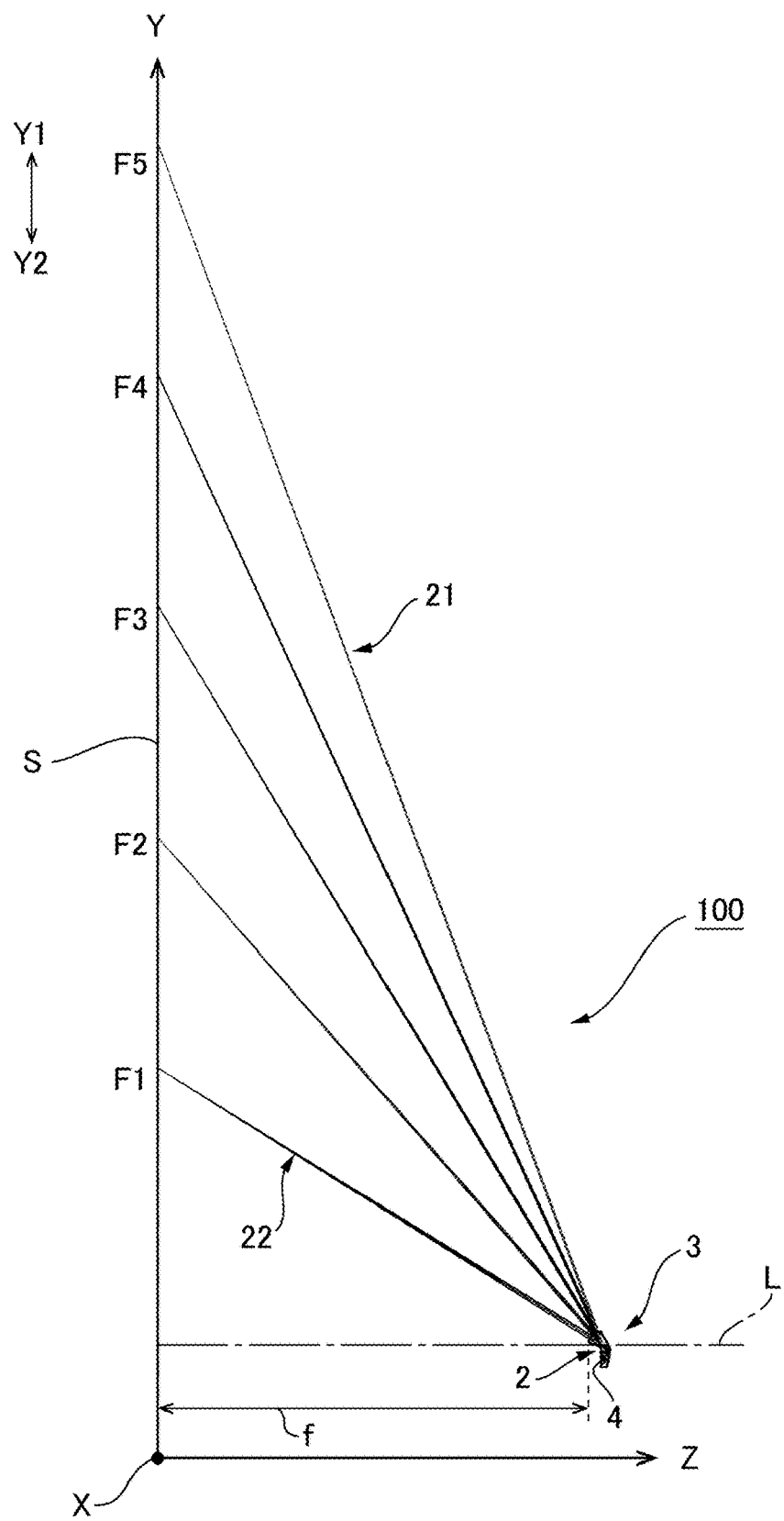
FIG. 13 is a light ray diagram showing the entirety of a projection-type image display apparatus according to Comparative Example.
Figure 14:
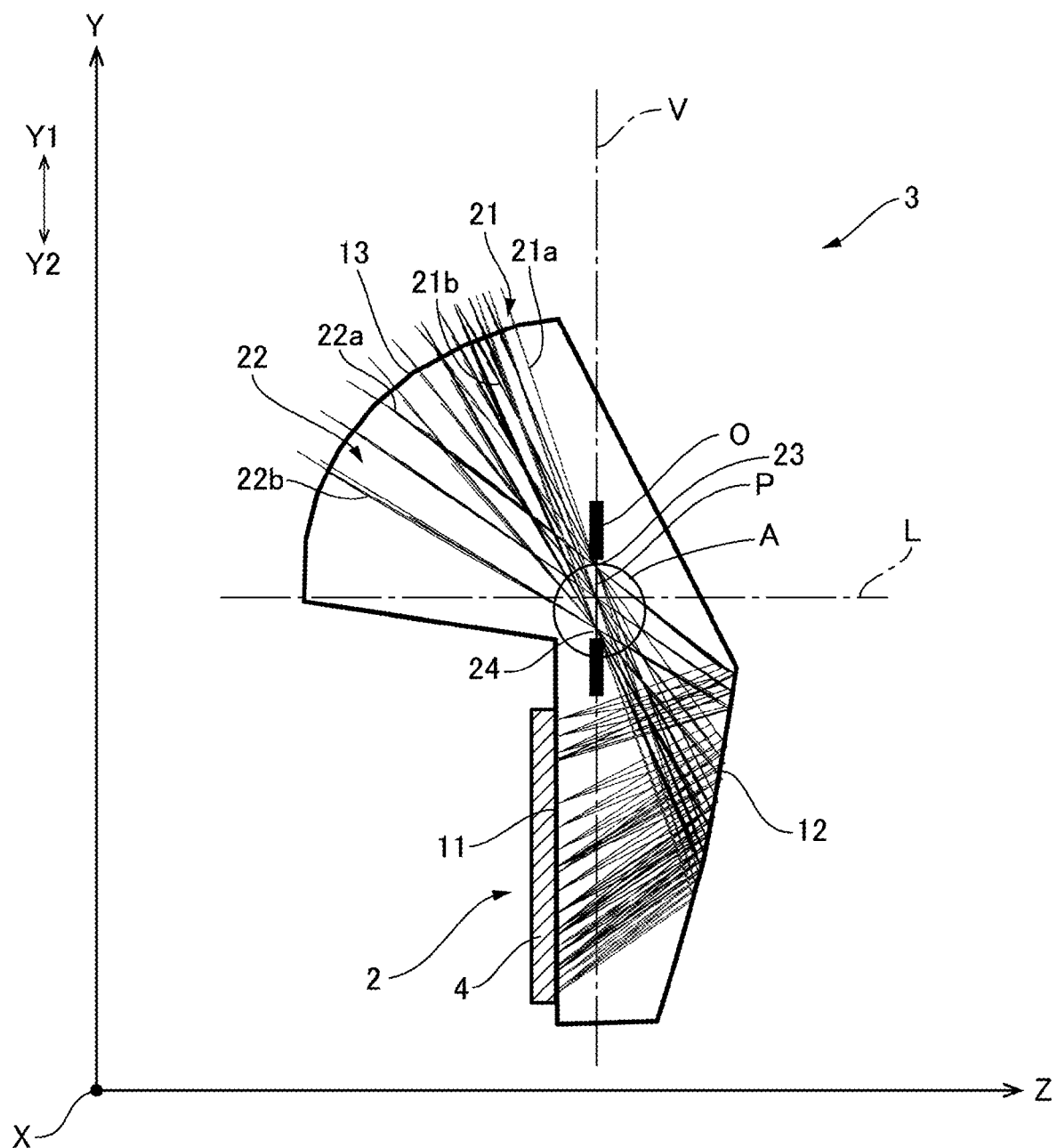
FIG. 14 is a light ray diagram showing light rays traveling through an optical element according to Comparative Example.

The effect of suppressing a decrease in the resolution and the effect of satisfactorily correcting chromatic aberrations in Embodiment 1 will next be described with reference to Comparative Example. FIG. 13 is a light ray diagram showing the entirety of a projection-type image display apparatus according to Comparative Example. FIG. 14 is a light ray diagram showing light rays traveling through an optical element according to Comparative Example. A projection-type image display apparatus 100 according to the present example has the same configuration as that of the projection-type image display apparatus 1A according to Example 1 except that an optical element 3 is made of a single material. Corresponding configurations therefore have the same reference characters.

The projection-type image display apparatus 100 according to the present example includes the image formation section 2 and the optical element 3, as shown in FIG. 13. The image formation section 2 is disposed on the demagnifying side of the optical element 3. The image formation section 2 includes a light source apparatus and a light modulator. The light modulator includes the liquid crystal light valve 4.

The optical element 3 is made of a single material. In the present example, the optical element 3 is made of resin. The optical element 3 has the first transmissive surface 11, the reflective surface 12, and the second transmissive surface 13 sequentially arranged from the demagnifying side toward the magnifying side, as shown in FIG. 14. The projection image displayed on the liquid crystal light valve 4 travels via the first transmissive surface 11, the reflective surface 12, and the second transmissive surface 13 in the presented order and is projected on the screen S. A final image projected on the screen S has an oblong shape elongated in the lateral direction. The aspect ratio of the final image is 16:10. Also in the present example, the imaginary axis L extending in the axis-Z direction is set in the plane YZ. The imaginary axis L is a reference axis used in the design of the optical element 3. The imaginary axis L is perpendicular to the screen S, which is the magnifying-side image formation plane.

The first transmissive surface 11 and the reflective surface 12 are located at the lower side Y2 of the imaginary axis L. The second transmissive surface 13 is located at the upper side Y1 of the imaginary axis L. The reflective surface 12 has a concave shape in the direction away from the first transmissive surface 11. The reflective surface 12 therefore has positive power. The reflective surface 12 is provided by externally forming a reflective coating on the optical element 3. The second transmissive surface 13 has a convex shape protruding toward the magnifying side. The second transmissive surface 13 therefore has positive power. The upper and lower halves of the optical element 3 are configured to be rotationally symmetric with respect to the imaginary axis L. That is, the first transmissive surface 11, the reflective surface 12, and the second transmissive surface 13 are so shaped that the cross-sectional shape of the optical element 3 in the plane YZ shown in FIG. 14 is rotated around the imaginary axis L over an angular range of 900 toward one side and the other side of the axis-X direction. The reflective surface 12 and the second transmissive surface 33 are each an aspheric surface.

The imaginary line P can be specified in the optical element 3. The imaginary line P connects the upper intersection 23 to the lower intersection 24, the upper intersection 23 being the intersection where the upper peripheral light ray 21a of the upper-end light flux 21, which is the light ray passing through the axis-Y-direction upper end of the effective light ray range 20 of the second transmissive surface 13, and the upper peripheral light ray 22a of the lower-end light flux 22, which is the light ray passing through the axis-Y-direction lower end of the effective light ray range 20, intersect each other in the plane YZ, and the lower intersection 24 being the intersection where the lower peripheral light ray 21b of the upper-end light flux 21 and the lower peripheral light ray 22b of the lower-end light flux 22 intersect each other in the plane YZ. The imaginary line P is parallel to the imaginary vertical line V, which is perpendicular to the imaginary axis L in the plane YZ. That is, the imaginary line P is perpendicular to the imaginary axis L in the plane YZ. It can also be said in the present example that the imaginary line P is the pupil of the optical element 3 in the plane YZ.

Lens data on the optical element 3 according to Comparative Example are as follows. The surfaces of the optical element 3 are numbered sequentially from the magnifying side toward the demagnifying side. A surface having a surface number with * is an aspheric surface. The surface number 1 represents the second transmissive surface 13. The surface number 2 represents the stop. The surface number 3 represents the reflective surface 12. The image plane is the first transmissive surface 11. Reference character r denotes the radius of curvature in millimeters. Reference character d denotes the on-axis inter-surface distance in millimeters. Reference character nd denotes the refractive index. Reference character vd denotes the Abbe number. Reference character Y denotes the effective radius in the axis-Y direction. Reference character X denotes the effective radius in the axis-X direction.

| Surface number | r | d | nd | vd | Y | X |
|---|---|---|---|---|---|---|
| Object plane | 0 | 295 | | | | |
| 1* | 15 | 10 | 1.531132 | 55.75 | 9.019 | 9.019 |
| 2 Stop | 0 | 5 | 1.531132 | 55.75 | 1 | 1 |
| 3* | −11 | −6.277 | 1.531132 | 55.75 | 10.558 | 10.558 |
| Image plane | 0 | 0 | 1.531132 | 55.75 | 13.389 | 13.389 |

The on-axis inter-surface distance d in the fields labeled with the object plane is the distance between the screen S and the surface number 1. The on-axis inter-surface distance d in the fields labeled with the object plane therefore shows the projection distance f of the projection-type image display apparatus 100. In the present example, f=295 mm.

Data on the aspheric surface labeled with the surface numbers 1, that is, the second transmissive surface 13 are as follows.

| | |
|---|---|
| Conic constant | 1.597914E+00 |
| Fourth-order coefficient | 1.003949E−03 |
| Sixth-order coefficient | −1.770946E−05 |
| Eighth-order coefficient | 1.911983E−07 |
| Tenth-order coefficient | −6.508832E−10 |

Data on the aspheric surface labeled with the surface numbers 3, that is, the reflective surface 12 are as follows.

| | |
|---|---|
| Conic constant | −9.4411E+01 |
| Fourth-order coefficient | −1.369046E−04 |
| Sixth-order coefficient | 1.096019E−06 |
| Eighth-order coefficient | −5.971179E−09 |
| Tenth-order coefficient | 1.384487E−11 |

Projection Image

Figure 15:
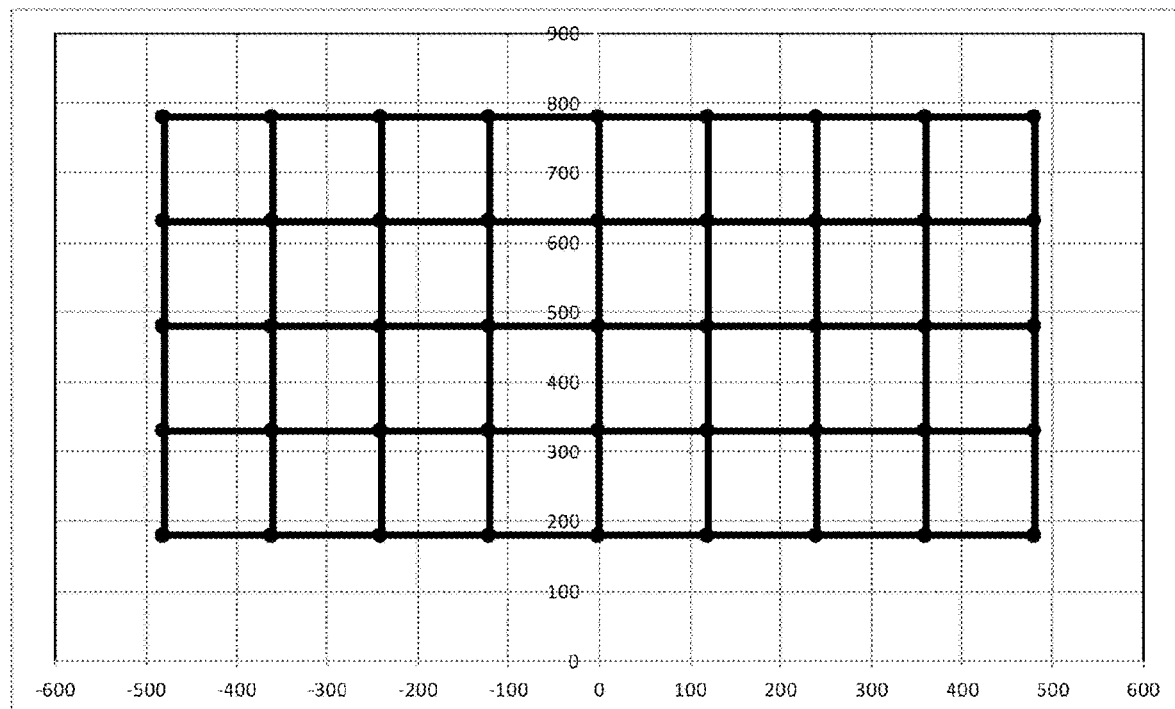
FIG. 15 shows a distortion lattice on the screen.
Figure 16:
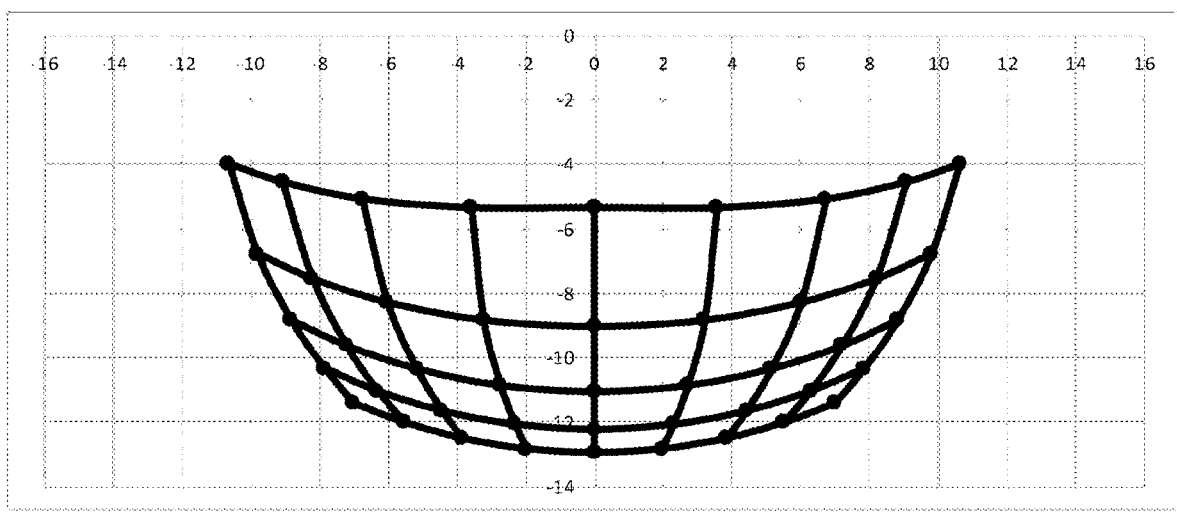
FIG. 16 shows the distortion lattice in a demagnifying-side image formation plane of the optical element.
Figure 17:
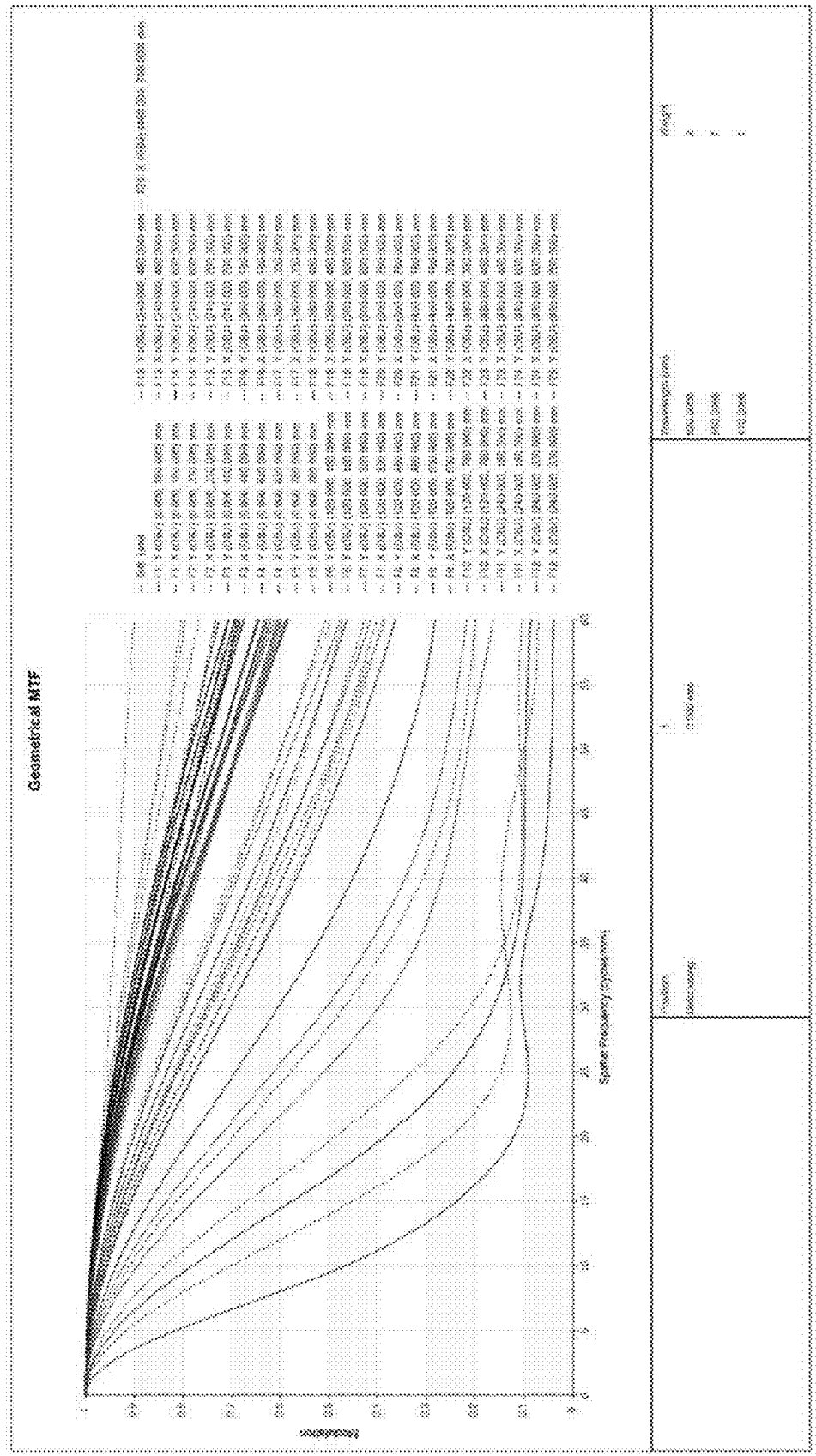
FIG. 17 shows magnifying-side MTFs of the optical element.

The projection image formed by the image formation section 2 will next be described. FIG. 15 shows a distortion lattice on the screen S. FIG. 16 shows the distortion lattice in the demagnifying-side image formation plane of the optical element 3. The distortion lattice in the demagnifying-side image formation plane of the optical element 3 is distorted but has no field curvature. The image formation section 2 forms a projection image that is an inverted final image turned upside down in the demagnifying-side image formation plane. The image formation section 2 forms an image so distorted in advance in the demagnifying-side image formation plane of the optical element 3 that an oblong projection image is projected on the screen S, which is the magnifying-side image formation plane. That is, the image formation section 2 forms a distorted projection image corresponding to the distortion lattice shown in FIG. 16 in the demagnifying-side image formation plane in such a way that a final image corresponding to the distortion lattice shown in FIG. 15 is projected on the screen S.

Optical Performance

Figure 18:
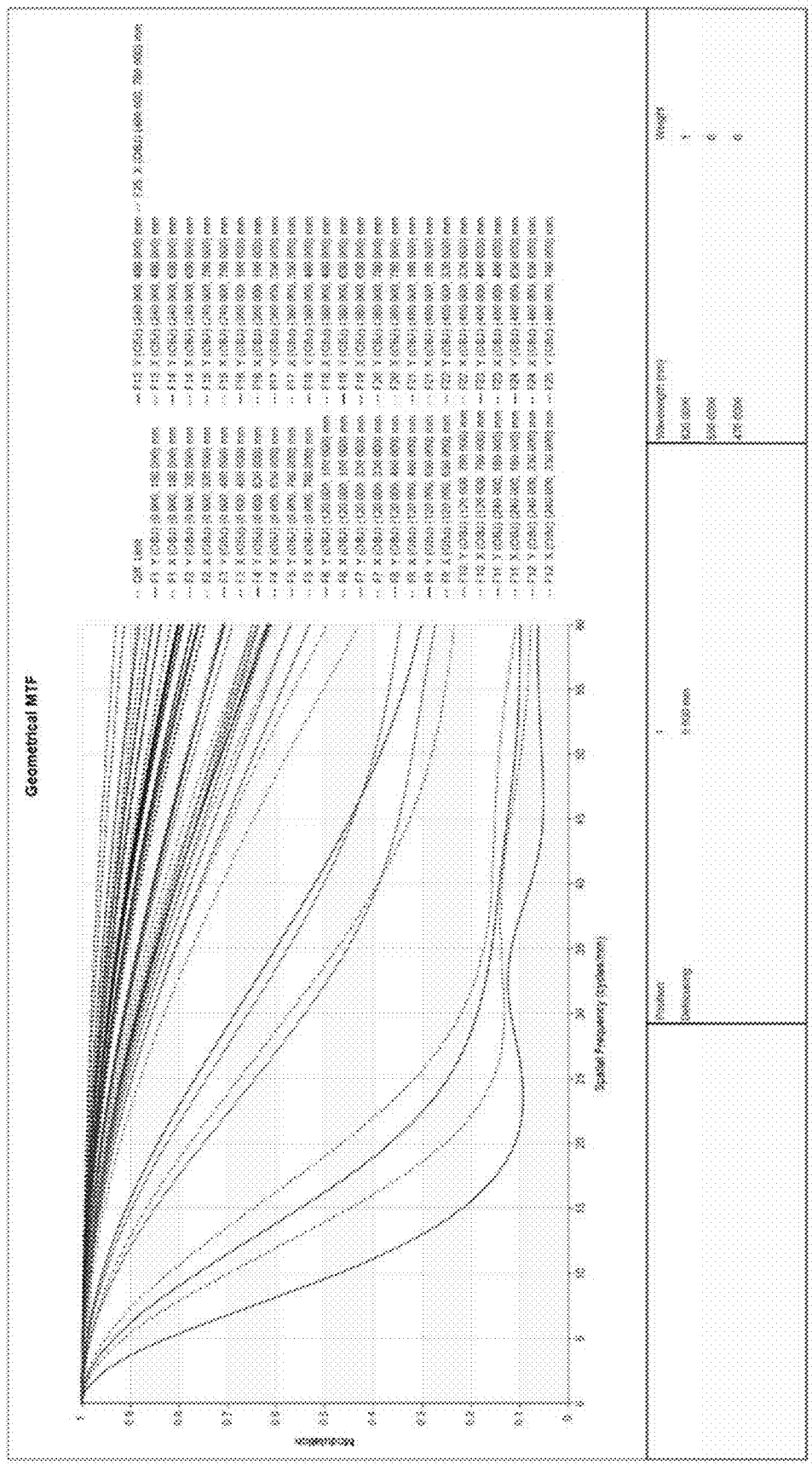
FIG. 18 shows the MTFs of the optical element that transmits red light rays.
Figure 19:
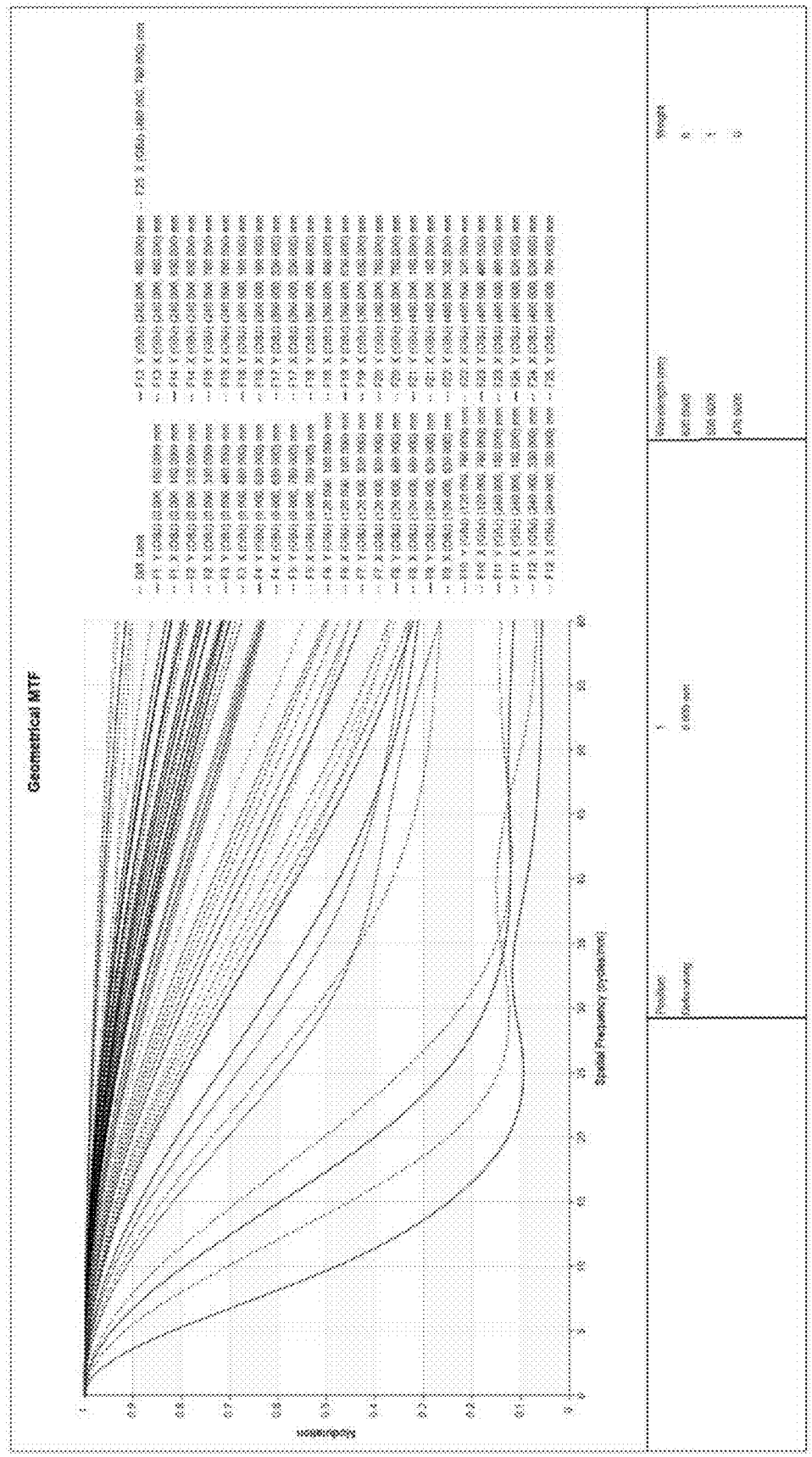
FIG. 19 shows the MTFs of the optical element that transmits green light rays.
Figure 20:
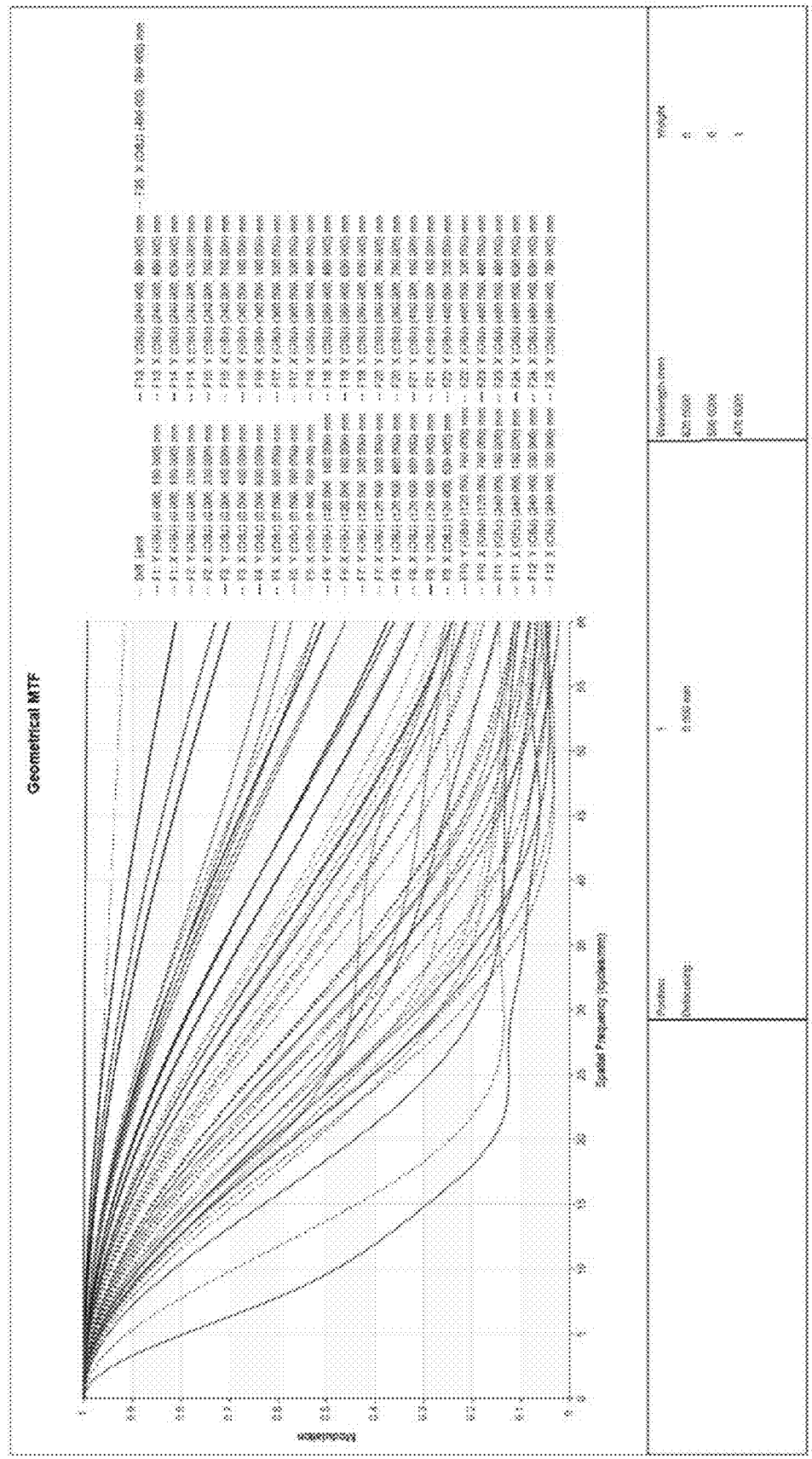
FIG. 20 shows the MTFs of the optical element that transmits blue light rays.

FIGS. 17 to 20 each show magnifying-side MTFs of the optical element 3 according to Comparative Example. The MTFs were calculated in the same manner as in Embodiment 1. Light rays used in the calculation of the MTFs are so weighted that the weighting ratio among light rays having the wavelength of 620 nm, light rays having the wavelength of 550 nm, and light rays having the wavelength of 470 nm is 2:7:1. In FIG. 18, the light rays used in the calculation of the MTFs are the light rays having the wavelength of 620 nm. In FIG. 19, the light rays used in the calculation of the MTFs are the light rays having the wavelength of 550 nm. In FIG. 20, the light rays used in the calculation of the MTFs are the light rays having the wavelength of 470 nm. Comparison between the MTFs of the optical element 3A according to Embodiment 1 shown in FIGS. 8 to 11 and the MTFs of the optical element 3 according to Comparative Embodiment shown in FIGS. 17 to 20 shows that the optical element 3A according to Example 1 suppresses a decrease in the resolution. That is, the optical element 3A according to Example 1, although the projection distance f is shortened to a value close to half of the projection distance of the optical element 3 according to Comparative Example, suppresses a decrease in the resolution and a decrease in the MTFs at each color and satisfactorily corrects chromatic aberrations.

Figure 21:
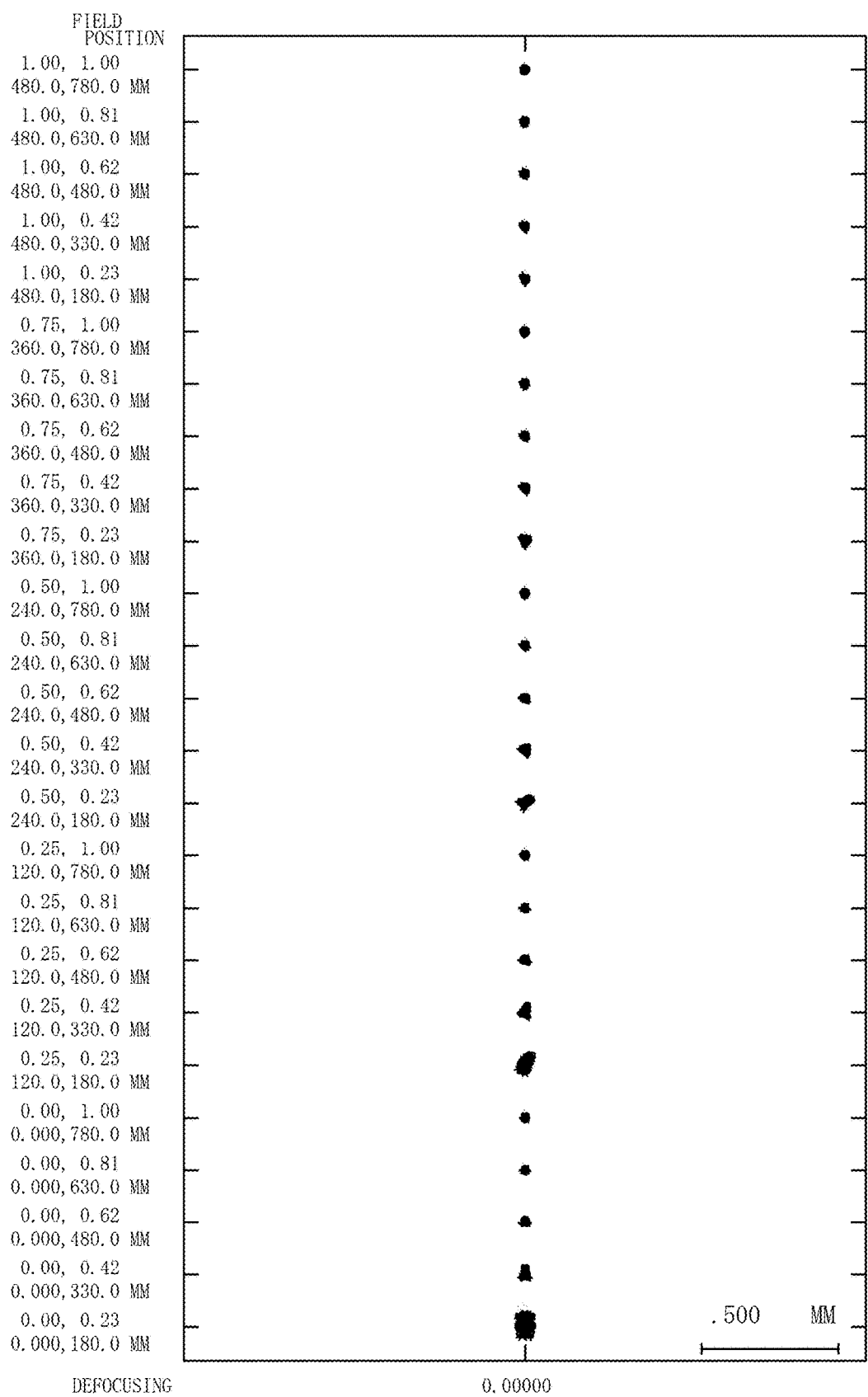
FIG. 21 is a spot diagram showing spots produced by the optical element.

FIG. 21 is a spot diagram showing spots produced by the optical element 3. The spot diagram of FIG. 21 shows larger spots than those in the spot diagram of the optical element 3A according to Embodiment 1 shown in FIG. 12. It is therefore shown that the optical element 3A according to Example 1 satisfactorily corrects the aberrations.

Example 2

Figure 22:
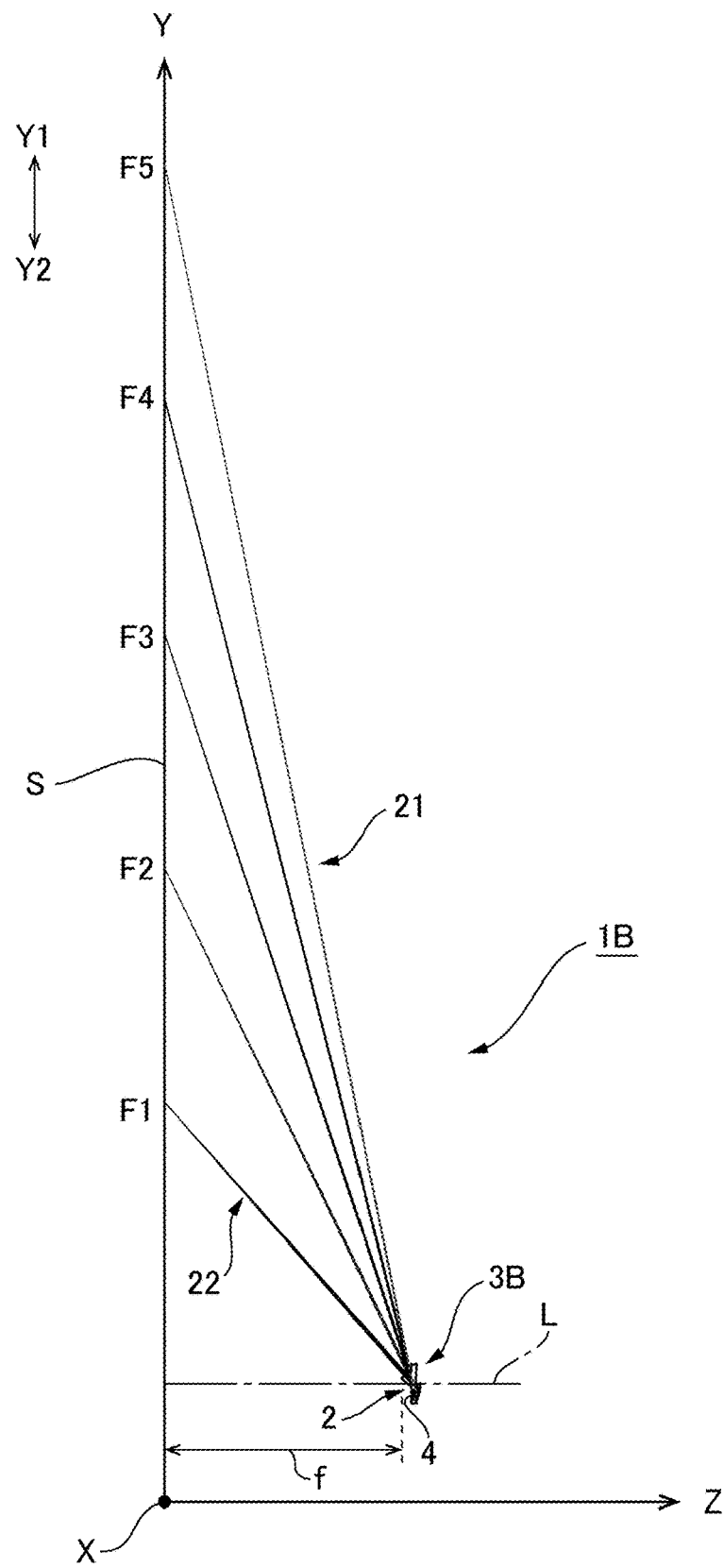
FIG. 22 is a light ray diagram showing the entirety of a projection-type image display apparatus according to Example 2.
Figure 23:
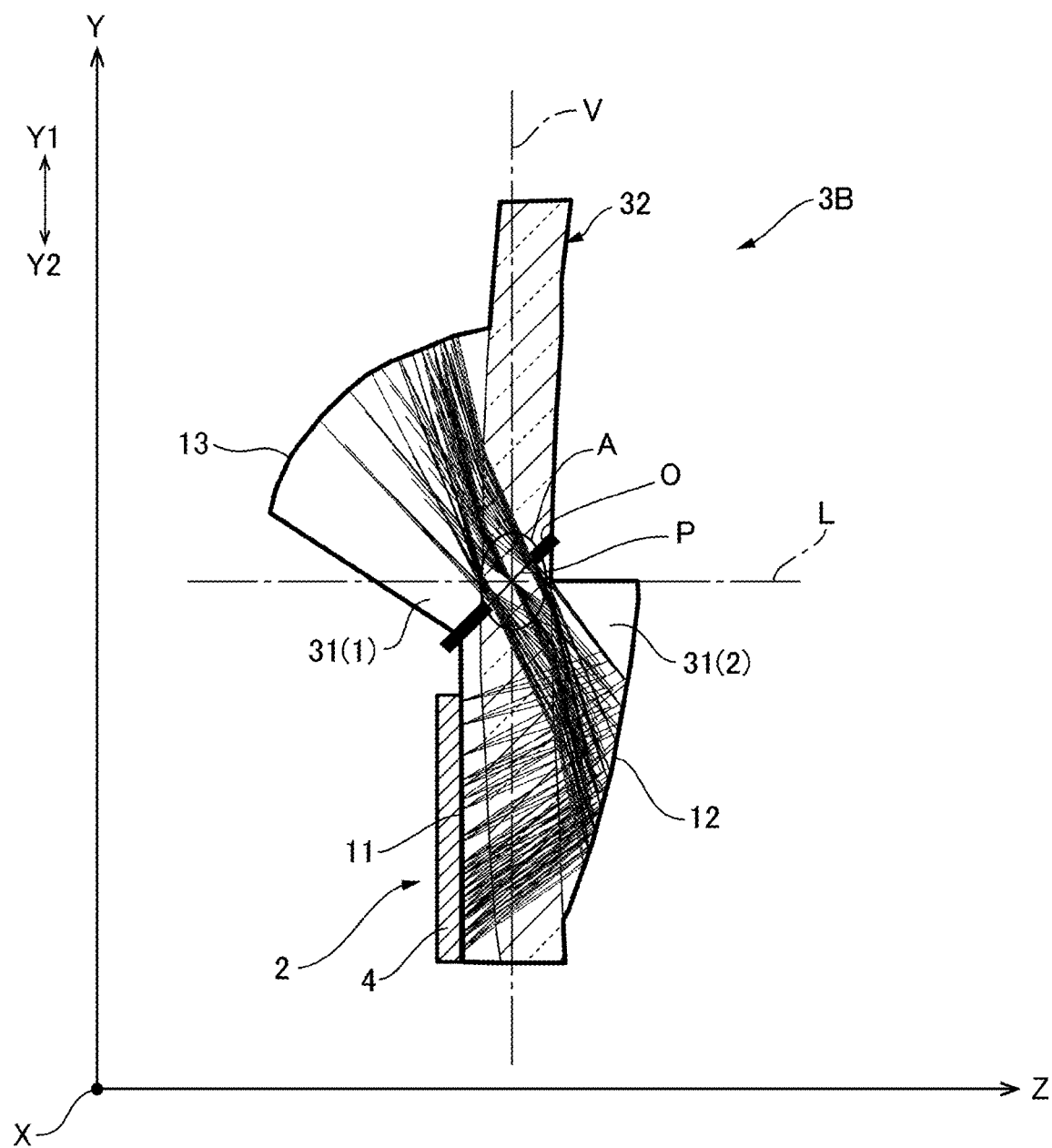
FIG. 23 is a light ray diagram showing light rays traveling through an optical element.
Figure 24:
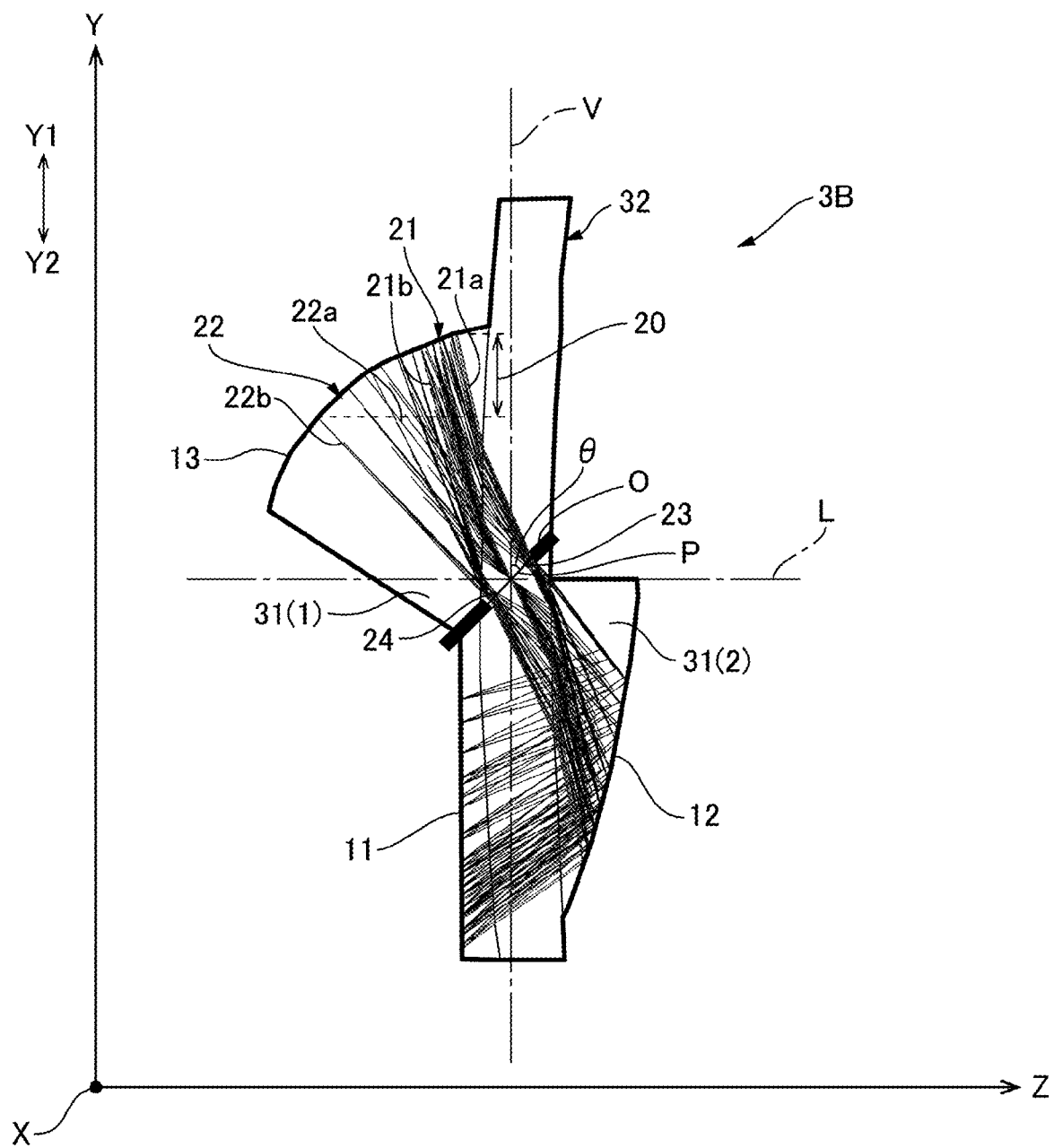
FIG. 24 describes the imaginary line specified in the optical element.

A projection-type image display apparatus according to Embodiment 2 will next be described. FIG. 22 is a light ray diagram showing the entire projection-type image display apparatus according to Example 2. FIG. 23 is a light ray diagram showing light rays traveling through an optical element. FIG. 24 describes the imaginary line P specified in the optical element. In a projection-type image display apparatus 1B according to the present example shown in FIGS. 22 to 24 each viewed along the direction parallel to the axis X, the imaginary line P specified in an optical element 3B inclines with respect to the imaginary vertical line V, but the other configurations are the same as those of the projection-type image display apparatus 1A according to Embodiment 1. Configurations corresponding to those of the projection-type image display apparatus 1A according to Embodiment 1 therefore have the same reference characters.

The projection-type image display apparatus 1B according to the present example includes the image formation section 2 and an optical element 3B, as shown in FIG. 22. The image formation section 2 is disposed on the magnifying side of the optical element 3B. The image formation section 2 includes a light source apparatus and a light modulator. The light modulator includes the liquid crystal light valve 4. The optical element 3B has the first transmissive surface 11, the reflective surface 12, and the second transmissive surface 13 sequentially arranged from the demagnifying side toward the magnifying side, as shown in FIG. 23. The liquid crystal light valve 4 is attached to the first transmissive surface 11. The projection image displayed on the liquid crystal light valve 4 travels via the first transmissive surface 11, the reflective surface 12, and the second transmissive surface 13 in the presented order and is projected on the screen S. A final image projected on the screen S has an oblong shape elongated in the lateral direction. The aspect ratio of the final image is 16:10. Also in the present example, the imaginary axis L extending in the axis-Z direction is set. The imaginary axis L is a reference axis used in the design of the optical element 3B. In the present example, the imaginary axis L is perpendicular to the screen S, which is the magnifying-side image formation plane. It is noted that the imaginary axis L is not in some case perpendicular to the screen S.

The first transmissive surface 11 and the reflective surface 12 are located at the lower side Y2 of the imaginary axis L. The second transmissive surface 13 is located at the upper side Y1 of the imaginary axis L. The reflective surface 12 has a concave shape. The reflective surface 12 therefore has positive power. The reflective surface 12 is provided by externally forming a reflective coating on the optical element 3B. The second transmissive surface 13 has a convex shape protruding toward the magnifying side. The second transmissive surface 13 therefore has positive power. The upper and lower halves of the optical element 3B are configured to be rotationally symmetric with respect to the imaginary axis L. That is, the first transmissive surface 11, the reflective surface 12, and the second transmissive surface 13 are so shaped that the cross-sectional shape of the optical element 3B in the plane YZ shown in FIG. 23 is rotated around the imaginary axis L over an angular range of 90° toward one side and the other side of the axis-X direction.

The imaginary line P can be specified in the optical element 3B, as shown in FIG. 24. The imaginary line P connects the upper intersection 23 to the lower intersection 24, the upper intersection 23 being the intersection where the upper peripheral light ray 21a of the upper-end light flux 21, which is the light ray passing through the axis-Y-direction upper end of the effective light ray range 20 of the second transmissive surface 13, and the upper peripheral light ray 22a of the lower-end light flux 22, which is the light ray passing through the axis-Y-direction lower end of the effective light ray range 20, intersect each other in the plane YZ, and the lower intersection 24 being the intersection where the lower peripheral light ray 21b of the upper-end light flux 21 and the lower peripheral light ray 22b of the lower-end light flux 22 intersect each other in the plane YZ.

In the present example, the imaginary line P inclines by 45° with respect to the imaginary vertical line V, which is perpendicular to the imaginary axis L in the plane YZ. That is, let θ be the inclination angle over which a side of the imaginary line P that is the side facing the upper intersection 23 rotates clockwise relative to the imaginary vertical line V around the intersection of the imaginary vertical line V and the imaginary line P, and θ=45°. It can also be said that the imaginary line P is the pupil of the optical element 3B in the plane YZ. Light rays having entered the optical element 3B gather at the imaginary line P or in the vicinity thereof. The light rays having entered the optical element 3B form a light flux the diameter of which is minimized in the area A in the vicinity of the imaginary line P.

The optical element 3B includes the first member section 31 and the second member section 32 having a refractive index different from that of the first member section 31 with the first member section 31 and the second member section 32 arranged along the optical path of the light rays having entered the optical element 3B. The first member section 31 includes the first first member section 31(1), which has the first transmissive surface 11 and the second transmissive surface 13, and the second first member section 31(2), which has the reflective surface 12. The second member section is located between the first first member section 31(1) and the second first member section 31(2) in the axis-Z direction. In the present example, the first member section 31 is made of resin. The second member section 32 is made of glass. The light rays having entered the optical element 3B form a light flux the diameter of which is minimized in the second member section 32, as shown in FIG. 23. That is, the area A, where the diameter of the light flux formed of the light rays having entered the optical element 3B is minimized, is in the second member section 32.

The second member section 32 as a whole has a disc-like shape. The second member section 32 has a convexly curved surface on the side facing the first first member section 31(1) and a concavely curved surface on the side facing the second first member section 31(2). The first first member section 31(1) is in close contact with one side of the second member section 32 in the axis-Z direction, and the second first member section 31(2) is in close contact with the other side of the second member section 32 in the axis-Z direction. A joint surface of the first first member section 31(1) and a joint surface of the second member section 32 that is the surface joined to the first first member section 31(1) therefore have curved shapes that conform to each other. In other words, the joint surface of the second member section 32 that is the surface joined to the first first member section 31(1) has a convexly curved shape. The joint surface of the first first member section 31(1) that is the surface joined to the second member section 32 has a concavely curved shape that conforms to the convexly curved shape of the second member section 32. The joint surface of the second member section 32 that is the surface joined to the second first member section 31(2) has a concavely curved shape. The joint surface of the second first member section 31(2) that is the surface joined to the second member section 32 has a convexly curved shape that conforms to the concavely curved shape of the second member section 32.

The first member section 31 and the second member section 32 differ from each other in terms of refractive index. The joint surface at which the second member section 32 is joined to the first first member section 31(1) has the curved shape, and the joint surface at which the second member section 32 is joined to the second first member section 31(2) has the curved shape. The optical element 3B therefore has power at the joint surface at which the second member section 32 is joined to the first first member section 31(1) and the joint surface at which the second member section 32 is joined to the second first member section 31(2).

The first member section 31 and the second member section 32 further differ from each other in terms of material and therefore differ from each other in terms of heat resistance. That is, the second member section 32 has high heat resistance as compared with the first member section 31.

The optical element 3B is provided with the stop O. The imaginary line P is defined by the light flux restricted by the stop O. The stop O is provided along the imaginary line P. The stop O is provided, for example, by dividing the optical element 3B along the imaginary line P, applying black ink for light blocking purposes onto the division surfaces, and then bonding the divided pieces of the optical element 3B to each other into the single optical element 3B. The stop O only needs to be formed by using a member capable of blocking part of the light flux that passes through the optical element 3B and is not necessarily formed by using black ink.

As a method for joining the first member section 31 and the second member section 32 to each other, it is desirable to join the two member sections to each other by using an adhesive having a refractive index close to that of the material of which the first member section 31 is made or the material of which the second member section 32 is made. Such an adhesive can minimize an effect thereof on the refractive index. Further, using an adhesive allows the two member sections to be readily joined to each other, resulting in excellent productivity of the optical element 3B.

Lens Data

Lens data on the optical element 3B are as follows. The surfaces of the optical element 3B are numbered sequentially from the magnifying side toward the demagnifying side. A surface having a surface number with * is an aspheric surface. The surface numbers 1 and 8 each represent a dummy surface. The surface number 2 represents the second transmissive surface 13. The surface number 6 represents the reflective surface 12. The surface number 10 represents the image plane and the first transmissive surface 11. The surface number 4 represents the stop.

The surface number 3 represents the joint surface at which the first first member section 31(1) and the second member section 32 are joined to each other. The surface number 5 represents the joint surface at which the second member section 32 and the second first member section 31(2) are joined to each other. The surface number 7 represents the joint surface at which the second first member section 31(2) and the second member section 32 are joined to each other. The surface number 9 represents the joint surface at which the second member section 32 and the first first member section 31(1) are joined to each other. The surfaces labeled with the surface numbers 3 and 9 therefore have shapes that conform to each other. The surfaces labeled with the surface numbers 5 and 7 also have shapes that conform to each other. Reference character r denotes the radius of curvature in millimeters. Reference character d denotes the on-axis inter-surface distance in millimeters. Reference character nd denotes the refractive index. Reference character vd denotes the Abbe number. Reference character Y denotes the effective radius in the axis-Y direction. Reference character X denotes the effective radius in the axis-X direction.

| Surface number | r | d | nd | vd | Y | X |
|---|---|---|---|---|---|---|
| Object plane | 0 | 154.925192 | | | | |
| 1 | 0 | 5 | | | 69.425 | 69.425 |
| 2* | 18.82405 | 7.363655 | 1.531132 | 55.75 | 7.944 | 7.944 |
| 3 | 114.06501 | 1 | 1.652022 | 54.8 | 3.027 | 3.027 |
| 4 Stop | 0 | 1.418853 | 1.652022 | 54.8 | 1 | 1 |
| 5 | 135.13244 | 2.965778 | 1.531132 | 55.75 | 4.008 | 4.008 |
| 6* | −2.99674 | −2.965778 | 1.531132 | 55.75 | 9.263 | 9.263 |
| 7 | 135.13244 | −1.418853 | 1.652022 | 54.8 | 9.793 | 9.793 |
| 8 | 0 | −1 | 1.652022 | 54.8 | 11.039 | 11.039 |
| 9 | 114.06501 | −0.75 | 1.531132 | 55.75 | 11.344 | 11.344 |
| Image plane | 0 | 0 | 1.531132 | 55.75 | 12.36 | 12.36 |

The on-axis inter-surface distance d between the object plane and the surface number 2 is the projection distance f of the projection-type image display apparatus 1B shown in FIG. 22. In the present example, f=159.925192 mm.

In the present example, the decenter & return α in the fields of the surface number 4 is −45°. That is, the pupil inclines by 45° with respect to the imaginary vertical line V perpendicular to the optical axis in the plane YZ.

Data on the aspheric surface labeled with the surface numbers 2, that is, the second transmissive surface 13 are as follows.

| Conic constant | 1.955731E+00 |
|---|---|
| Fourth-order coefficient | 2.044439E−03 |
| Sixth-order coefficient | −4.294058E−05 |
| Eighth-order coefficient | 5.347737E−07 |
| Tenth-order coefficient | −1.556296E−09 |

Data on the aspheric surface labeled with the surface numbers 6, that is, the reflective surface 12 are as follows.

| Conic constant | −6.290221E+01 |
|---|---|
| Fourth-order coefficient | −2.237771E−04 |
| Sixth-order coefficient | 2.377462E−06 |
| Eighth-order coefficient | −1.60976E−08 |
| Tenth-order coefficient | 4.747946E−11 |

Projection Image

Figure 25:
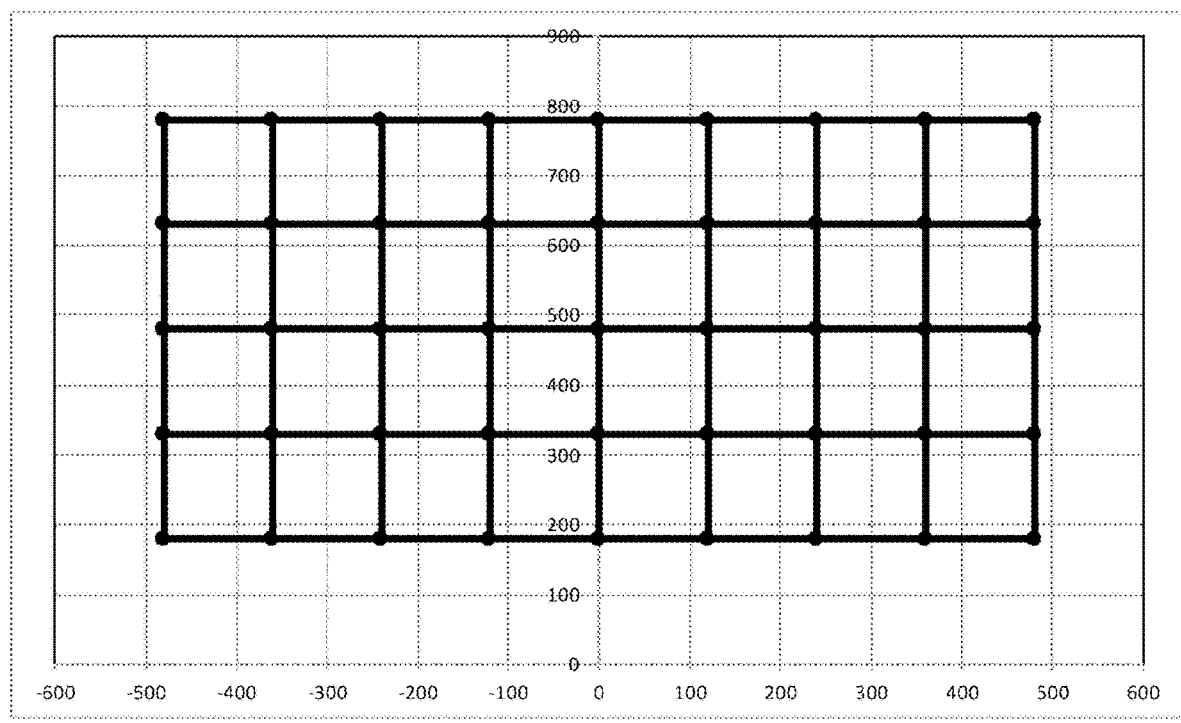
FIG. 25 shows a distortion lattice on the screen.
Figure 26:
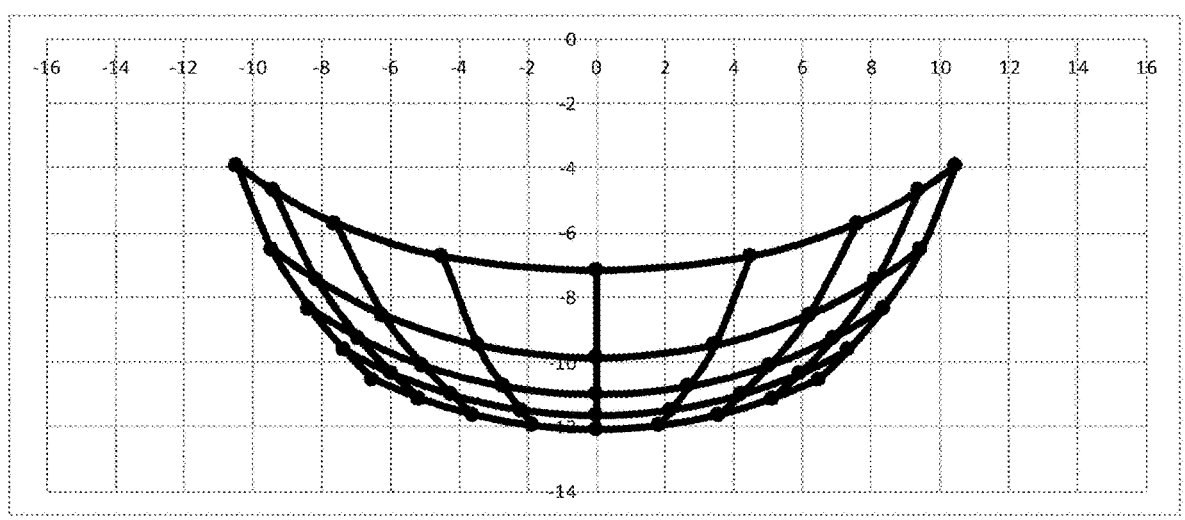
FIG. 26 shows the distortion lattice in a demagnifying-side image formation plane of the optical element.
Figure 27:
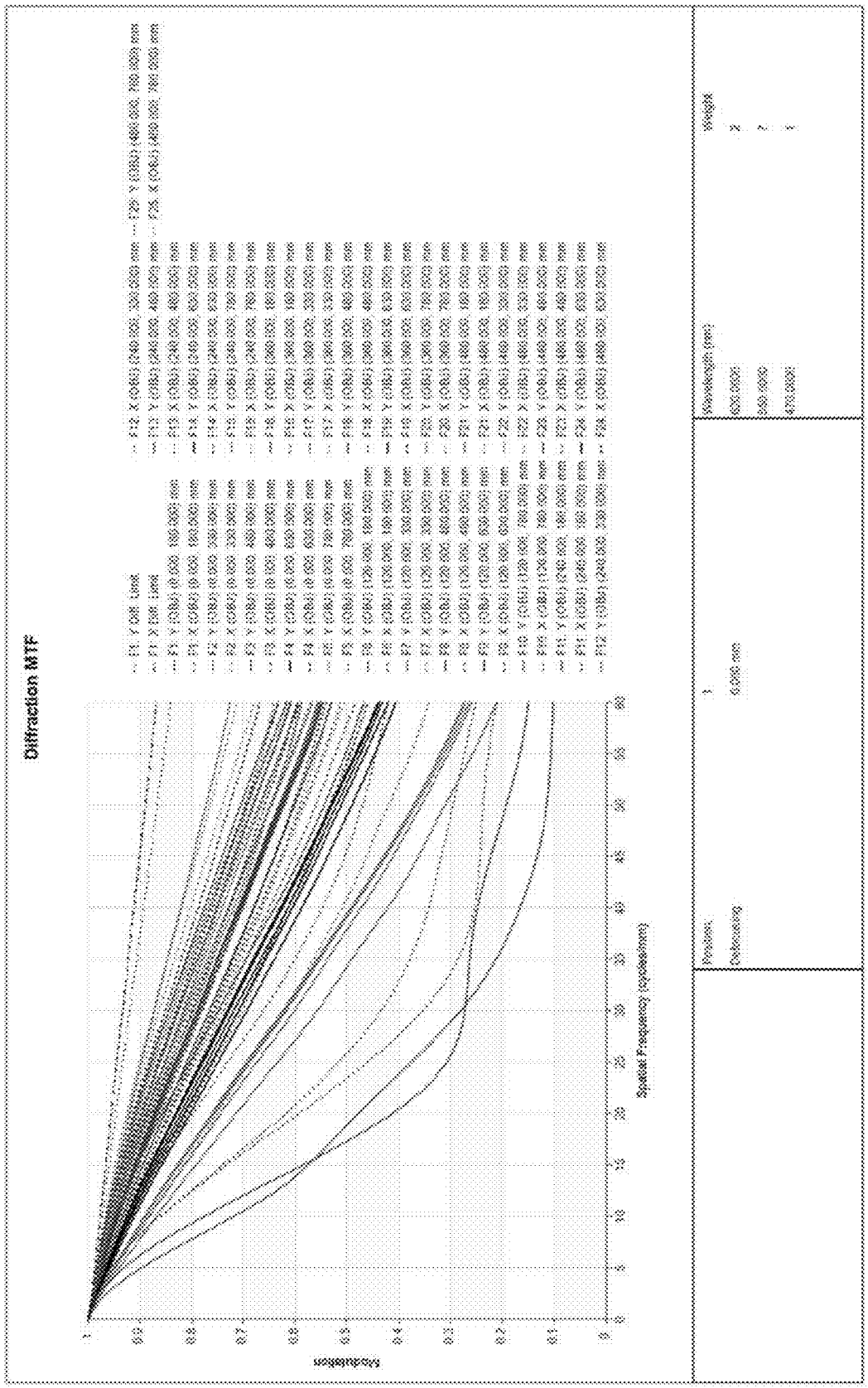
FIG. 27 shows magnifying-side MTFs of the optical element.

The projection image formed by the image formation section 2 will next be described. FIG. 25 shows a distortion lattice on the screen S. FIG. 26 shows the distortion lattice in the demagnifying-side image formation plane of the optical element 3B. The distortion lattice in the demagnifying-side image formation plane is distorted but has no field curvature.

The image formation section 2 forms a projection image that is an inverted final image turned upside down in the demagnifying-side image formation plane. The image formation section 2 forms an image so distorted in advance in the demagnifying-side image formation plane of the optical element 3B that an oblong projection image is projected on the screen S, which is the magnifying-side image formation plane. More specifically, the image formation section 2 forms a distorted projection image corresponding to the distortion lattice shown in FIG. 26 in the demagnifying-side image formation plane in such a way that a final image corresponding to the distortion lattice shown in FIG. 25 is projected on the screen S. The projection image has a shape that allows reduction in trapezoidal distortion of the final image formed on the screen S and having the ideal oblong shape. That is, the projection image has distortion opposite the trapezoidal distortion of the final image. The projection image is therefore so formed that the shortest edge thereof is the edge having the largest image height on the screen S.

Effects

In the projection-type image display apparatus 1B according to the present example, the optical element 3B has the concave reflective surface 12 and the convex second transmissive surface 13 protruding toward the magnifying side. The optical element 3B therefore allows the light flux reflected off the reflective surface 12 to be refracted by the second transmissive surface 13. The focal length of the optical element 3B, that is, the projection distance is therefore readily shortened.

In the optical element 3B, the reflective surface 12 labeled with the surface number 6 and the second transmissive surface 13 labeled with the surface number 2 are each an aspheric surface. Further, the surface numbers 3, 5, 7, and 9 represent joint surfaces at which the first member section 31 and the second member section 32 having different refractive indices are joined to each other and which each have a curved shape. Aberrations produced by the optical element 3B can therefore be suppressed.

Figure 28:
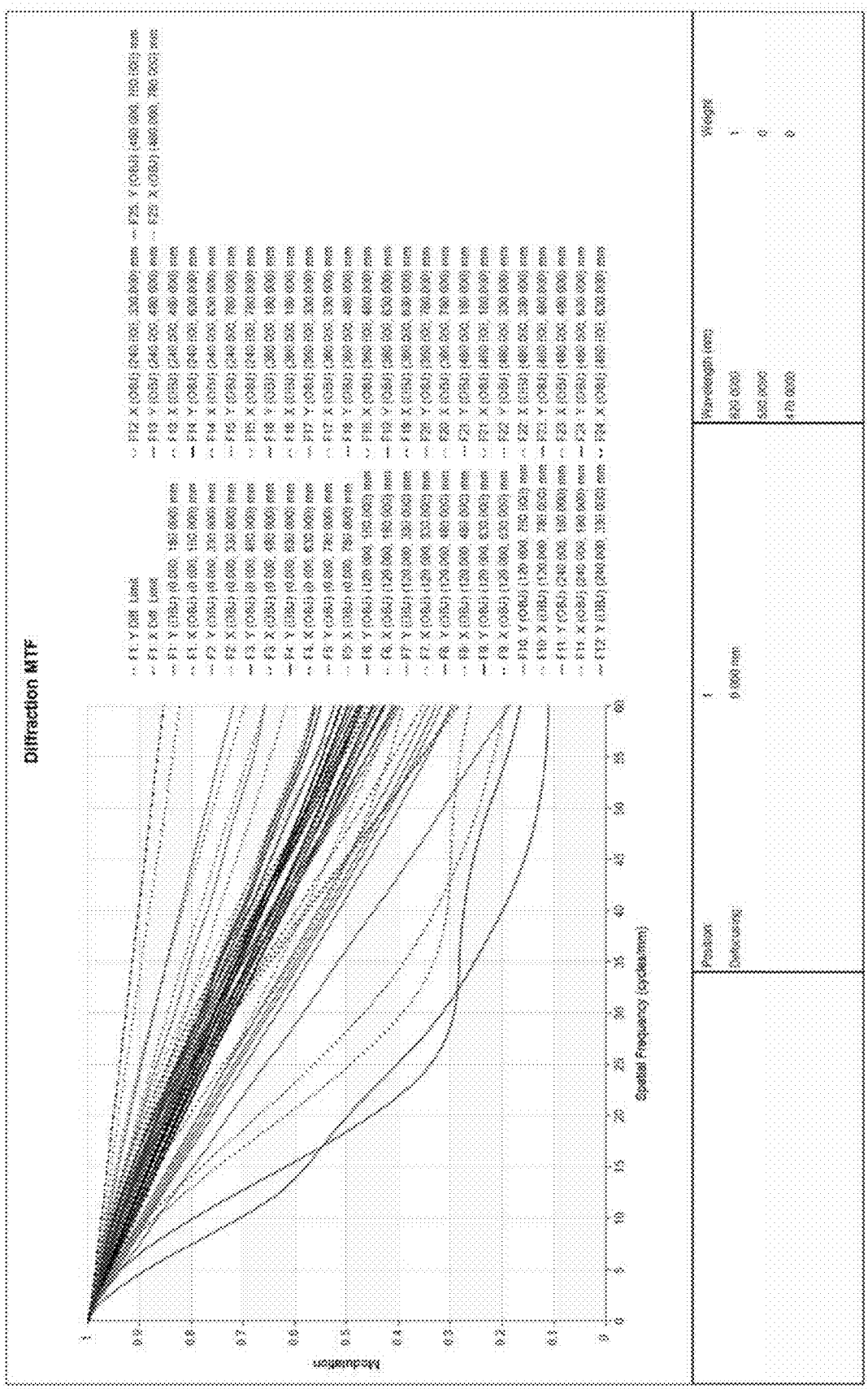
FIG. 28 shows the MTFs of the optical element that transmits red light rays.
Figure 29:
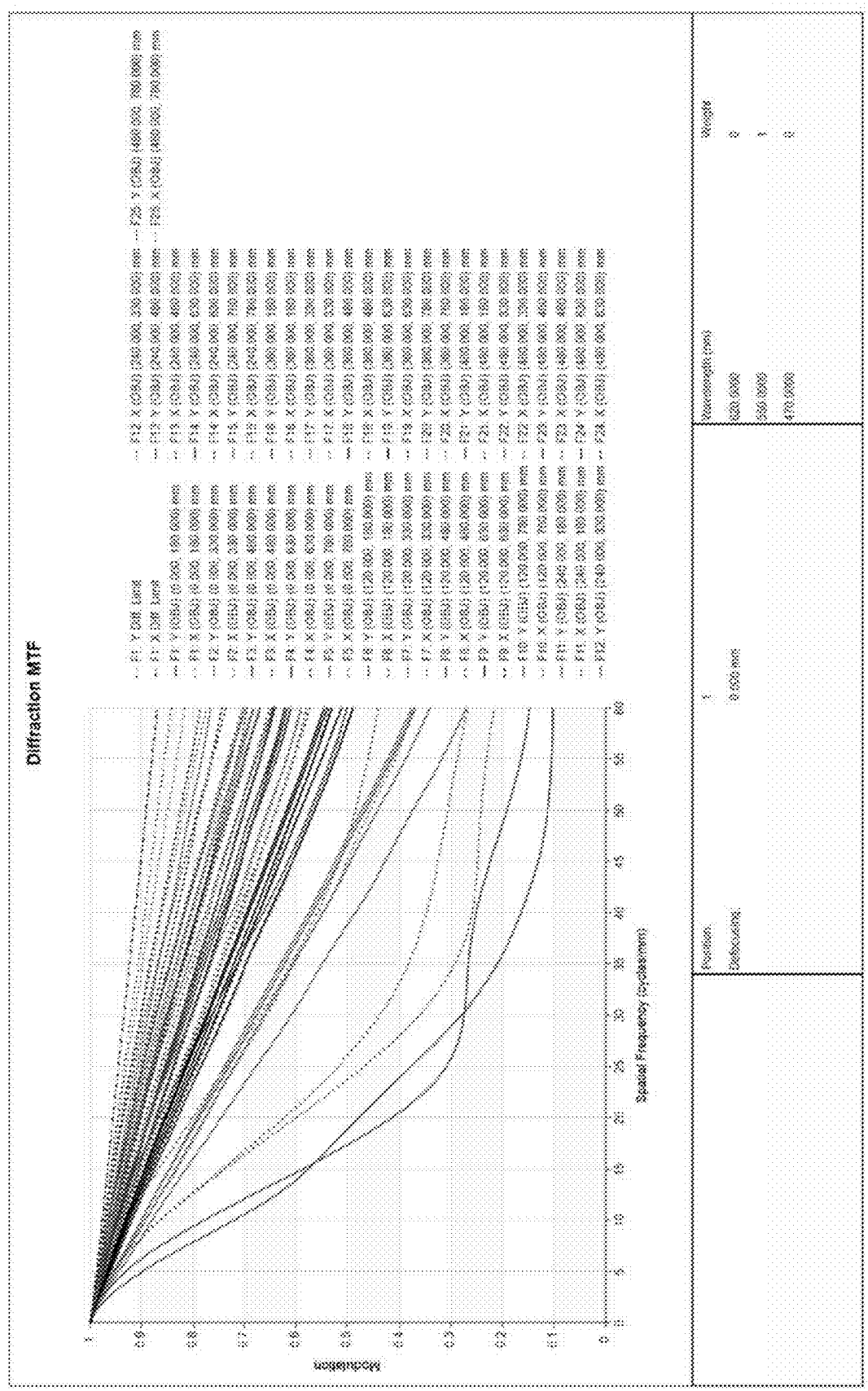
FIG. 29 shows the MTFs of the optical element that transmits green light rays.
Figure 30:
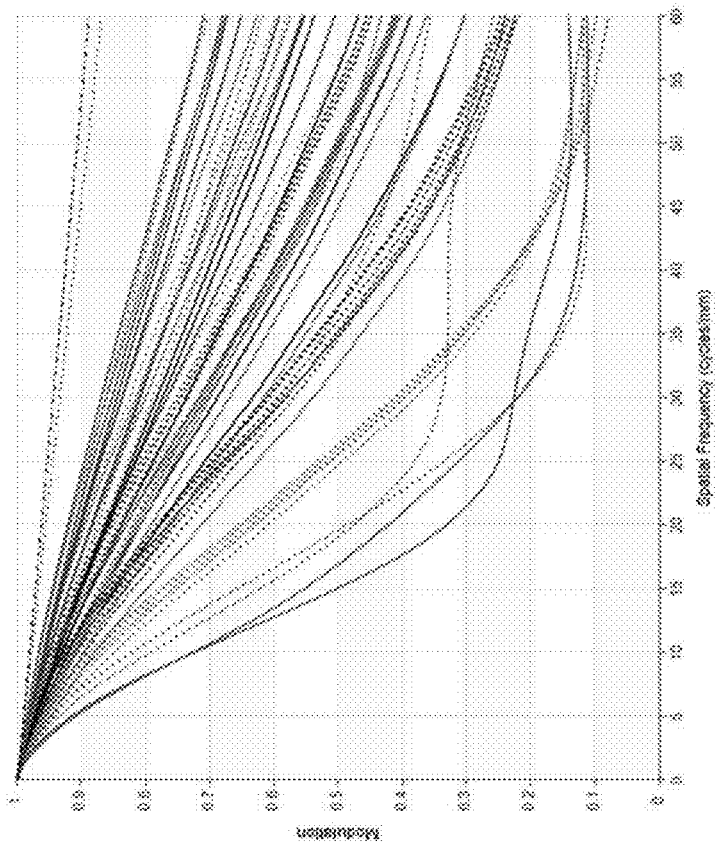
FIG. 30 shows the MTFs of the optical element that transmits blue light rays.

FIGS. 27 to 30 each show magnifying-side MTFs of the optical element 3B. The MTFs were calculated in the same manner as in Embodiment 1. Light rays used in the calculation of the MTFs are so weighted that the weighting ratio among light rays having the wavelength of 620 nm, light rays having the wavelength of 550 nm, and light rays having the wavelength of 470 nm is 2:7:1. In FIG. 28, the light rays used in the calculation of the MTFs are the light rays having the wavelength of 620 nm. In FIG. 29, the light rays used in the calculation of the MTFs are the light rays having the wavelength of 550 nm. In FIG. 30, the light rays used in the calculation of the MTFs are the light rays having the wavelength of 470 nm. Comparison between the MTFs of the optical element 3B according to Embodiment 2 shown in FIGS. 27 to 30 and the MTFs of the optical element 3 according to Comparative Embodiment shown in FIGS. 17 to 20 shows that a decrease in the resolution is suppressed, that a decrease in MTFs at each of the colors is also suppressed, and that chromatic aberrations are satisfactorily corrected in the present example.

Figure 31:
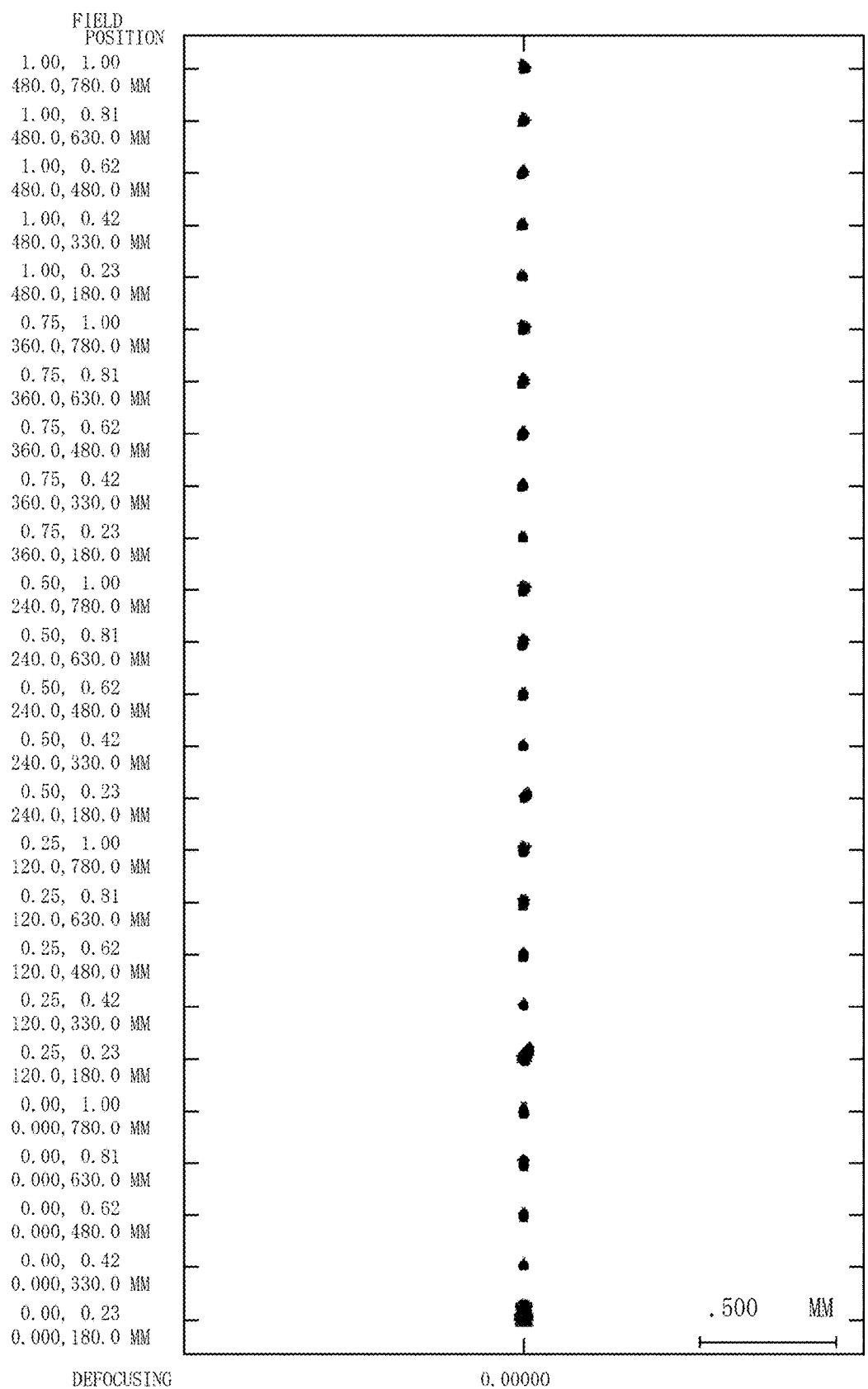
FIG. 31 is a spot diagram showing spots produced by the optical element.

FIG. 31 is a spot diagram showing spots produced by the optical element 3B. The spot diagram of FIG. 31 shows smaller spots than those in the spot diagram of the optical element 3 according to Comparative Embodiment shown in FIG. 21. The optical element 3B according to the present example therefore satisfactorily corrects the aberrations.

In the present example, since the imaginary line P inclines with respect to the imaginary vertical line V, the lower-end light flux 22 passing through the lower end of the effective light ray range 20 of the second transmissive surface 13 is not blocked but reaches the screen S.

Further, in the present example, since the imaginary line P inclines with respect to the imaginary vertical line V, a decrease in the amount of light at the upper periphery of the screen S can be suppressed, as compared with the case where the imaginary line P is parallel to the imaginary vertical line V. That is, when the imaginary line P inclines with respect to the imaginary vertical line V, the divergence angle θ0 of the light flux that reaches an upper portion of the screen S increases, as compared with the case where the imaginary line P is parallel to the imaginary vertical line V. The amount of light that reaches the upper portion of the screen S therefore increases.

Further, when the divergence angle θ0 of the light flux that reaches the upper portion of the screen S increases, the difference between the divergence angle θ0 of the light flux that reaches the upper portion of the screen S and the divergence angle θ0 of the light flux that reaches a lower portion of the screen S decreases. A decrease in the amount of light at the upper periphery of the screen S from the amount of light at the lower periphery of the screen S can therefore be suppressed.

Data on the divergence angles θ0 of the light fluxes F1 to F5, which reach the respective image heights on the screen S, will be shown below. θ1 represents the angle of the lower peripheral light ray of each of the light fluxes F1 to F5 and is the angle at which the lower peripheral light ray of each of the light fluxes F1 to F5 intersects the screen S. θ2 represents the angle of the upper peripheral light ray of each of the light fluxes F1 to F5 and is the angle at which the upper peripheral light ray of each of the light fluxes F1 to F5 intersects the screen S. θ0 represents the divergence angle and is the difference between θ2 and θ1. R represents the divergence angle ratio. The divergence angle ratio is the ratio of a divergence angle to the divergence angle of the light flux F1, which has the largest divergence angle and is assumed to be 100.

| Light flux | θ1 | θ2 | θ0 | R |
|---|---|---|---|---|
| F1 | 46.5746429 | 47.22633394 | 0.651691046 | 100% |
| F2 | 62.84771996 | 63.17197987 | 0.324259913 | 50% |
| F3 | 70.63511466 | 70.82752067 | 0.192406008 | 30% |
| F4 | 75.03642019 | 75.16673718 | 0.130316996 | 20% |
| F5 | 77.83369223 | 77.92962315 | 0.095930919 | 15% |

In the present example, the divergence angle θ0 of the light flux F5, which reaches the largest image height position, is 15% of the divergence angle θ0 of the light flux F1, which reaches the smallest image height position. The divergence angle θ0 of the light flux F4, which reaches the second largest image height position, is 20% of the divergence angle θ0 of the light flux F1, which reaches the smallest image height position. The divergence angle θ0 of the light flux F3, which reaches the third largest image height position, is 30% of the divergence angle θ0 of the light flux F1, which reaches the smallest image height position. The divergence angle θ0 of the light flux F4, which reaches the fourth largest image height position, is 50% of the divergence angle θ0 of the light flux F1, which reaches the smallest image height position. The values described above are greater than those when the imaginary line P is perpendicular to the imaginary axis L, that is, those in the projection-type image display apparatus 1A according to Embodiment 1. The amount of light flux that reaches the upper portion of the screen S therefore increases. Further, a decrease in the amount of light at the upper periphery of the screen S from the amount of light at the lower periphery of the screen S can be suppressed.

The optical element 3B includes the first member section 31 made of resin and the second member section 32 made of glass arranged along the optical path of the light rays that enter the optical element 3B. The area A, where the diameter of the light flux formed of the light rays having entered the optical element 3B is minimized, is located in the second member section 32. That is, in the optical element 3B, the area A, which is likely to be heated due to the increase in the optical density in the optical element 3B, is made of a material having high heat resistance. The situation in which the heated portion of the optical element 3B undergoes thermal expansion and therefore causes degradation in optical performance of the optical element 3B can therefore be suppressed or avoided.

Further, in the optical element 3B, the first first member section 31(1) is provided with the aspheric second transmissive surface 13, and the second first member section 31(2) is provided with the aspheric reflective surface 12. The optical element 3B can therefore be readily provided with the aspheric second transmissive surface 13 and the aspheric reflective surface 12 as compared with the case where a member section made of glass is provided with the aspheric surfaces.

Example 3

Figure 32:
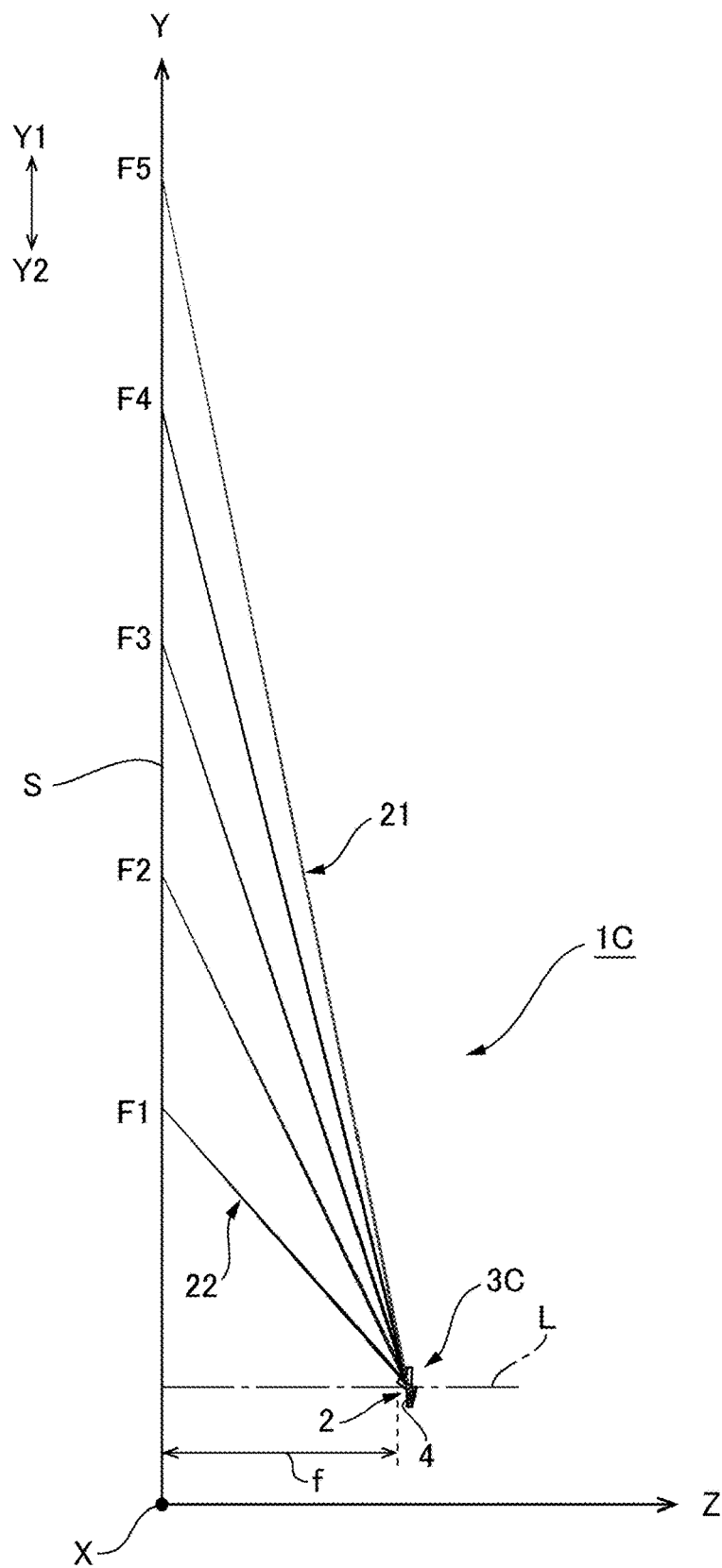
FIG. 32 is a light ray diagram showing the entirety of a projection-type image display apparatus according to Example 3.
Figure 33:
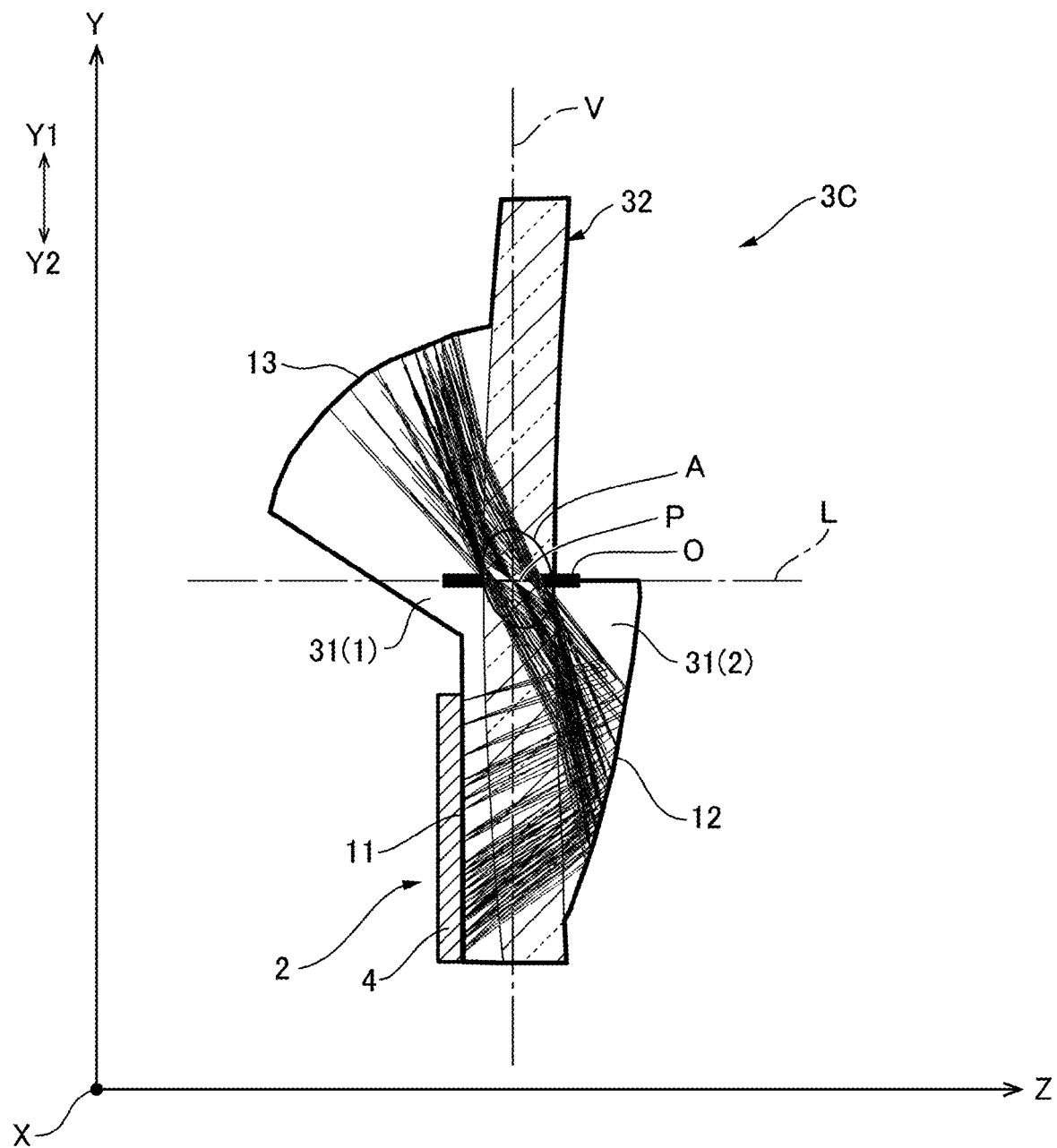
FIG. 33 is a light ray diagram showing light rays traveling through an optical element of the projection-type image display apparatus according to Example 3.
Figure 34:
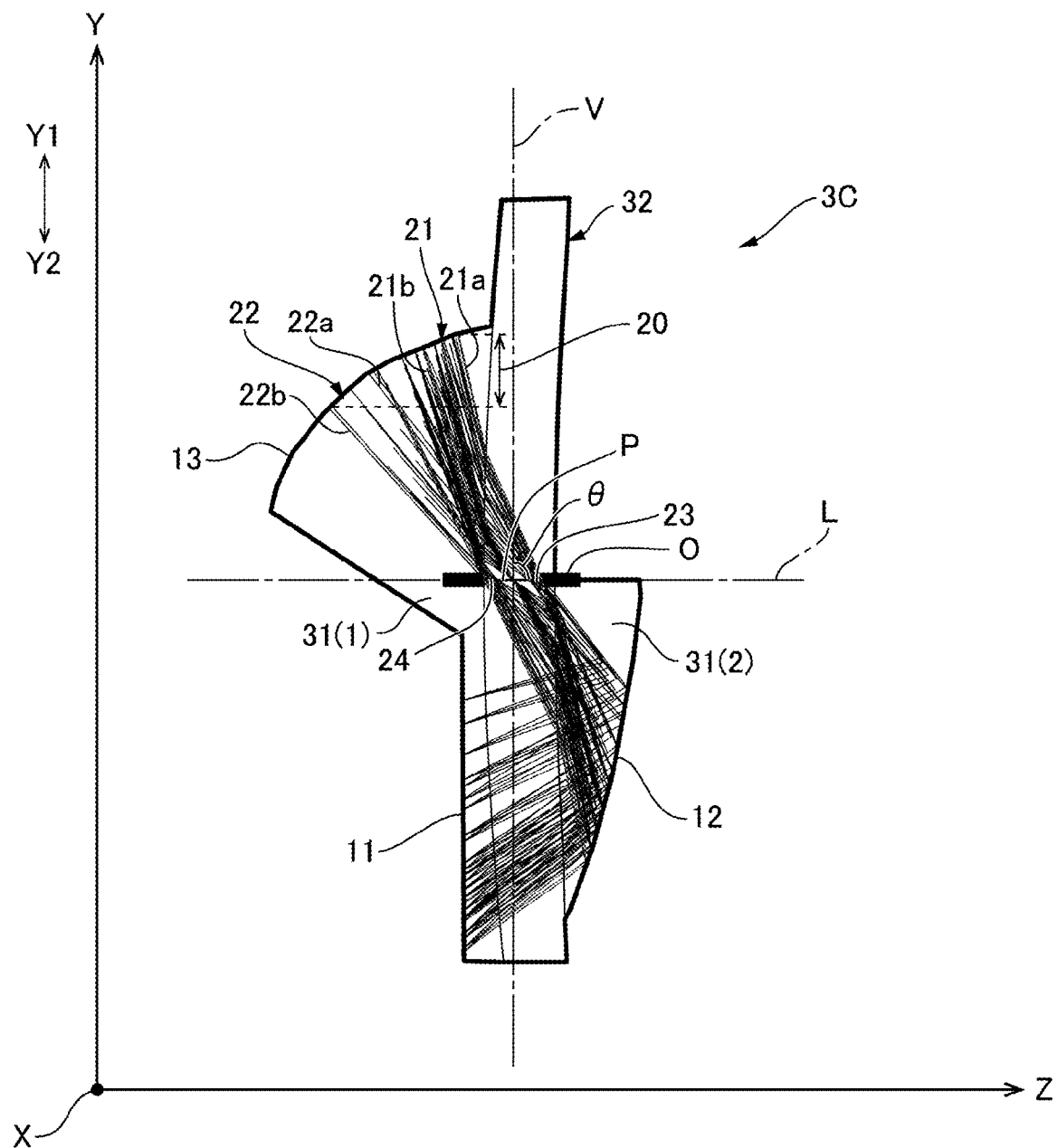
FIG. 34 describes the imaginary line specified in the optical element.

A projection-type image display apparatus 1C according to Embodiment 3 will next be described. FIG. 32 is a light ray diagram showing the entire projection-type image display apparatus 1C according to Example 3. FIG. 33 is a light ray diagram showing light rays traveling through an optical element of the projection-type image display apparatus 1C according to Example 3. FIG. 34 describes the imaginary line P specified in the optical element. In the projection-type image display apparatus 1C according to the present example shown in FIGS. 32 to 34 each viewed along the direction parallel to the axis X, the imaginary line P specified in an optical element 3C inclines with respect to the imaginary vertical line V, but the other configurations are the same as those of the projection-type image display apparatus 1A according to Embodiment 1. Configurations corresponding to those of the projection-type image display apparatus 1A according to Embodiment 1 therefore have the same reference characters and will not be described.

The imaginary line P can be specified in the optical element 3C, as shown in FIG. 34. The imaginary line P connects the upper intersection 23 to the lower intersection 24, the upper intersection 23 being the intersection where the upper peripheral light ray 21a of the upper-end light flux 21, which is the light ray passing through the axis-Y-direction upper end of the effective light ray range 20 of the second transmissive surface 13, and the upper peripheral light ray 22a of the lower-end light flux 22, which is the light ray passing through the axis-Y-direction lower end of the effective light ray range 20, intersect each other in the plane YZ, and the lower intersection 24 being the intersection where the lower peripheral light ray 21b of the upper-end light flux 21 and the lower peripheral light ray 22b of the lower-end light flux 22 intersect each other in the plane YZ.

In the present example, the imaginary line P inclines by 90° with respect to the imaginary vertical line V, which is perpendicular to the imaginary axis L in the plane YZ. That is, let θ be the inclination angle over which a side of the imaginary line P that is the side facing the upper intersection 23 rotates clockwise relative to the imaginary vertical line V around the intersection of the imaginary vertical line V and the imaginary line P, and θ=90°. It can also be said that the imaginary line P is the pupil of the optical element 3C in the plane YZ. Light rays having entered the optical element 3C gather at the imaginary line P or in the vicinity thereof. The light rays having entered the optical element 3C form a light flux the diameter of which is minimized in the area A in the vicinity of the imaginary line P.

The optical element 3C includes the first member section 31 and the second member section 32 having a refractive index different from that of the first member section 31 with the first member section 31 and the second member section 32 arranged along the optical path of the light rays having entered the optical element 3C. The first member section 31 includes the first first member section 31(1), which has the first transmissive surface 11 and the second transmissive surface 13, and the second first member section 31(2), which has the reflective surface 12. The second member section is located between the first first member section 31(1) and the second first member section 31(2) in the axis-Z direction. In the present example, the first member section 31 is made of resin. The second member section 32 is made of glass. The light rays having entered the optical element 3C form a light flux the diameter of which is minimized in the second member section 32, as shown in FIG. 33. That is, the area A, where the diameter of the light flux formed of the light rays having entered the optical element 3C is minimized, is in the second member section 32.

Lens Data

Lens data on the optical element 3C are as follows. The surfaces of the optical element 3C are numbered sequentially from the magnifying side toward the demagnifying side. A surface having a surface number with * is an aspheric surface. The surface numbers 1 and 8 each represent a dummy surface. The surface number 2 represents the second transmissive surface 13. The surface number 6 represents the reflective surface 12. The surface number 10 represents the image plane and the first transmissive surface 11. The surface number 4 represents the stop.

The surface number 3 represents the joint surface at which the first first member section 31(1) and the second member section 32 are joined to each other. The surface number 5 represents the joint surface at which the second member section 32 and the second first member section 31(2) are joined to each other. The surface number 7 represents the joint surface at which the second first member section 31(2) and the second member section 32 are joined to each other. The surface number 9 represents the joint surface at which the second member section 32 and the first first member section 31(1) are joined to each other. The surfaces labeled with the surface numbers 3 and 9 therefore have shapes that conform to each other. The surfaces labeled with the surface numbers 5 and 7 also have shapes that conform to each other. Reference character r denotes the radius of curvature in millimeters. Reference character d denotes the on-axis intersurface distance in millimeters. Reference character nd denotes the refractive index. Reference character vd denotes the Abbe number. Reference character Y denotes the effective radius in the axis-Y direction. Reference character X denotes the effective radius in the axis-X direction.

| Surface number | r | d | nd | vd | Y | X |
|---|---|---|---|---|---|---|
| Object plane | 0 | 154.925192 | | | | |
| 1 | 0 | 5 | | | 69.425 | 69.425 |
| 2* | 18.82405 | 7.363655 | 1.531132 | 55.75 | 7.944 | 7.944 |
| 3 | 114.06501 | 1 | 1.652022 | 54.8 | 3.027 | 3.027 |
| 4 Stop | 0 | 1.418853 | 1.652022 | 54.8 | 1 | 1 |
| 5 | 135.13244 | 2.965778 | 1.531132 | 55.75 | 4.008 | 4.008 |
| 6* | −2.99674 | −2.965778 | 1.531132 | 55.75 | 9.263 | 9.263 |
| 7 | 135.13244 | −1.418853 | 1.652022 | 54.8 | 9.793 | 9.793 |
| 8 | 0 | −1 | 1.652022 | 54.8 | 11.039 | 11.039 |
| 9 | 114.06501 | −0.75 | 1.531132 | 55.75 | 11.344 | 11.344 |
| Image plane | 0 | 0 | 1.531132 | 55.75 | 12.36 | 12.36 |

The on-axis inter-surface distance d between the object plane and the surface number 2 is the projection distance f of the projection-type image display apparatus 1C shown in FIG. 32. In the present example, f=159.925192 mm.

In the present example, the decenter & return α in the fields of the surface number 4 is −90°. That is, the pupil inclines by 90° with respect to the imaginary vertical line V perpendicular to the optical axis in the plane YZ.

Data on the aspheric surface labeled with the surface numbers 2, that is, the second transmissive surface 13 are as follows.

| | |
|---|---|
| Conic constant | 1.955731E+00 |
| Fourth-order coefficient | 2.044439E−03 |
| Sixth-order coefficient | −4.294058E−05 |
| Eighth-order coefficient | 5.347737E−07 |
| Tenth-order coefficient | −1.556296E−09 |

Data on the aspheric surface labeled with the surface numbers 6, that is, the reflective surface 12 are as follows.

| | |
|---|---|
| Conic constant | −6.290221E+01 |
| Fourth-order coefficient | −2.237771E−04 |
| Sixth-order coefficient | 2.377462E−06 |
| Eighth-order coefficient | −1.60976E−08 |
| Tenth-order coefficient | 4.747946E−11 |

Projection Image

Figure 35:
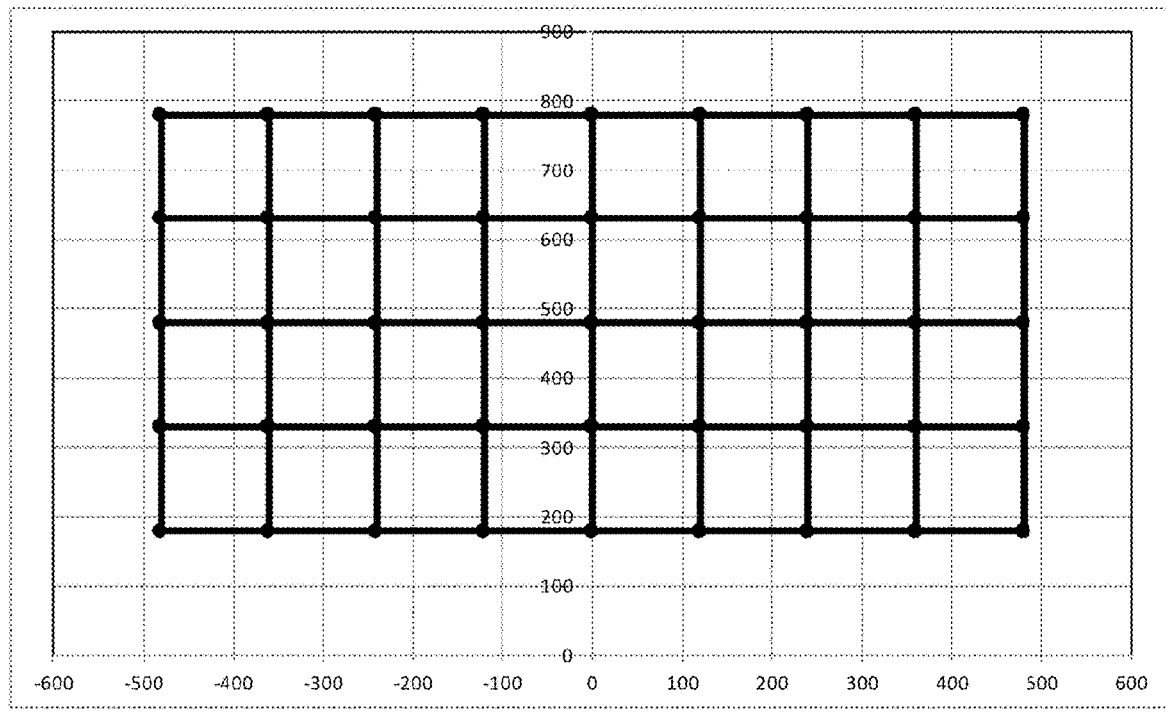
FIG. 35 shows a distortion lattice on the screen.
Figure 36:
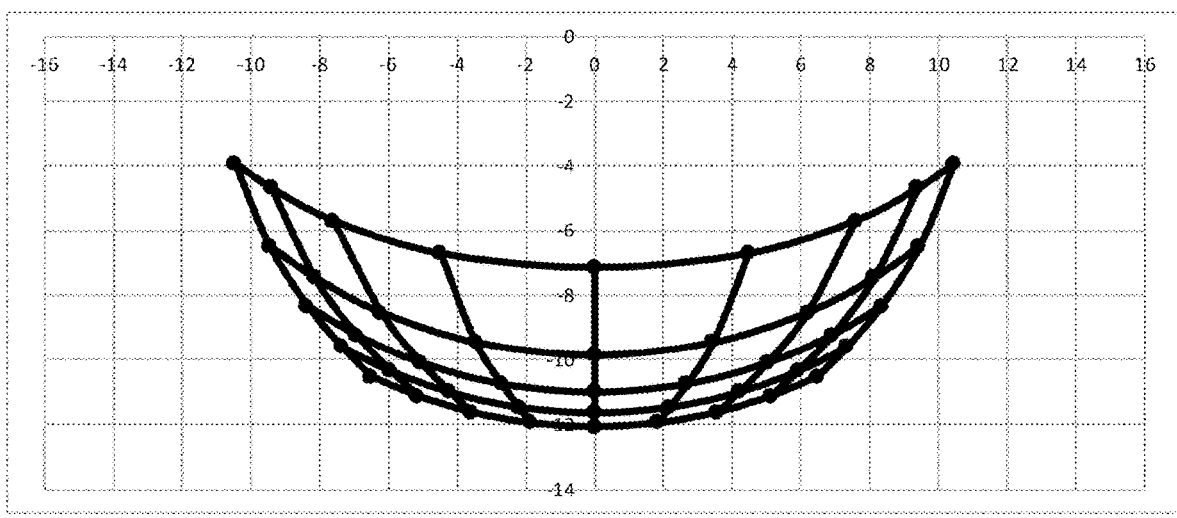
FIG. 36 shows the distortion lattice in a demagnifying-side image formation plane of the optical element.
Figure 37:
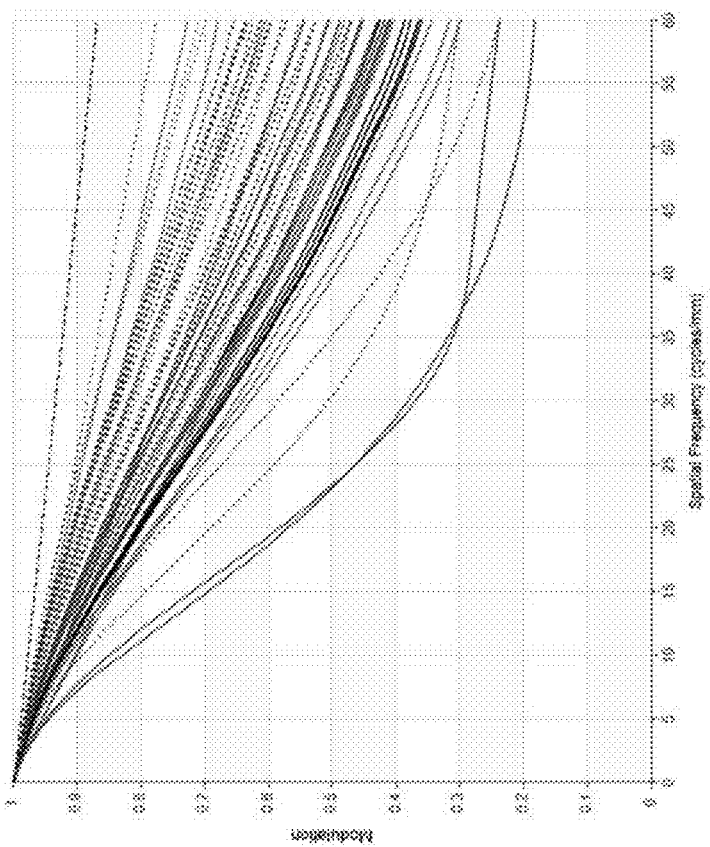
FIG. 37 shows magnifying-side MTFs of the optical element.

The projection image formed by the image formation section 2 will next be described. FIG. 35 shows a distortion lattice on the screen S. FIG. 36 shows the distortion lattice in the demagnifying-side image formation plane of the optical element 3C. The distortion lattice in the demagnifying-side image formation plane is distorted but has no field curvature.

The image formation section 2 forms a projection image that is an inverted final image turned upside down in the demagnifying-side image formation plane. The image formation section 2 forms an image so distorted in advance in the demagnifying-side image formation plane of the optical element 3C that an oblong projection image is projected on the screen S, which is the magnifying-side image formation plane. More specifically, the image formation section 2 forms a distorted projection image corresponding to the distortion lattice shown in FIG. 36 in the demagnifying-side image formation plane in such a way that a final image corresponding to the distortion lattice shown in FIG. 35 is projected on the screen S. The projection image has a shape that allows reduction in trapezoidal distortion of the final image formed on the screen S and having the ideal oblong shape. That is, the projection image has distortion opposite the trapezoidal distortion of the final image. The projection image is therefore so formed that the shortest edge thereof is the edge having the largest image height on the screen S.

Effects

In the projection-type image display apparatus 1C according to the present example, the optical element 3C has the concave reflective surface 12 and the convex second transmissive surface 13 protruding toward the magnifying side. The optical element 3C therefore allows the light flux reflected off the reflective surface 12 to be refracted by the second transmissive surface 13. The focal length of the optical element 3C, that is, the projection distance is therefore readily shortened.

In the optical element 3C, the reflective surface 12 labeled with the surface number 6 and the second transmissive surface 13 labeled with the surface number 2 are each an aspheric surface. Further, the surface numbers 3, 5, 7, and 9 represent joint surfaces at which the first member section 31 and the second member section 32 having different refractive indices are joined to each other and which each have a curved shape. The optical element 3C can therefore suppress produced aberrations, suppress a decrease in MTFs at each of the colors, and satisfactorily correct chromatic aberrations.

Figure 38:
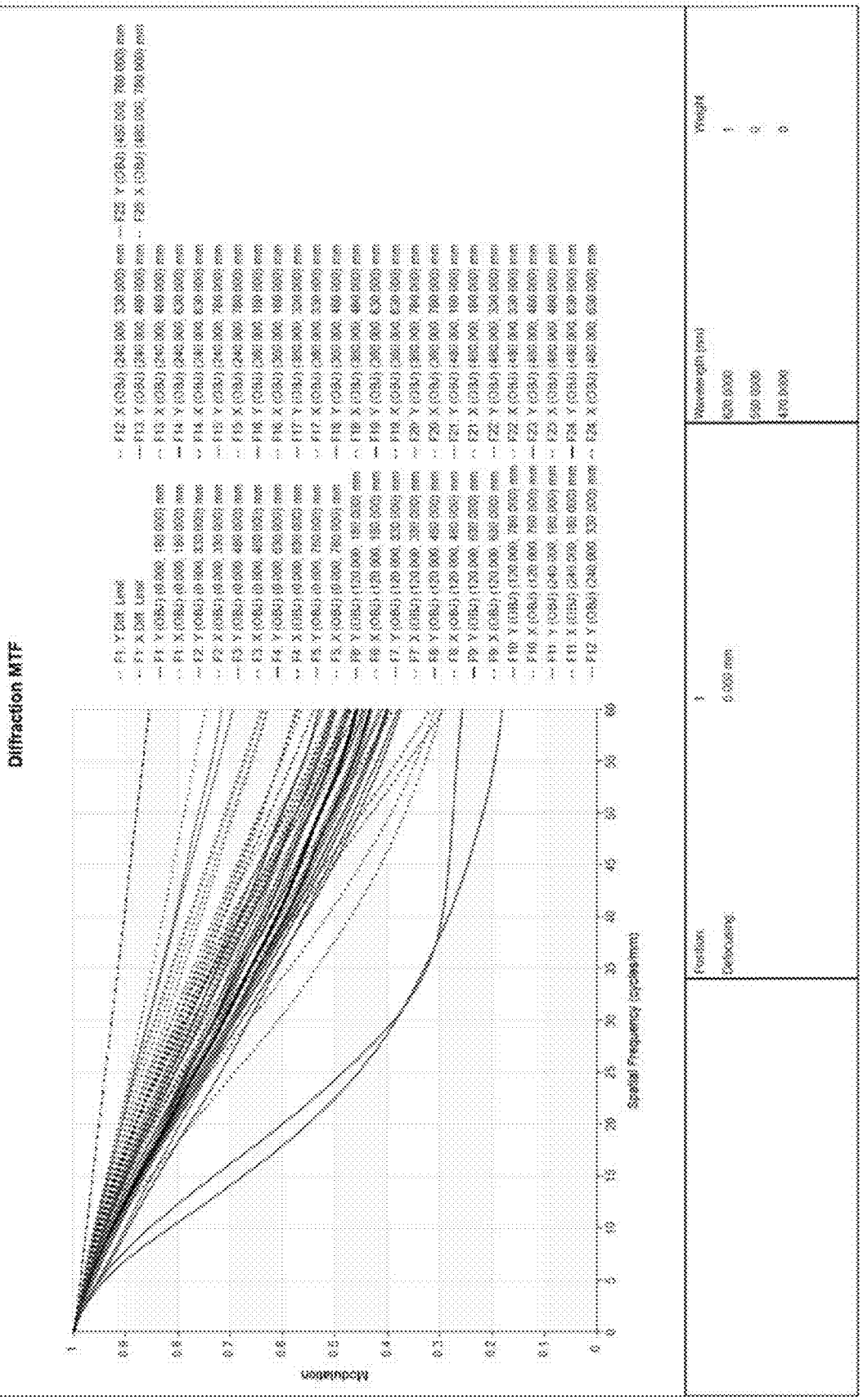
FIG. 38 shows the MTFs of the optical element that transmits red light rays.
Figure 39:
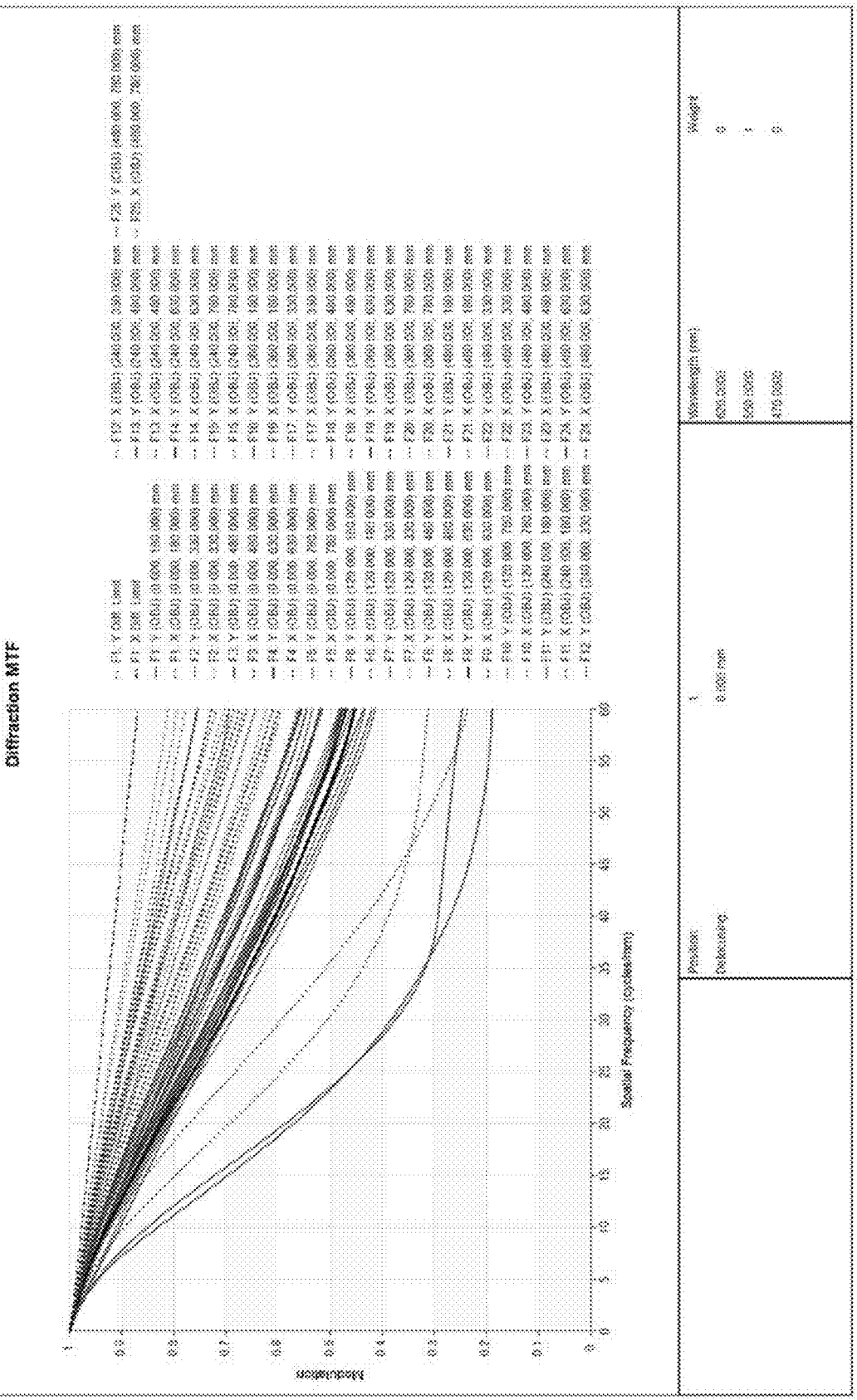
FIG. 39 shows the MTFs of the optical element that transmits green light rays.
Figure 40:
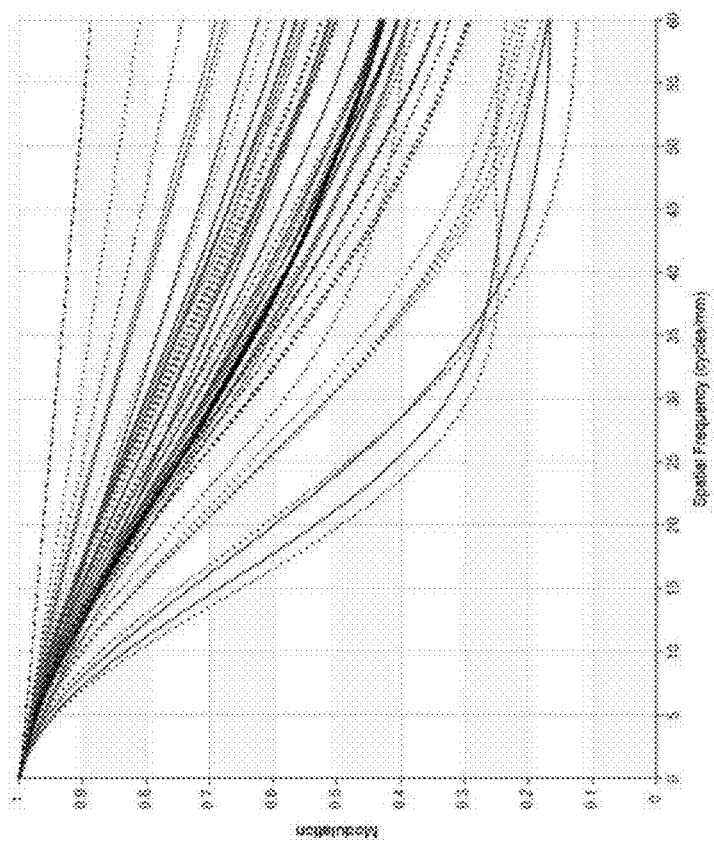
FIG. 40 shows the MTFs of the optical element that transmits blue light rays.

FIGS. 37 to 40 each show magnifying-side MTFs of the optical element 3C. The MTFs were calculated in the same manner as in Embodiment 1. Light rays used in the calculation of the MTFs are so weighted that the weighting ratio among light rays having the wavelength of 620 nm, light rays having the wavelength of 550 nm, and light rays having the wavelength of 470 nm is 2:7:1. In FIG. 38, the light rays used in the calculation of the MTFs are the light rays having the wavelength of 620 nm. In FIG. 39, the light rays used in the calculation of the MTFs are the light rays having the wavelength of 550 nm. In FIG. 40, the light rays used in the calculation of the MTFs are the light rays having the wavelength of 470 nm. Comparison between the MTFs of the optical element 3C according to Embodiment 3 shown in FIGS. 37 to 40 and the MTFs of the optical element 3 according to Comparative Embodiment shown in FIGS. 17 to 20 shows that a decrease in the resolution is suppressed in the present example.

Figure 41:
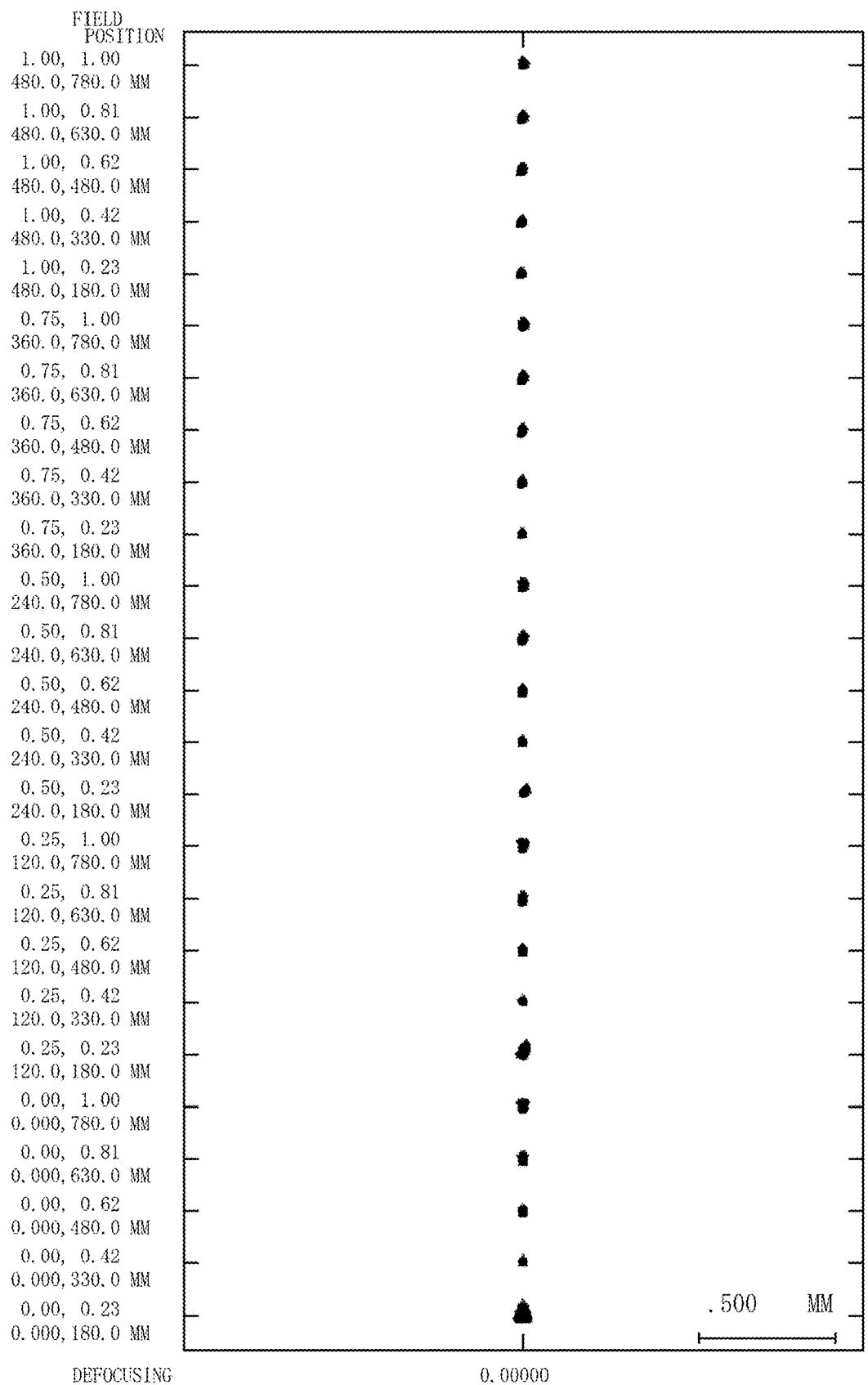
FIG. 41 is a spot diagram showing spots produced by the optical element.

FIG. 41 is a spot diagram showing spots produced by the optical element 3C. The spot diagram of FIG. 41 shows smaller spots than those in the spot diagram of the optical element 3 according to Comparative Embodiment shown in FIG. 21. The optical element 3C according to the present example therefore satisfactorily corrects the aberrations.

In the present example, since the imaginary line P inclines with respect to the imaginary vertical line V, the lower-end light flux 22 passing through the lower end of the effective light ray range 20 of the second transmissive surface 13 is not blocked but reaches the screen S. Further, since the imaginary line P inclines with respect to the imaginary vertical line V, a decrease in the amount of light at the upper periphery of the screen S can be suppressed, as compared with the case where the imaginary line P is parallel to the imaginary vertical line V. Further, when the divergence angle θ0 of the light flux that reaches the upper portion of the screen S increases, the difference between the divergence angle θ0 of the light flux that reaches the upper portion of the screen S and the divergence angle θ0 of the light flux that reaches the lower portion of the screen S decreases. A decrease in the amount of light at the upper periphery of the screen S from the amount of light at the lower periphery of the screen S can therefore be suppressed.

In addition to the above, in the optical element 3C according to the present example, the imaginary line P inclines with respect to the imaginary vertical line V by 90° or greater. The divergence angle θ0 of the light flux F1, which reaches the lower portion of the screen S, therefore decreases. As a result, the difference in the divergence angle θ0 between the light flux that reaches the upper portion of the screen S and the light flux that reaches the lower portion of the screen S decreases, whereby the difference in the amount of light between the upper portion and the lower portion of the screen S can be suppressed.

Data on the divergence angles θ0 of the light fluxes F1 to F5, which reach the respective image heights on the screen S, will be shown below. θ1 represents the angle of the lower peripheral light ray of each of the light fluxes F1 to F5 and is the angle at which the lower peripheral light ray of each of the light fluxes F1 to F5 intersects the screen S. θ2 represents the angle of the upper peripheral light ray of each of the light fluxes F1 to F5 and is the angle at which the upper peripheral light ray of each of the light fluxes F1 to F5 intersects the screen S. θ0 represents the divergence angle and is the difference between θ2 and θ1. R represents the divergence angle ratio. The divergence angle ratio is the ratio of a divergence angle to the divergence angle of the light flux F1, which has the largest divergence angle and is assumed to be 100.

| Light flux | θ1 | θ2 | θ0 | R |
|---|---|---|---|---|
| F1 | 46.65789395 | 47.11297206 | 0.455078109 | 100% |
| F2 | 62.86774407 | 63.14122071 | 0.273476639 | 60% |
| F3 | 70.64228083 | 70.81629812 | 0.174017289 | 38% |
| F4 | 75.03962273 | 75.161462 | 0.121839266 | 27% |
| F5 | 77.83533337 | 77.92669357 | 0.091360209 | 20% |

In the present example, the divergence angle θ0 of the light flux F5, which reaches the largest image height position, is 20% of the divergence angle θ0 of the light flux F1, which reaches the smallest image height position. The divergence angle θ0 of the light flux F4, which reaches the second largest image height position, is 27% of the divergence angle θ0 of the light flux F1, which reaches the smallest image height position. The divergence angle θ0 of the light flux F3, which reaches the third largest image height position, is 38% of the divergence angle θ0 of the light flux F1, which reaches the smallest image height position. The divergence angle θ0 of the light flux F4, which reaches the fourth largest image height position, is 60% of the divergence angle θ0 of the light flux F1, which reaches the smallest image height position. The values described above are greater than those when the imaginary line P is perpendicular to the imaginary axis L, that is, those in the projection-type image display apparatus 1A according to Embodiment 1. Therefore, according to the present example, the amount of light flux that reaches the upper portion of the screen S increases.

The optical element 3C includes the first member section 31 made of resin and the second member section 32 made of glass arranged along the optical path of the light rays that enter the optical element 3C. The area A, where the diameter of the light flux formed of the light rays having entered the optical element 3C is minimized, is located in the second member section 32. That is, in the optical element 3C, the area A, which is likely to be heated due to the increase in the optical density in the optical element 3C, is made of a material having high heat resistance. The situation in which the heated portion of the optical element 3C undergoes thermal expansion and therefore causes degradation in optical performance of the optical element 3C can therefore be suppressed or avoided.

Further, in the optical element 3C, the first first member section 31(1) is provided with the aspheric second transmissive surface 13, and the second first member section 31(2) is provided with the aspheric reflective surface 12. The optical element 3C can therefore be readily provided with the aspheric second transmissive surface 13 and the aspheric reflective surface 12 as compared with the case where a member section made of glass is provided with the aspheric surfaces.

Example 4

Figure 42:
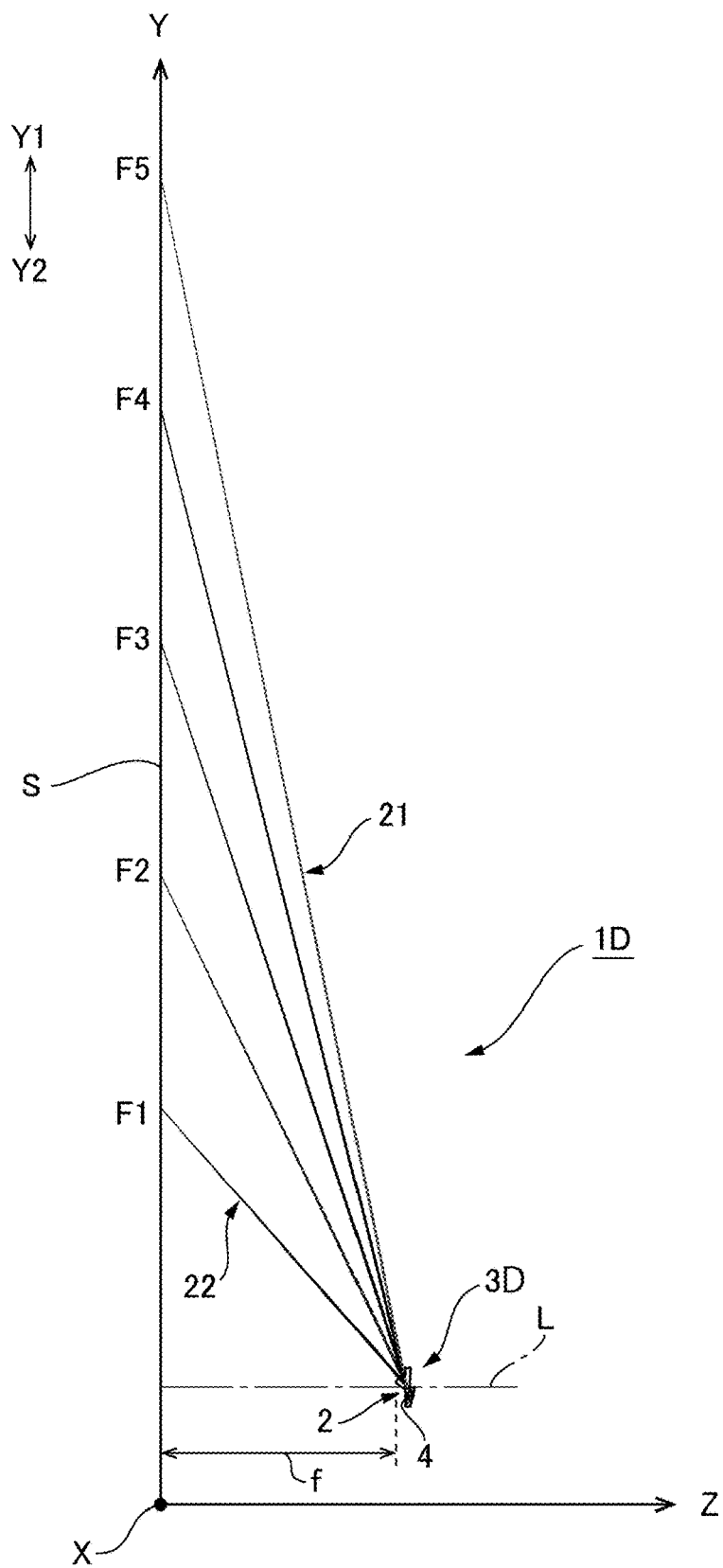
FIG. 42 is a light ray diagram showing the entirety of a projection-type image display apparatus according to Example 4.
Figure 43:
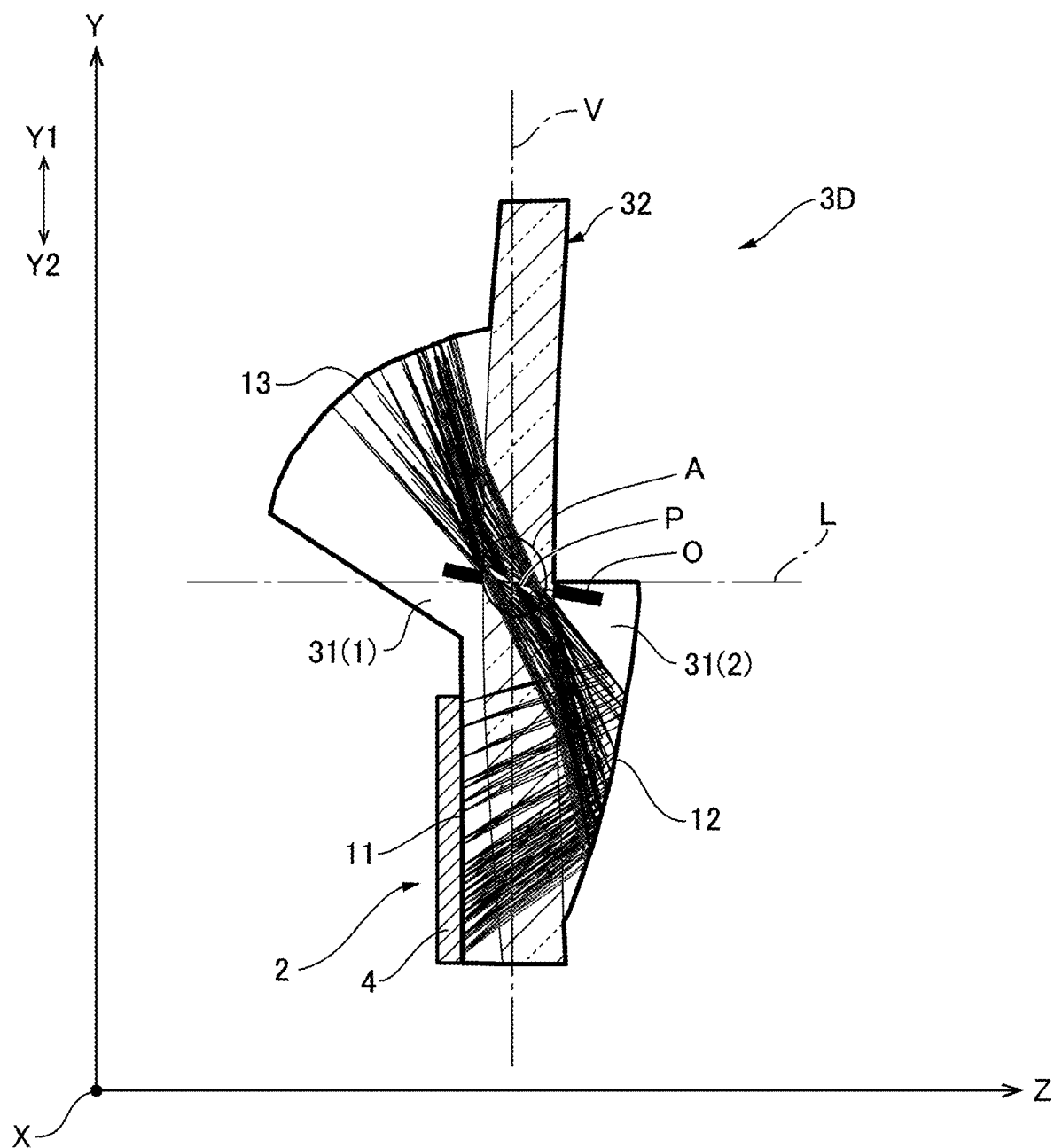
FIG. 43 is a light ray diagram showing light rays traveling through an optical element of the projection-type image display apparatus according to Example 4.
Figure 44:
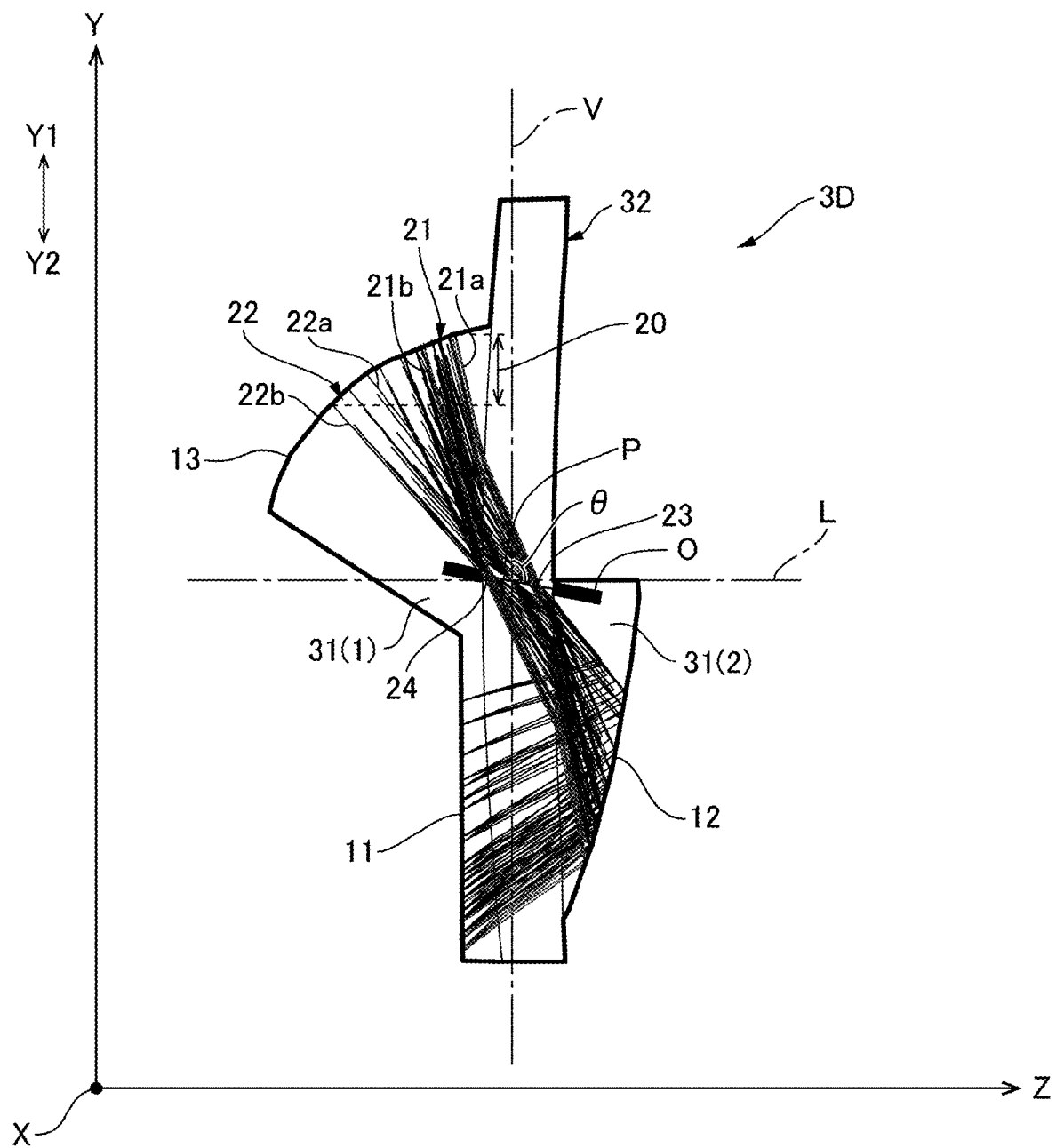
FIG. 44 describes the imaginary line specified in the optical element.

A projection-type image display apparatus 1D according to Embodiment 4 will next be described. FIG. 42 is a light ray diagram showing the entire projection-type image display apparatus 1D according to Example 4. FIG. 43 is a light ray diagram showing light rays traveling through an optical element of the projection-type image display apparatus 1D according to Example 4. FIG. 44 describes the imaginary line P specified in the optical element. In the projection-type image display apparatus 1D according to the present example shown in FIGS. 42 to 44 each viewed along the direction parallel to the axis X, the imaginary line P specified in an optical element 3D inclines with respect to the imaginary vertical line V, but the other configurations are the same as those of the projection-type image display apparatus 1A according to Embodiment 1. Configurations corresponding to those of the projection-type image display apparatus 1A according to Embodiment 1 therefore have the same reference characters and will not be described.

The imaginary line P can be specified in the optical element 3D, as shown in FIG. 44. The imaginary line P connects the upper intersection 23 to the lower intersection 24, the upper intersection 23 being the intersection where the upper peripheral light ray 21a of the upper-end light flux 21, which is the light ray passing through the axis-Y-direction upper end of the effective light ray range 20 of the second transmissive surface 13, and the upper peripheral light ray 22a of the lower-end light flux 22, which is the light ray passing through the axis-Y-direction lower end of the effective light ray range 20, intersect each other in the plane YZ, and the lower intersection 24 being the intersection where the lower peripheral light ray 21b of the upper-end light flux 21 and the lower peripheral light ray 22b of the lower-end light flux 22 intersect each other in the plane YZ.

In the present example, the imaginary line P inclines by 110° with respect to the imaginary vertical line V, which is perpendicular to the imaginary axis L in the plane YZ. That is, let θ be the inclination angle over which a side of the imaginary line P that is the side facing the upper intersection 23 rotates clockwise relative to the imaginary vertical line V around the intersection of the imaginary vertical line V and the imaginary line P, and θ=110°. It can also be said that the imaginary line P is the pupil of the optical element 3D in the plane YZ. Light rays having entered the optical element 3D gather at the imaginary line P or in the vicinity thereof. The light rays having entered the optical element 3D form a light flux the diameter of which is minimized in the area A in the vicinity of the imaginary line P.

The optical element 3D includes the first member section 31 and the second member section 32 having a refractive index different from that of the first member section 31 with the first member section 31 and the second member section 32 arranged along the optical path of the light rays having entered the optical element 3D. The first member section 31 includes the first first member section 31(1), which has the first transmissive surface 11 and the second transmissive surface 13, and the second first member section 31(2), which has the reflective surface 12. The second member section is located between the first first member section 31(1) and the second first member section 31(2) in the axis-Z direction. In the present example, the first member section 31 is made of resin. The second member section 32 is made of glass. The light rays having entered the optical element 3D form a light flux the diameter of which is minimized in the second member section 32, as shown in FIG. 43. That is, the area A, where the diameter of the light flux formed of the light rays having entered the optical element 3D is minimized, is in the second member section 32.

Lens Data

Lens data on the optical element 3D are as follows. The surfaces of the optical element 3D are numbered sequentially from the magnifying side toward the demagnifying side. A surface having a surface number with * is an aspheric surface. The surface numbers 1 and 8 each represent a dummy surface. The surface number 2 represents the second transmissive surface 13. The surface number 6 represents the reflective surface 12. The surface number 10 represents the image plane and the first transmissive surface 11. The surface number 4 represents the stop.

The surface number 3 represents the joint surface at which the first first member section 31(1) and the second member section 32 are joined to each other. The surface number 5 represents the joint surface at which the second member section 32 and the second first member section 31(2) are joined to each other. The surface number 7 represents the joint surface at which the second first member section 31(2) and the second member section 32 are joined to each other. The surface number 9 represents the joint surface at which the second member section 32 and the first first member section 31(1) are joined to each other. The surfaces labeled with the surface numbers 3 and 9 therefore have shapes that conform to each other. The surfaces labeled with the surface numbers 5 and 7 also have shapes that conform to each other. Reference character r denotes the radius of curvature in millimeters. Reference character d denotes the on-axis inter-surface distance in millimeters. Reference character nd denotes the refractive index. Reference character vd denotes the Abbe number.

| Surface number | r | d | nd | vd | Y | X |
|---|---|---|---|---|---|---|
| Object plane | 0 | 154.925192 | | | | |
| 1 | 0 | 5 | | | 69.425 | 69.425 |
| 2* | 18.82405 | 7.363655 | 1.531132 | 55.75 | 7.944 | 7.944 |
| 3 | 114.06501 | 1 | 1.652022 | 54.8 | 3.027 | 3.027 |
| 4 Stop | 0 | 1.418853 | 1.652022 | 54.8 | 1 | 1 |
| 5 | 135.13244 | 2.965778 | 1.531132 | 55.75 | 4.008 | 4.008 |
| 6* | −2.99674 | −2.965778 | 1.531132 | 55.75 | 9.263 | 9.263 |
| 7 | 135.13244 | −1.418853 | 1.652022 | 54.8 | 9.793 | 9.793 |
| 8 | 0 | −1 | 1.652022 | 54.8 | 11.039 | 11.039 |
| 9 | 114.06501 | −0.75 | 1.531132 | 55.75 | 11.344 | 11.344 |
| Image plane | 0 | 0 | 1.531132 | 55.75 | 12.36 | 12.36 |

The on-axis inter-surface distance d between the object plane and the surface number 2 is the projection distance f of the projection-type image display apparatus 1D shown in FIG. 42. In the present example, f=159.925192 mm.

In the present example, the decenter & return α in the fields of the surface number 4 is −110°. That is, the pupil inclines by 110° with respect to the imaginary vertical line V perpendicular to the optical axis in the plane YZ.

Data on the aspheric surface labeled with the surface numbers 2, that is, the second transmissive surface 13 are as follows.

| | |
|---|---|
| Conic constant | 1.955731E+00 |
| Fourth-order coefficient | 2.044439E−03 |
| Sixth-order coefficient | −4.294058E−05 |
| Eighth-order coefficient | 5.347737E−07 |
| Tenth-order coefficient | −1.556296E−09 |

Data on the aspheric surface labeled with the surface numbers 6, that is, the reflective surface 12 are as follows.

| | |
|---|---|
| Conic constant | −6.290221E+01 |
| Fourth-order coefficient | −2.237771E−04 |
| Sixth-order coefficient | 2.377462E−06 |
| Eighth-order coefficient | −1.60976E−08 |
| Tenth-order coefficient | 4.747946E−11 |

Projection Image

Figure 45:
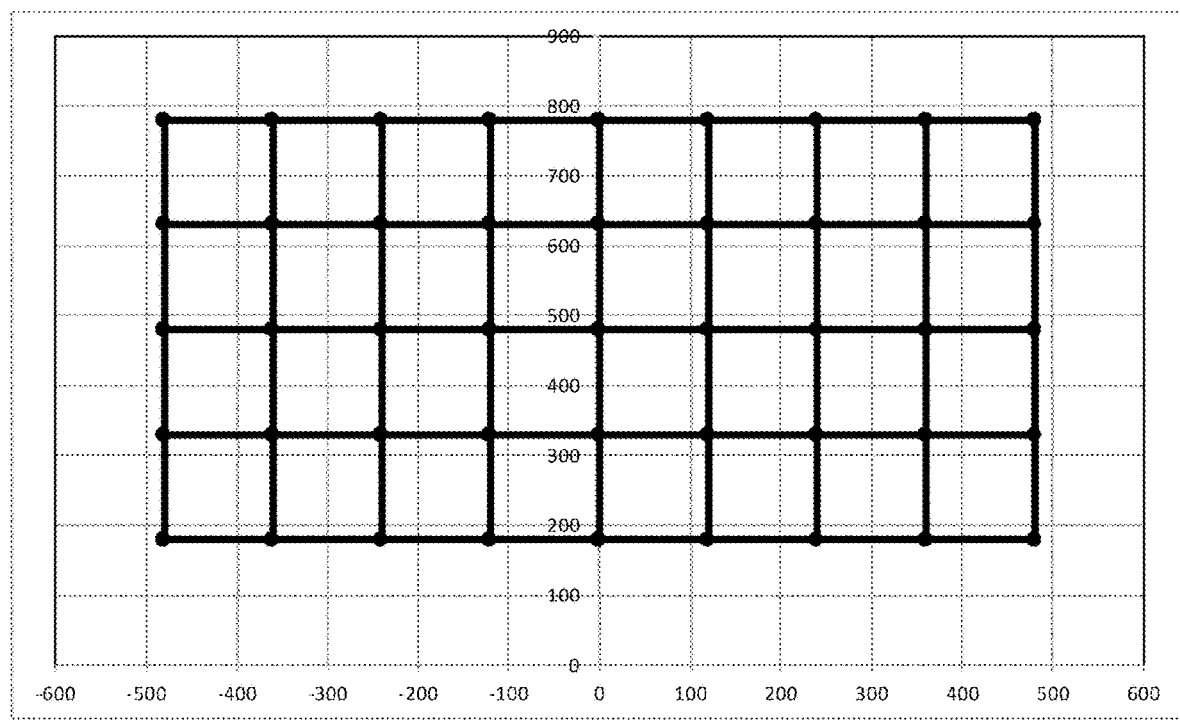
FIG. 45 shows a distortion lattice on the screen.
Figure 46:
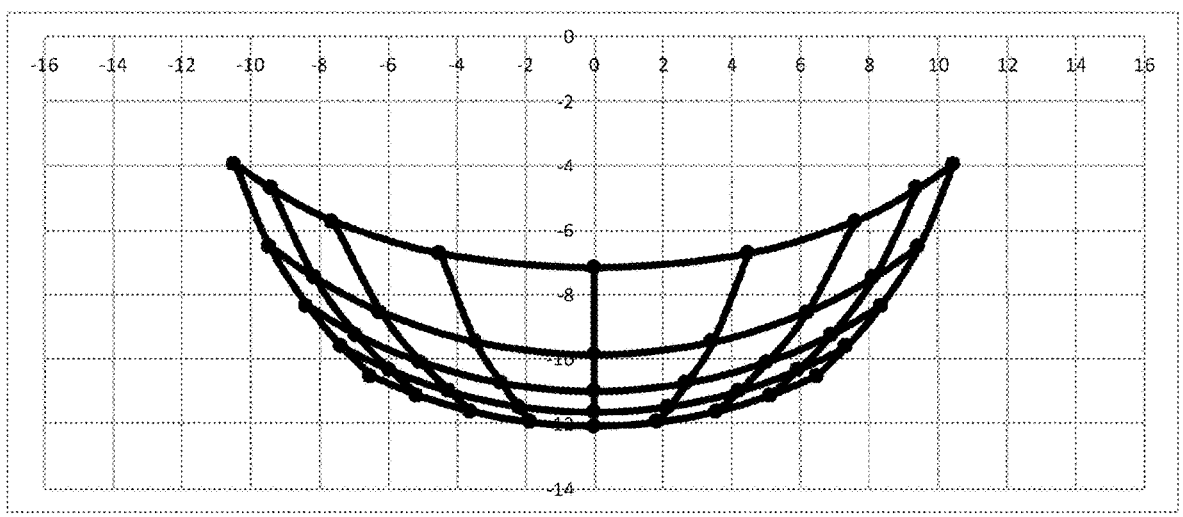
FIG. 46 shows the distortion lattice in a demagnifying-side image formation plane of the optical element.
Figure 47:
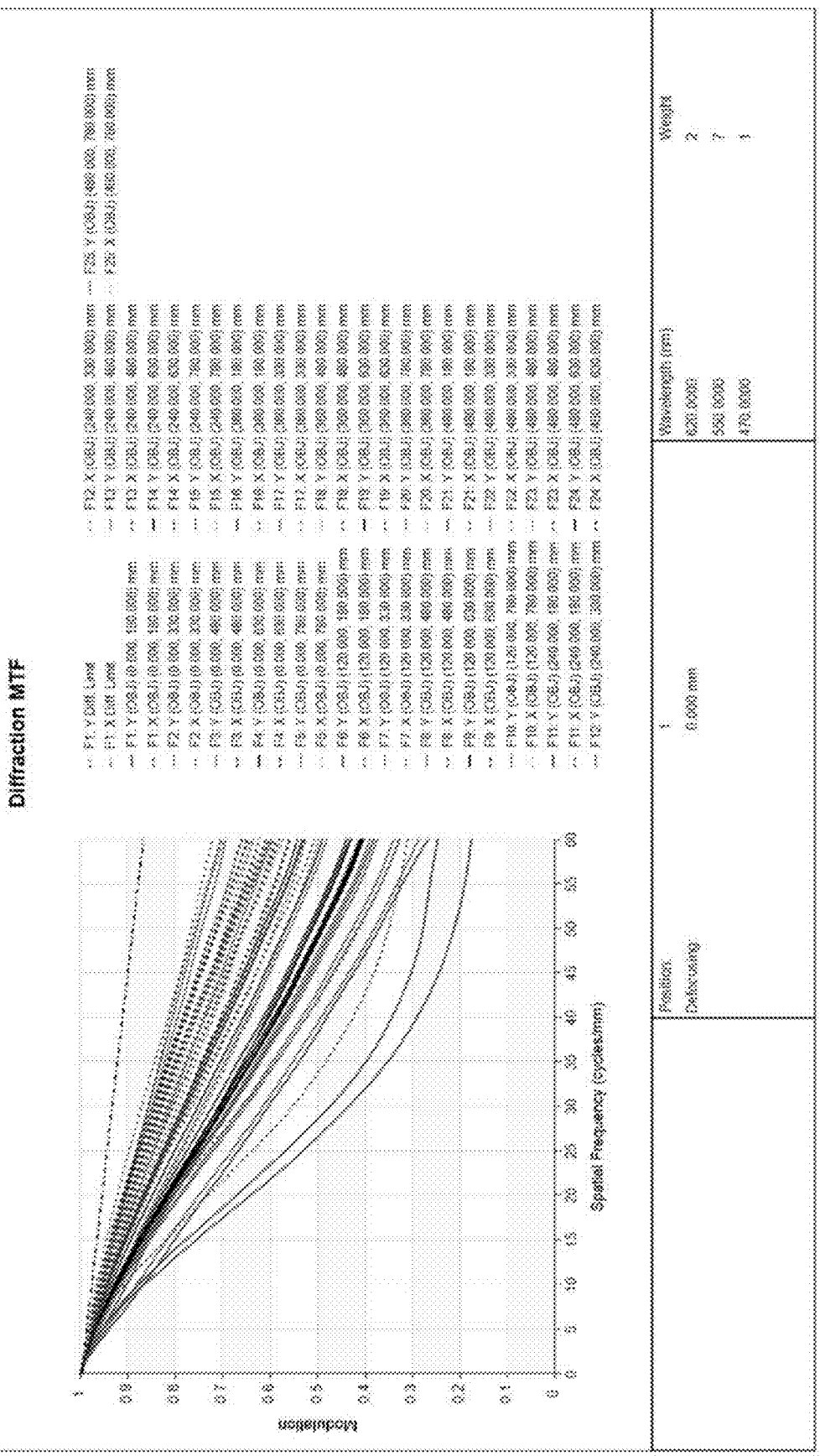
FIG. 47 shows magnifying-side MTFs of the optical element.

The projection image formed by the image formation section 2 will next be described. FIG. 45 shows a distortion lattice on the screen S. FIG. 46 shows the distortion lattice in the demagnifying-side image formation plane of the optical element 3D. The distortion lattice in the demagnifying-side image formation plane is distorted but has no field curvature.

The image formation section 2 forms a projection image that is an inverted final image turned upside down in the demagnifying-side image formation plane. The image formation section 2 forms an image so distorted in advance in the demagnifying-side image formation plane of the optical element 3D that an oblong projection image is projected on the screen S, which is the magnifying-side image formation plane. More specifically, the image formation section 2 forms a distorted projection image corresponding to the distortion lattice shown in FIG. 46 in the demagnifying-side image formation plane in such a way that a final image corresponding to the distortion lattice shown in FIG. 45 is projected on the screen S. The projection image has a shape that allows reduction in trapezoidal distortion of the final image formed on the screen S and having the ideal oblong shape. That is, the projection image has distortion opposite the trapezoidal distortion of the final image. The projection image is therefore so formed that the shortest edge thereof is the edge having the largest image height on the screen S.

Effects

In the projection-type image display apparatus 1D according to the present example, the optical element 3D has the concave reflective surface 12 and the convex second transmissive surface 13 protruding toward the magnifying side. The optical element 3D therefore allows the light flux reflected off the reflective surface 12 to be refracted by the second transmissive surface 13. The focal length of the optical element 3D, that is, the projection distance is therefore readily shortened.

In the optical element 3D, the reflective surface 12 labeled with the surface number 6 and the second transmissive surface 13 labeled with the surface number 2 are each an aspheric surface. Further, the surface numbers 3, 5, 7, and 9 represent joint surfaces at which the first member section 31 and the second member section 32 having different refractive indices are joined to each other and which each have a curved shape. The optical element 3D can therefore suppress produced aberrations.

Figure 48:
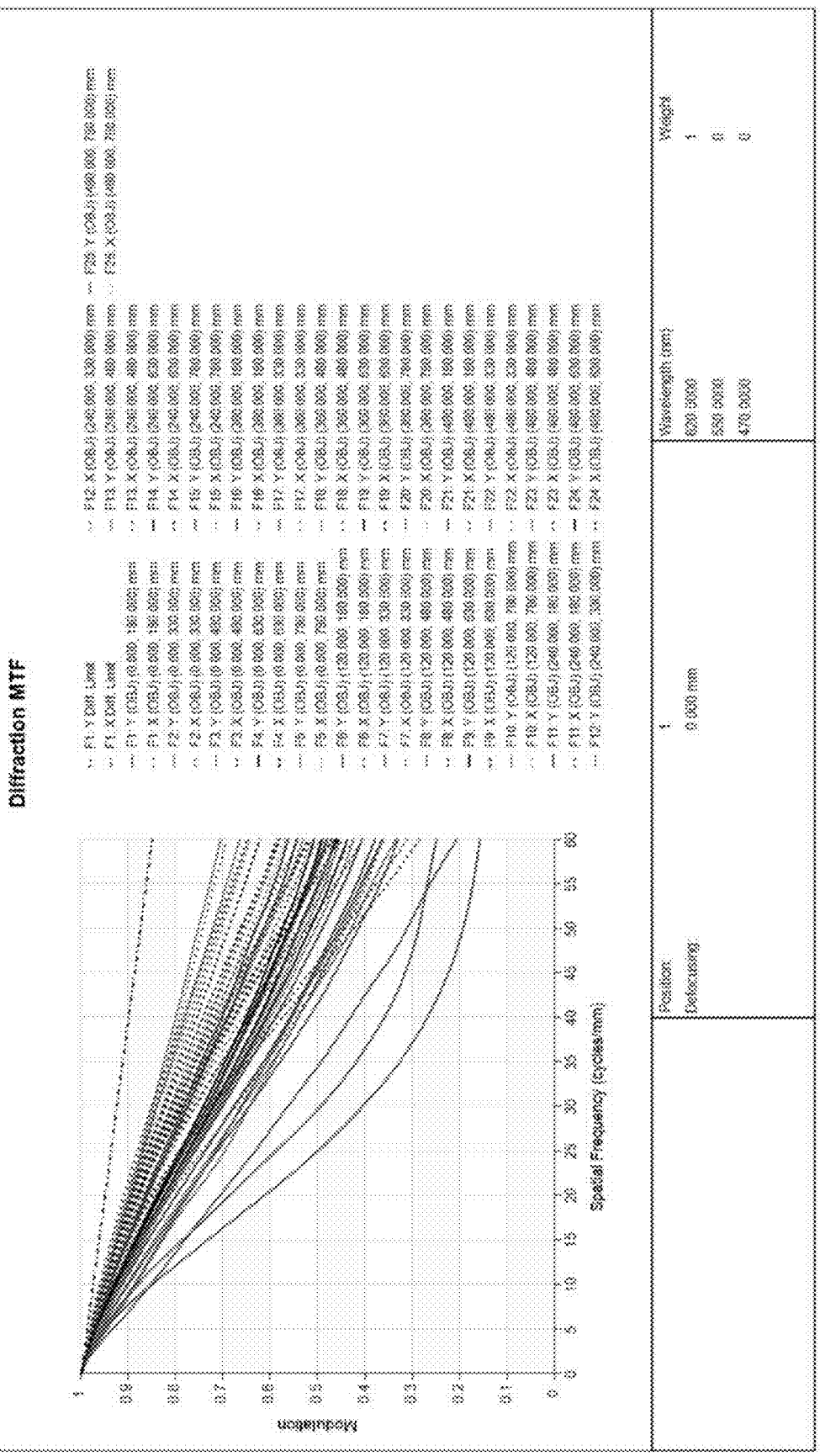
FIG. 48 shows the MTFs of the optical element that transmits red light rays.
Figure 49:
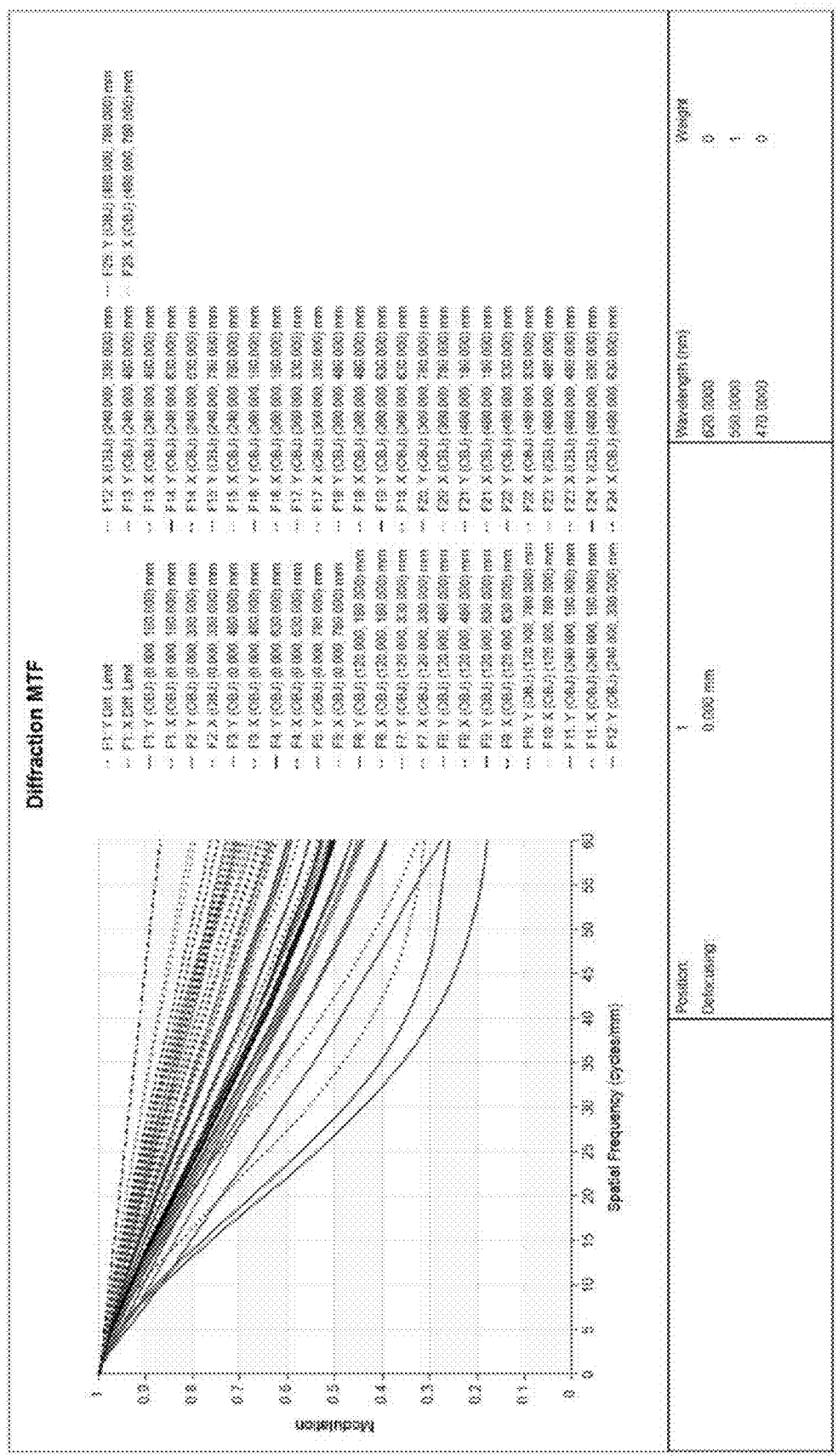
FIG. 49 shows the MTFs of the optical element that transmits green light rays.
Figure 50:
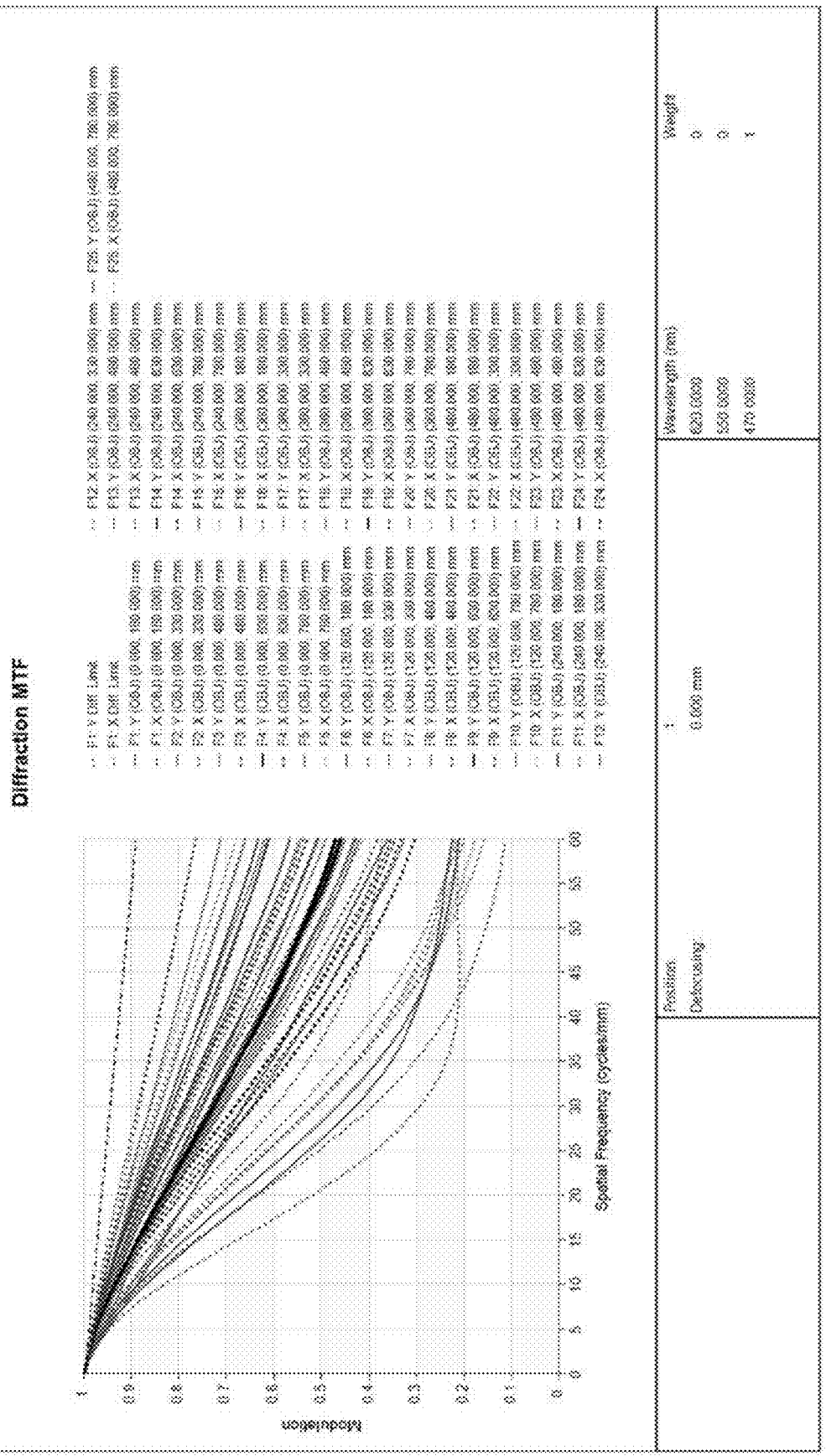
FIG. 50 shows the MTFs of the optical element that transmits blue light rays.

FIGS. 47 to 50 each show magnifying-side MTFs of the optical element 3D. The MTFs were calculated in the same manner as in Embodiment 1. Light rays used in the calculation of the MTFs are so weighted that the weighting ratio among light rays having the wavelength of 620 nm, light rays having the wavelength of 550 nm, and light rays having the wavelength of 470 nm is 2:7:1. In FIG. 48, the light rays used in the calculation of the MTFs are the light rays having the wavelength of 620 nm. In FIG. 49, the light rays used in the calculation of the MTFs are the light rays having the wavelength of 550 nm. In FIG. 50, the light rays used in the calculation of the MTFs are the light rays having the wavelength of 470 nm. Comparison between the MTFs of the optical element 3D according to Embodiment 4 shown in FIGS. 47 to 50 and the MTFs of the optical element 3 according to Comparative Embodiment shown in FIGS. 17 to 20 shows that a decrease in the resolution is suppressed, that a decrease in MTFs at each of the colors is also suppressed, and that chromatic aberrations are satisfactorily corrected in the present example.

Figure 51:
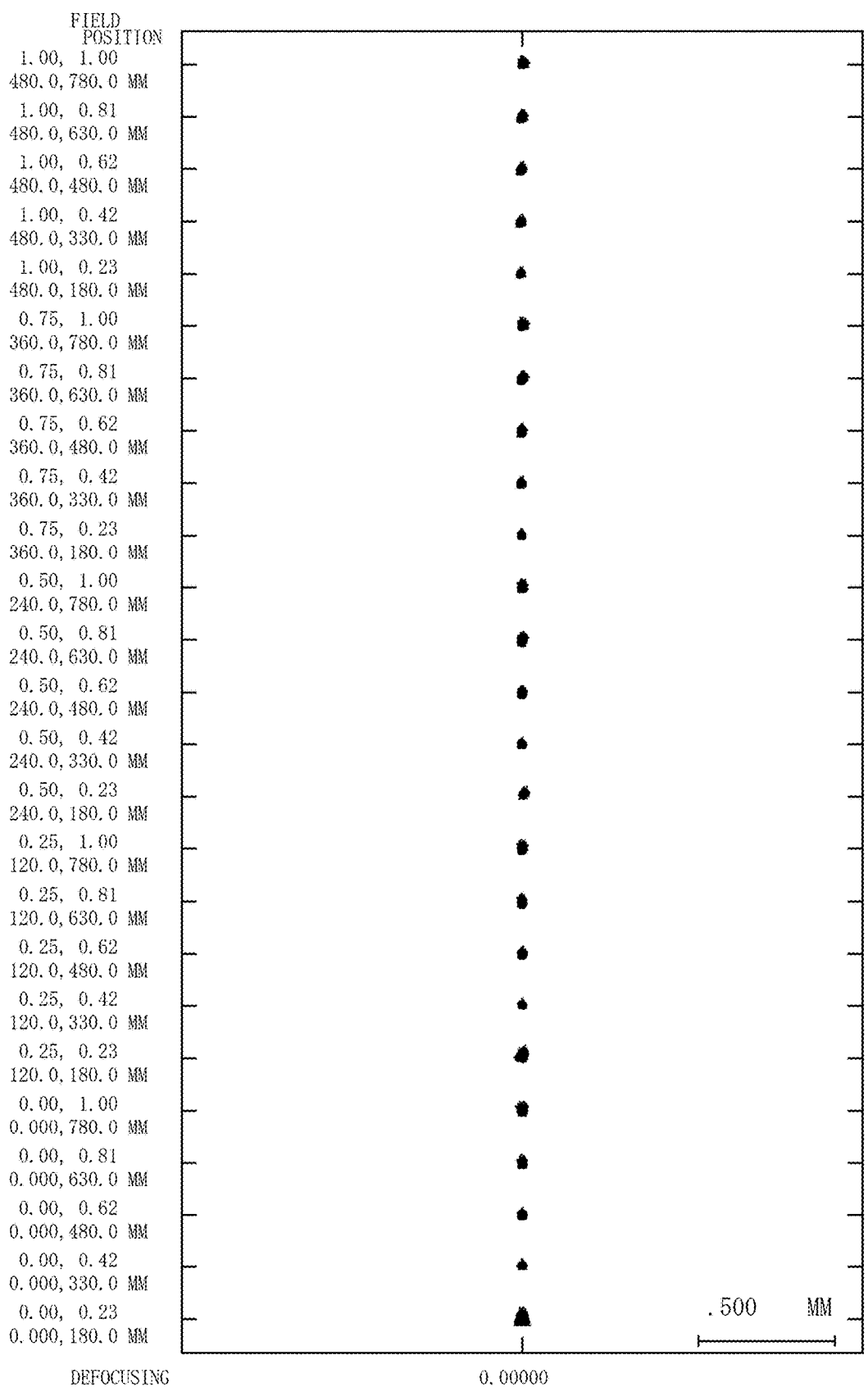
FIG. 51 is a spot diagram showing spots produced by the optical element.

FIG. 51 is a spot diagram showing spots produced by the optical element 3D. The spot diagram of FIG. 51 shows smaller spots than those in the spot diagram of the optical element 3 according to Comparative Embodiment shown in FIG. 21. The optical element 3D according to the present example therefore satisfactorily corrects the aberrations.

In the present example, since the imaginary line P inclines with respect to the imaginary vertical line V, the lower-end light flux 22 passing through the lower end of the effective light ray range 20 of the second transmissive surface 13 is not blocked but reaches the screen S. Further, since the imaginary line P inclines with respect to the imaginary vertical line V, a decrease in the amount of light at the upper periphery of the screen S can be suppressed, as compared with the case where the imaginary line P is parallel to the imaginary vertical line V. Further, when the divergence angle θ0 of the light flux that reaches the upper portion of the screen S increases, the difference between the divergence angle θ0 of the light flux that reaches the upper portion of the screen S and the divergence angle θ0 of the light flux that reaches the lower portion of the screen S decreases. A decrease in the amount of light at the upper periphery of the screen S from the amount of light at the lower periphery of the screen S can therefore be suppressed.

In addition to the above, in the optical element 3D according to the present example, the imaginary line P inclines with respect to the imaginary vertical line V by 90° or greater. The divergence angle θ0 of the light flux F1, which reaches the lower portion of the screen S, therefore decreases. As a result, the difference in the divergence angle θ0 between the light flux that reaches the upper portion of the screen S and the light ray that reaches the lower portion of the screen S decreases, whereby the difference in the amount of light between the upper portion and the lower portion of the screen S can be suppressed.

Data on the divergence angles θ0 of the light fluxes F1 to F5, which reach the respective image heights on the screen S, will be shown below. θ1 represents the angle of the lower peripheral light ray of each of the light fluxes F1 to F5 and is the angle at which the lower peripheral light ray of each of the light fluxes F1 to F5 intersects the screen S. θ2 represents the angle of the upper peripheral light ray of each of the light fluxes F1 to F5 and is the angle at which the upper peripheral light ray of each of the light fluxes F1 to F5 intersects the screen S. θ0 represents the divergence angle and is the difference between θ2 and θ1. R represents the divergence angle ratio. The divergence angle ratio is the ratio of a divergence angle to the divergence angle of the light flux F1, which has the largest divergence angle and is assumed to be 100.

| Light flux | θ1 | θ2 | θ0 | R |
| --- | --- | --- | --- | --- |
| F1 | 46.69963415 | 47.06752201 | 0.36788786 | 100% |
| F2 | 62.88415988 | 63.1215022 | 0.237342313 | 65% |
| F3 | 70.65145065 | 70.8056815 | 0.15423085 | 42% |
| F4 | 75.04561255 | 75.15470484 | 0.109092283 | 30% |
| F5 | 77.83967061 | 77.9219476 | 0.082276991 | 22% |

In the present example, the divergence angle θ0 of the light flux F5, which reaches the largest image height position, is 22% of the divergence angle θ0 of the light flux F1, which reaches the smallest image height position. The divergence angle θ0 of the light flux F4, which reaches the second largest image height position, is 30% of the divergence angle θ0 of the light flux F1, which reaches the smallest image height position. The divergence angle θ0 of the light flux F3, which reaches the third largest image height position, is 42% of the divergence angle θ0 of the light flux F1, which reaches the smallest image height position. The divergence angle θ0 of the light flux F4, which reaches the fourth largest image height position, is 65% of the divergence angle θ0 of the light flux F1, which reaches the smallest image height position. The values described above are greater than those when the imaginary line P is perpendicular to the imaginary axis L, that is, those in the projection-type image display apparatus 1A according to Embodiment 1. Therefore, according to the present example, the amount of light flux that reaches the upper portion of the screen S increases.

The optical element 3C includes the first member section 31 made of resin and the second member section 32 made of glass arranged along the optical path of the light rays that enter the optical element 3D. The area A, where the diameter of the light flux formed of the light rays having entered the optical element 3D is minimized, is located in the second member section 32. That is, in the optical element 3D, the area A, which is likely to be heated due to the increase in the optical density in the optical element 3D, is made of a material having high heat resistance. The situation in which the heated portion of the optical element 3D undergoes thermal expansion and therefore causes degradation in optical performance of the optical element 3D can therefore be suppressed or avoided.

Further, in the optical element 3D, the first first member section 31(1) is provided with the aspheric second transmissive surface 13, and the second first member section 31(2) is provided with the aspheric reflective surface 12. The optical element 3D can therefore be readily provided with the aspheric second transmissive surface 13 and the aspheric reflective surface 12 as compared with the case where a member section made of glass is provided with the aspheric surfaces.

Figure 52:
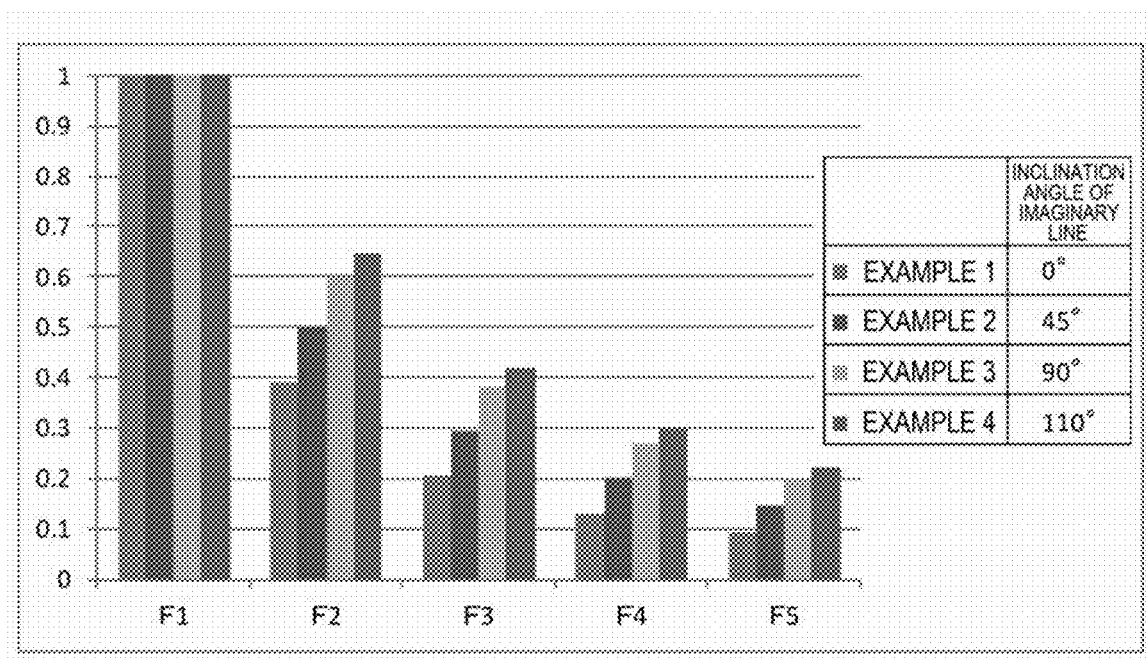
FIG. 52 shows the divergence angles of light fluxes that reach the screen in Embodiments 1 to 4.

FIG. 52 is a graph collectively showing the divergence angles θ0 of the light fluxes F1 to F5, which reach the respective image heights on the screen S, in the projection-type image display apparatuses 1A to 1D according to Embodiments 1 to 4. The following tables shows data on the divergence angles θ0 of the light fluxes F1 to F5, which reach the respective image heights on the screen S, in the projection-type image display apparatuses 1A to 1D according to Embodiments 1 to 4. In the following data on the divergence angle and FIG. 52, the divergence angle at F1 on the screen S is set at 1, and the divergence angles in the height positions F2 to F5 are shown in the form of the ratio thereof to the divergence angle at F1.

|    | Example 1 | Example 2 | Example 3 | Example 4 |
|----|-----------|-----------|-----------|-----------|
| F1 | 1         | 1         | 1         | 1         |
| F2 | 0.39      | 0.50      | 0.60      | 0.65      |
| F3 | 0.21      | 0.30      | 0.38      | 0.42      |
| F4 | 0.13      | 0.20      | 0.27      | 0.30      |
| F5 | 0.09      | 0.15      | 0.20      | 0.22      |

In Embodiments 2 to 4, the divergence angles of the light fluxes that reach the upper portion of the screen S increase as compared with those in Embodiment 1, as shown in FIG. 52. The amount of light fluxes that reach the upper portion of the screen S therefore increases.

Other Embodiments

The optical elements 3A to 3D are each divided into three sections, but the optical elements each only need to include the first member section 31 and the second member section 32 having a refractive index different from that of the first member section 31 with the first member section 31 and the second member section 32 arranged along the optical path of the light rays having entered the optical element, and the optical element does not necessarily need to be divided into the three sections. That is, the optical elements may each be divided into two sections of four or more sections.

The first first member section 31(1) and the second first member section 31(2), which sandwich the second member section 32, may be made of resin materials having different refractive indices and Abbe numbers. The configuration described above allows further correction of chromatic aberrations.

The first member section 31 may be made of glass having a refractive index different from that of the second member section 32. When the optical elements 3A to 3D each have a relatively small size, the optical element can be so formed in aspheric-surface glass molding. Therefore, when the first member section 31 and the second member section 32 are each made of glass, an optical system that further excels in heat resistance can be achieved.

The shape of the second member section 32 and the shapes of the surfaces thereof are not limited to those in the examples described above. Changing the shape of the second member section 32 and the shapes of the surfaces thereof allows an optimum optical system to be achieved in accordance with projection distance and resolution requirements.

When no stop O is provided, optimizing the light exiting angle of the light exiting out of the image formation section 2 and the spread angle of the exiting light in the light exiting plane allows the same effect provided by the stop O to be provided.

The optical elements 3A to 3D according to the examples according to the present disclosure can each be used in an imaging system. In this case, an imaging device, such as a CCD, is disposed in the demagnifying-side image formation plane of the optical element 3A to 3D. When the optical element 3A to 3D is used in an imaging system, a distorted image is formed in the demagnifying-side image formation plane. The distortion of the image can, however, be corrected by performing image processing on the signal from the imaging device.

What is claimed is:

1. An optical element comprising:
   a first member having a first refractive index;
   a second member having a second refractive index different from the first refractive index,
   wherein the optical element has a first transmissive surface, a reflective surface, and a second transmissive surface arranged from a demagnifying side toward a magnifying side in order,
   the first transmissive surface and the reflective surface are located in one side with respect to an optical axis of the optical element,
   the second transmissive surface is located in the other side with respect to the optical axis of the optical element,
   the reflective surface has a concave shape,
   an imaginary line that connects an upper intersection to a lower intersection inclines with respect to an imaginary vertical line perpendicular to the optical axis,
   the upper intersection being an intersection where an upper peripheral light ray of an upper-end light flux and an upper peripheral light ray of a lower-end light flux intersect each other, and the lower intersection being an intersection where a lower peripheral light ray of the upper-end light flux and a lower peripheral light ray of the lower-end light flux intersect each other, and
   the upper-end light flux being a light flux passing through one end of an effective range of the second transmissive surface in the imaginary vertical line, a lower-end light flux being a light flux passing through the other end of the effective range of the second transmissive surface in the imaginary vertical line.

2. The optical element according to claim 1, wherein a joint surface at which the first member and the second member are joined to each other has a curved shape.

3. A display apparatus comprising:
   the optical element according to claim 2; and
   an image formation section that forms a projection image on the first transmissive surface.

4. The optical element according to claim 1, wherein the imaginary line is located in the second member.

5. A display apparatus comprising:
   the optical element according to claim 4; and
   an image formation section that forms a projection image on the first transmissive surface.

6. The optical element according to claim 1,
   wherein the second member excels the first member in heat resistance, and
   a diameter of a light flux that enter the optical element is minimized in the second member.

7. A display apparatus comprising:
   the optical element according to claim 6; and
   an image formation section that forms a projection image on the first transmissive surface.

8. The optical element according to claim 1,
   wherein the second member excels the first member in transmittance of the light rays, and
   a diameter of a light flux that enter the optical element is minimized in the second member.

9. A display apparatus comprising:
   the optical element according to claim 8; and
   an image formation section that forms a projection image on the first transmissive surface.

10. The optical element according to claim 1, wherein the reflective surface is provided with the first member.

11. The optical element according to claim 1, wherein the first transmissive surface and the second transmissive surface is provided with the first member.

12. The optical element according to claim 1, wherein the first member is made of resin.

13. The optical element according to claim 1, wherein the second member is made of glass.

14. The optical element according to claim 1, further comprising a stop.

15. The optical element according to claim 1, further comprising a stop,
wherein the stop is provided along the imaginary line.

16. The optical element according to claim 1, wherein at least one of the first transmissive surface, the reflective surface, and the second transmissive surface is an aspheric surface.

17. A display apparatus comprising:
the optical element according to claim 16; and
an image formation section that forms a projection image on the first transmissive surface.

18. A display apparatus comprising:
the optical element according to claim 1; and
an image formation section that forms a projection image on the first transmissive surface.

* * * * *